(12) United States Patent
Viger et al.

(10) Patent No.: US 12,177,908 B2
(45) Date of Patent: Dec. 24, 2024

(54) RANDOM ACCESS FOR SHORT FEEDBACK PROCEDURES IN WIRELESS NETWORKS

(71) Applicant: CANON KABUSHIKI KAISHA, Tokyo (JP)

(72) Inventors: Pascal Viger, Janze (FR); Stéphane Baron, Le Rheu (FR); Patrice Nezou, Liffre (FR)

(73) Assignee: Canon Kabushiki Kaisha, Tokyo (JP)

( * ) Notice: Subject to any disclaimer, the term of this patent is extended or adjusted under 35 U.S.C. 154(b) by 445 days.

(21) Appl. No.: 17/619,191

(22) PCT Filed: Jun. 19, 2020

(86) PCT No.: PCT/EP2020/067138
§ 371 (c)(1),
(2) Date: Dec. 14, 2021

(87) PCT Pub. No.: WO2020/254599
PCT Pub. Date: Dec. 24, 2020

(65) Prior Publication Data
US 2022/0322426 A1    Oct. 6, 2022

(30) Foreign Application Priority Data

Jun. 19, 2019  (GB) ...................................... 1908800
Jun. 19, 2019  (GB) ...................................... 1908801
(Continued)

(51) Int. Cl.
*H04W 74/0833* (2024.01)
*H04L 5/00* (2006.01)

(52) U.S. Cl.
CPC ......... *H04W 74/085* (2013.01); *H04L 5/0055* (2013.01)

(58) Field of Classification Search
CPC ... H04W 74/085; H04W 84/12; H04W 74/06; H04W 74/002; H04W 74/0833;
(Continued)

(56) References Cited

U.S. PATENT DOCUMENTS

2018/0255589 A1*  9/2018  Patil .................... H04W 52/146
2019/0007977 A1*  1/2019  Asterjadhi ........ H04W 74/0833
(Continued)

FOREIGN PATENT DOCUMENTS

CN    107925462 A    4/2018
CN    108029143 A    5/2018
(Continued)

OTHER PUBLICATIONS

IEEE P802.11ax/D3.0 (Year: 2018).*
(Continued)

*Primary Examiner* — Ricky Q Ngo
*Assistant Examiner* — David M Kayal
(74) *Attorney, Agent, or Firm* — Canon U.S.A., Inc. IP Division

(57) ABSTRACT

The invention provides a random access mechanism for short feedback procedure. An AP provides a random-access NFRP trigger frame defining a random access for the stations to a plurality of RU tone sets. A non-AP station randomly selects a responding RU tone set from the plurality of RU tone sets and send a NDP feedback report response on the selected responding RU tone set. A dedicated backoff counter may be used for the purposes of contention to the random RU tone sets. A subsequent UL MU transmission can then be scheduled by the AP for the NDP responding stations. No unused RU is expected, improving the random-access network efficiency. Also, the number of non-AP stations that can be targeted by the random-access NFRP trigger frame can be easily increased.

20 Claims, 20 Drawing Sheets

(30) Foreign Application Priority Data

Jun. 19, 2019 (GB) .................................... 1908802
Jul. 4, 2019 (GB) .................................... 1909635

(58) Field of Classification Search
CPC .. H04W 74/08; H04W 72/121; H04L 5/0055; H04L 5/0023; H04L 5/0044; H04L 5/0053; H04L 5/0091; H04L 5/00
See application file for complete search history.

(56) References Cited

U.S. PATENT DOCUMENTS

| | | |
|---|---|---|
| 2019/0014538 A1 | 1/2019 | Patil et al. |
| 2019/0089424 A1 | 3/2019 | Cariou |
| 2019/0159207 A1* | 5/2019 | Chen ............... H04L 5/0053 |
| 2020/0107318 A1* | 4/2020 | Chu ................ H04W 4/06 |
| 2021/0281376 A1* | 9/2021 | Park ............... H04L 5/0044 |
| 2023/0422297 A1* | 12/2023 | Lou ................ H04W 74/08 |

FOREIGN PATENT DOCUMENTS

| | | |
|---|---|---|
| KR | 20180055832 A | 5/2018 |
| WO | 2016161433 A1 | 10/2016 |
| WO | 2016/196672 A1 | 12/2016 |
| WO | 2017044529 A1 | 3/2017 |
| WO | 2018156211 A1 | 8/2018 |
| WO | WO-2018195354 A1 * | 10/2018 |

OTHER PUBLICATIONS

Po-Kai Huang, CR for 16668, IEEE Draft, 11-18-1799-02-00AX-CR-FOR-16668, vol. 802.11ax, No. 2, Nov. 2018, XP068133149, pp. 1-6 (Retreived from Internet: https://mentor.ieee.org/802.11/dcn/18/11-18-1799-02-00ax-cr-for-16668.docx).

Frame Formats, IEEE Draft, vol. 802.11ax drafts, No. D3.0, XP068137584, Jun. 2018, p. 1-150 (Retreived from Internet: https://www.ieee802.org/11/private/Draft_Standards/11ax/TGax_Cl_09.rtf).

* cited by examiner

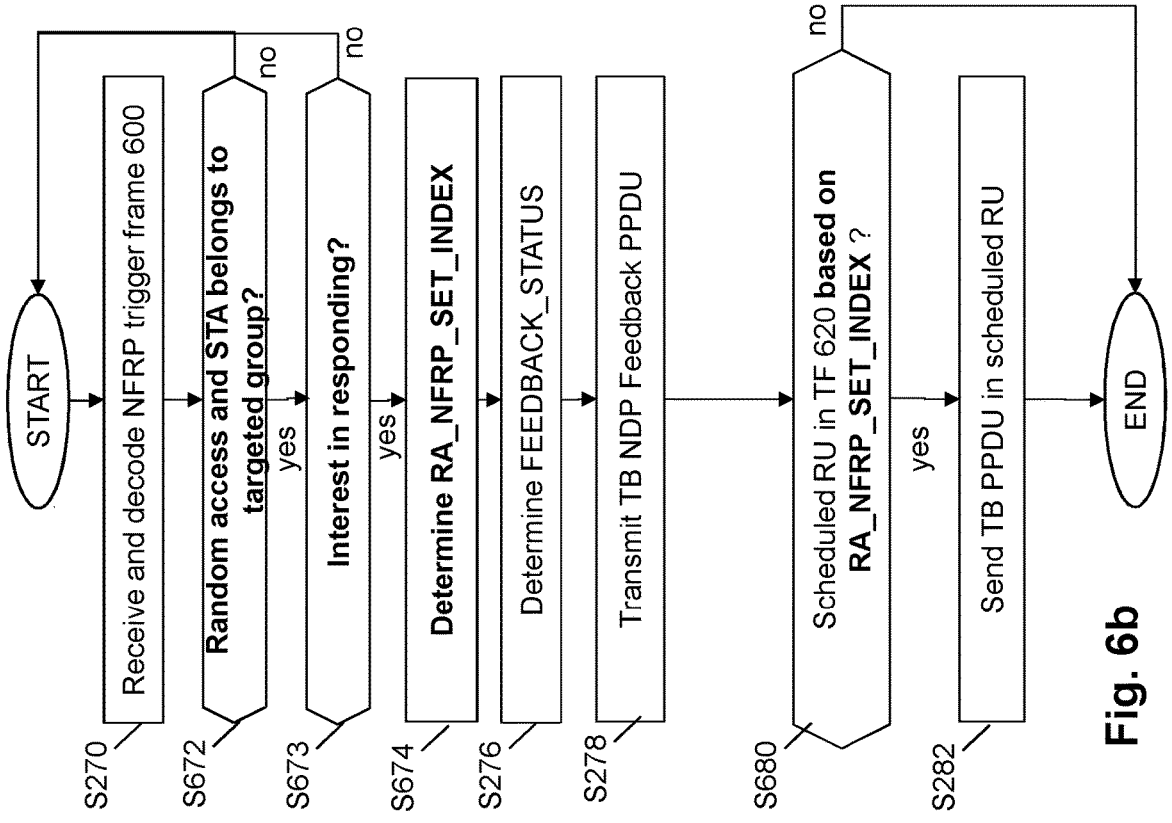
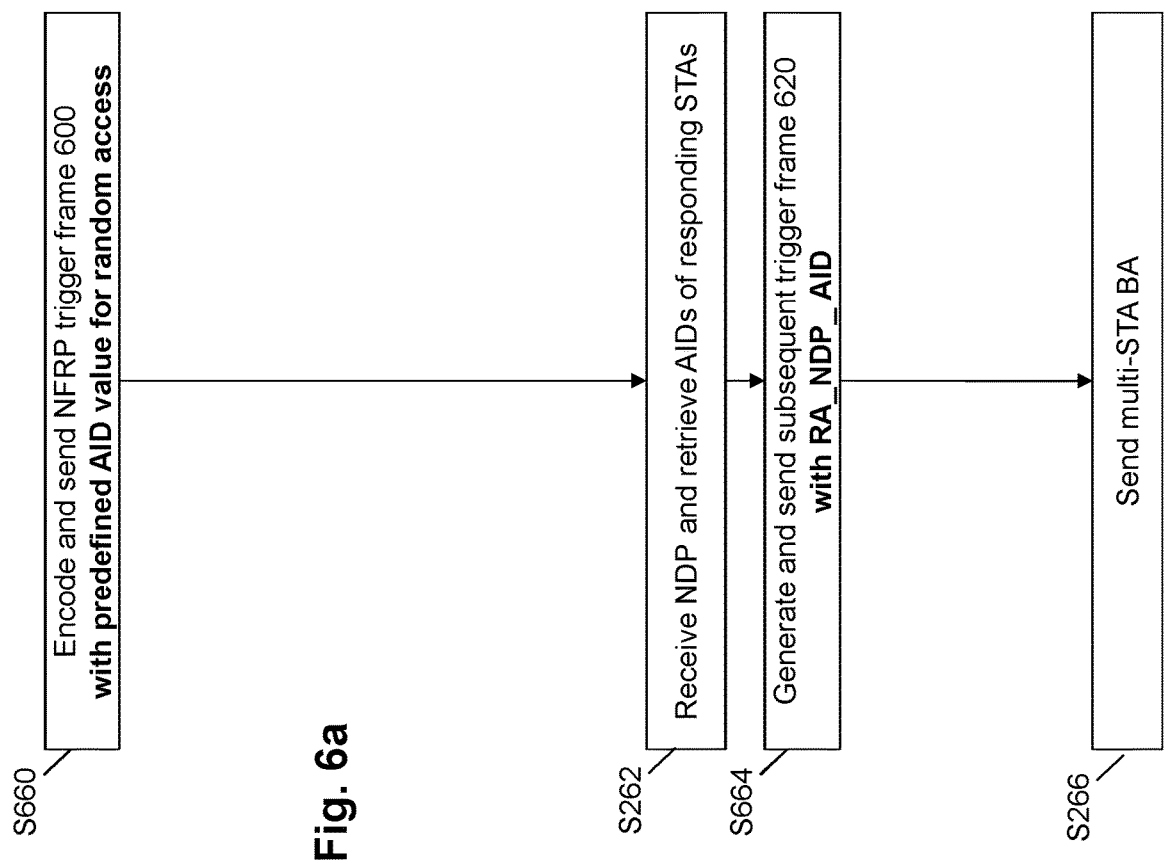
Fig. 6a
Fig. 6b

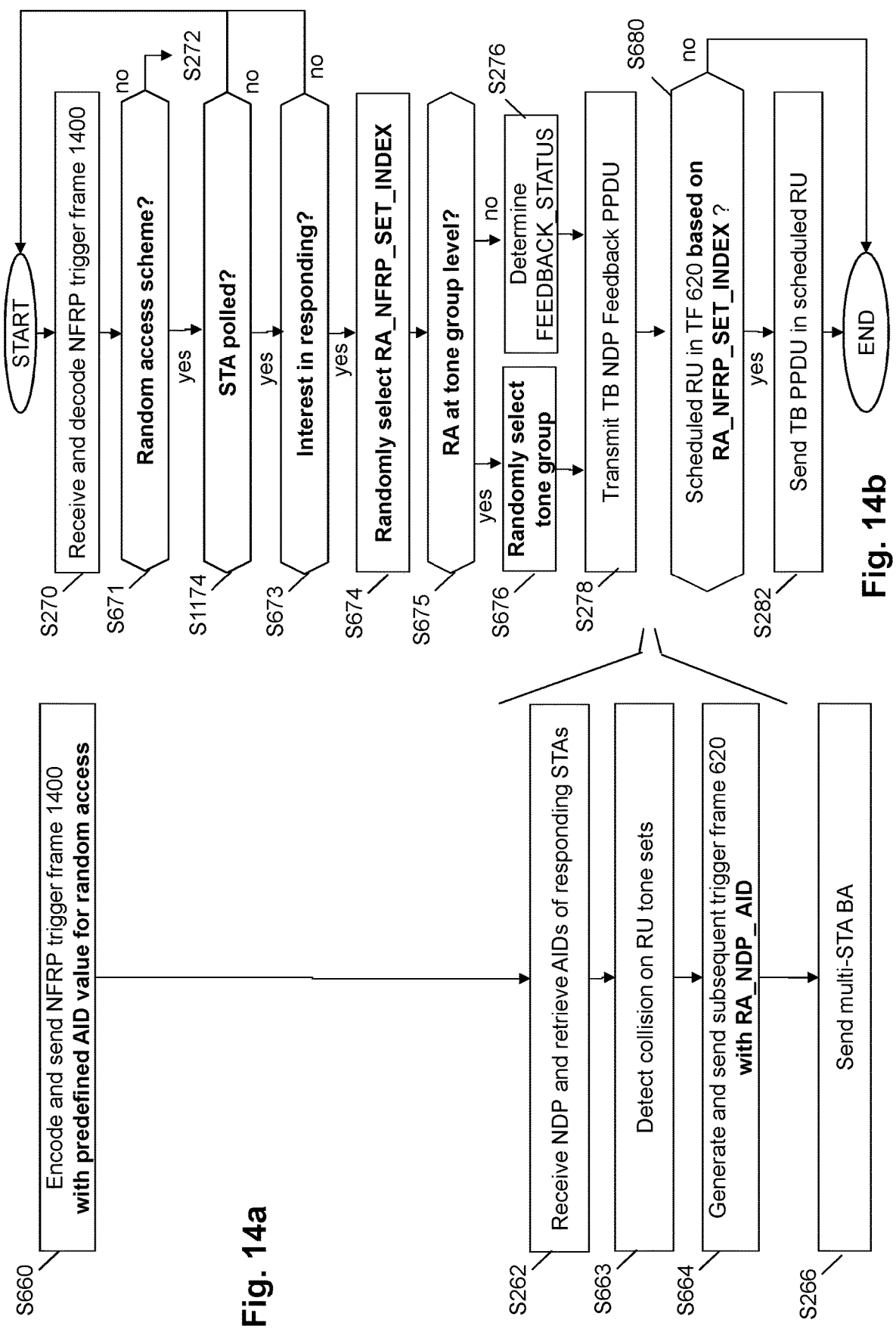

RANDOM ACCESS FOR SHORT FEEDBACK PROCEDURES IN WIRELESS NETWORKS

CROSS REFERENCE TO RELATED APPLICATION

This application is a National Phase Application of International Application No. PCT/EP2020/067138 filed on Jun. 19, 2020, which claims the benefit under 35 U.S.C. § 119(a)-(d) of United Kingdom Patent Application No. 1908800.4, filed on Jun. 19, 2019, United Kingdom Patent Application No. 1908801.2, filed on Jun. 19, 2019, United Kingdom Patent Application No. 1908802.0, filed on Jun. 19, 2019, and United Kingdom Patent Application No. 1909635.3, filed on Jul. 4, 2019. The above cited patent applications are incorporated herein by reference in their entireties.

FIELD OF THE INVENTION

The present invention relates generally to communication networks and more specifically to wireless communication methods in a wireless network and corresponding communication devices, such as an access point (AP) and non-AP stations.

BACKGROUND OF THE INVENTION

The IEEE 802.11 ® family of standards provides multi-user (MU) schemes to allow a single access point (AP) to schedule MU transmissions, i.e. multiple simultaneous transmissions to or from non-AP stations or "nodes", in the wireless network. This approach increases bandwidth and decreases latency requirements compared to original 802.11 networks.

MU downlink (DL) transmission is allowed where the AP performs multiple simultaneous elementary transmissions, over so-called resource units (RUs), to various non-AP stations. As an example, the resource units split a communication channel of the wireless network in the frequency domain, based for instance on Orthogonal Frequency Division Multiple Access (OFDMA) technique.

MU uplink (UL) transmissions are also allowed that are triggered by the AP. Various non-AP stations can simultaneously transmit to the AP over the resource units forming the MU UL transmission. To control the MU UL transmission by the non-AP stations, the AP sends a control frame, known as a Trigger Frame (TF), which defines a plurality of resource units for the non-AP stations.

Various variants of trigger frames exist depending on the nature of information the non-AP stations can provide in response. The main variant is the basic trigger frame for the non-AP stations to send any data they wish.

Some RUs may be allocated in a basic trigger frame to specific non-AP stations using 16-bit Association IDentifiers (AIDs) assigned to them upon registration to the AP (so-called scheduled RUs).

Others RUs (known as random RUs) are available to the non-AP stations using a contention-based access scheme. Only three types of trigger frames are known to provide such random access to RUs, namely the Basic Trigger frame, the BQRP Trigger frame and the BSRP Trigger frame. This scheme is known as UL OFDMA-based random access (UORA) scheme.

UORA is useful for wireless networks because it provides opportunities for the non-AP stations to transmit, without the AP having polled them to know their needs for transmission. However, it suffers from various drawbacks.

It suffers from a low maximum efficiency of 37% (successfully used random RUs) to be compared to 37% of unused random RUs and 26% of random RUs with collisions.

The lost random RUs (either unused or collided) occur on large transmission durations (because transmitting non-AP stations have usually substantial amounts of data to transmit during UORA). This substantially decreases network efficiency.

A variant trigger frame to the basic trigger frame is the Null-Data-Packet (NDP) Feedback Report Poll (NFRP) trigger frame implementing the so-called Null-Data-Packet (NDP) Feedback Report procedure. This procedure allows the AP to collect feedback that is not channel sounding from multiple non-AP stations in a more efficient manner than with a basic trigger frame. The AP sends a NFRP Trigger frame to solicit NDP feedback report responses from many non-AP stations that are identified by a range of scheduled AIDs in the NFRP Trigger frame. The NDP feedback report response from a non-AP station is a HE trigger-based (TB) feedback NDP.

The procedure is short compared to the duration of an UL transmission triggered by a basic Trigger frame, mainly because the NDP in response is short. It also has a low and stable latency compared to conventional "Carrier Sense Multiple Access with Collision Avoidance" CSMA-CA mechanisms when used in dense environments.

However, the NDP Feedback Report procedure also suffers from some limitations.

For instance, it can address a limited set of (usually 18 or 36 for a 20 MHz wide operating band) continuous AIDs which may be punctured (some AIDs may not be assigned to non-AP stations or have been released when non-AP stations leave the AP during the lifetime of the network). The limited continuous set of AIDs is not adapted to the gathering of feedback responses from a high number of non-AP stations, i.e. per BSS basis.

SUMMARY OF INVENTION

The present invention seeks to overcome some of the foregoing concerns.

According to a first aspect of the invention, it is provided a communication method in a wireless network, comprising the following steps at a (non-AP) station:
 receiving, from an access point, AP, a null data packet, NDP, feedback report poll, NFRP, trigger frame, the NFRP trigger frame reserving a plurality of resource unit, RU, tone sets for NDP feedback report responses by stations,
 determining whether an association identifier, AID, field in the received NFRP trigger frame includes a predefined AID value defining a random access for the stations to the plurality of RU tone sets,
 in case of positive determination, randomly selecting a responding RU tone set from the plurality of RU tone sets, and
 sending a NDP feedback report response on the selected responding RU tone set.

Correspondingly, it is provided a communication method in a wireless network, comprising the following steps at an access point:
 sending, to (non-AP) stations, a null data packet, NDP, feedback report poll, NFRP, trigger frame, the NFRP trigger frame reserving a plurality of resource unit, RU, tone sets for NDP feedback report responses by stations, wherein an association identifier, AID, field in the NFRP trigger frame includes a predefined AID value defining a random access for the stations to the plurality of RU tone sets, and receiving, from at least one responding station, a NDP feedback report response on a responding RU tone set.

To keep compliance with current version of 802.11ax, the predefined AID value is preferably an AID outside the range of AIDs reserved for assignment to individual stations when the latter register to the AP.

As a consequence, it is possible to obtain at once (i.e. using only one NFRP trigger frame) feedback report responses from stations of a larger group of stations than the range of scheduled AIDs implemented in the known NDP Feedback Report procedure. This is made possible by offering random access to the RU tone sets while targeting the NFRP trigger frame to larger groups of stations.

Correlatively, it is also provided a communication device, either the AP or a non-AP station, comprising at least one microprocessor configured for carrying out the steps of any of the above methods.

Optional features of embodiments of the first aspect of the invention are defined in the appended claims. Some of these features are explained here below with reference to a method, while they can be transposed into device features.

In some embodiments, the determining step comprises determining whether the predefined AID value is reserved for stations not yet associated with the AP, e.g. predefined AID with value 2045. Not yet associated stations are not yet registered to the AP, i.e. they are not yet assigned with an individual AID. Consequently, the AP may easily obtain feedbacks from non-registered stations, for instance to subsequently provide MU opportunities for them to perform registration.

In other embodiments, the determining comprises determining whether the predefined AID value is one of
 a Basic Service Set Identifier, BSSID, index of a BSS to which the station belongs, and
 an AID targeting all the stations yet associated with the AP, e.g. with value 0 or 2047.

Consequently, the AP may easily implement BSS-based strategies, by obtaining feedbacks from stations of a specific BSS. It may also target all the stations registered, regardless of the multiple BSSs that can be implemented.

In some embodiments, the AID field is a Starting AID field as defined in Draft 4.1 of IEEE 802.11 ax. Consequently, the standardized format of the NFRP trigger frame can be kept.

Also, the predefined AID value may be outside a range of AIDs that the AP assigns to individual stations upon registration. Again, this keeps compliance with current 802.11 ax standard.

In some embodiments, the method may further comprise, at the station:
 receiving, from the AP, a subsequent trigger frame reserving a plurality of resource units, wherein a resource unit is assigned to the station based on an index of the responding RU tone set,
 responsive to the subsequent trigger frame, sending a trigger-based PPDU response on the assigned resource unit.

Correspondingly, the method may further comprise sending by the AP a subsequent trigger frame reserving a plurality of resource units, wherein a resource unit is assigned to the responding station using an index of the responding RU tone set. Up to nine responding stations may be targeted in the subsequent trigger frame per 20 MHz channel.

Preferably, the subsequent trigger frame only comprises resource units assigned to respective individual stations, i.e. without random RUs.

In this approach, the random access by the stations is moved from the conventional basic trigger frame to the NFRP trigger frame. It advantageously reduces the impact of unused random resource units on network efficiency because unused random resource units are lost for a shorter duration. The subsequent trigger frame assigns the RUs to specific stations that reported they have a need (i.e. not random RUs), thereby avoiding unused resource units for longer durations as in the known techniques.

In some embodiments, the method may further comprise, at the station, determining whether an AID associated with a resource unit in the subsequent trigger frame corresponds to an index of the selected responding RU tone set given a predefined offset value. The AID may be the sum of the index and the offset value. This makes it possible to target a specific one of the responding stations, although the AID of the responding station is not known (sometimes even not yet assigned).

In other embodiments, if the station also determines in the subsequent trigger frame a resource unit that has an associated AID corresponding to an AID assigned by the AP to the station, the station discards the resource unit with the AID corresponding to the index of the selected responding RU tone set to use the resource unit with the assigned AID to send the trigger-based PPDU response. In other words, the station gives priority to the RU with the assigned AID rather than the RU with the RU-tone-set-index-based AID. This helps to reduce risks of collision in the subsequent RUs. Indeed, if two non-AP stations collide on the same RU tone set during the short NDP Feedback Report procedure, only one will ultimately use the RU with the AID corresponding to the RU tone set index (the other one will use the other RU scheduled to its own AID).

This may be done by an appropriate ordering in the subsequent trigger frame given the station's behavior when processing the declared RUs. For instance, the subsequent trigger frame first declares all the resource units (it may be a single one) assigned to individual stations using an AID assigned by the AP to these individual stations upon registration, and then declares all resource units (may be a single one) assigned to responding stations using indexes of responding RU tone sets.

In some embodiments, the station is not yet associated with the AP and the trigger-based PPDU response is an association management frame. This may be any of probe, authentication, association requests as conventionally used for station registration/association. Consequently, the association procedure is speeded up for not yet registered stations.

In some embodiments, an AID associated with the resource unit in the subsequent trigger frame is built from the index of the responding RU tone set and from an offset value. This makes it possible to uniquely identify the responding stations while keeping compliant with the 802.11 ax standard where some range of AIDs are already used.

In other embodiments, the offset value is transmitted by the AP to the stations in a management frame, e.g. a beacon frame.

In yet other embodiments, the offset value is 2048 or above and is added to the index of the responding RU tone set to form the AID associated with the resource unit.

Consequently, the resulting AID is set outside the range of AID assigned by the AP to individual stations upon registration. This advantageously avoids any specific processing dedicated to such AIDs and allows such AIDs to be used simultaneously (e.g. in the same trigger frame) with conventional AIDs.

In yet other embodiments, the subsequent trigger frame is transmitted during a transmission opportunity, TXOP, reserved by the NFRP trigger frame.

In some embodiments, randomly selecting a responding RU tone set is based on a contention-based access method using a decrementing NFRP backoff, NBO, counter of the station. Use of NFRP backoff counters by the stations allows contention policy to be dynamically adjusted. The NFRP backoff counter may be a new backoff counter or an already existing 802.11 ax backoff counter, for instance the OFDMA backoff counter or OBO counter.

In specific embodiments, if the NBO counter is not greater than a number of RU tone sets in the NFRP trigger frame, the station randomly selects one of the RU tone sets (and may set the NBO counter to zero), otherwise the station decrements the NBO counter by the number of RU tone sets in the NFRP trigger frame. This may be repeated upon receiving each of successive NFRP trigger frames. Advantageously, this approach dynamically regulates the random access to the RU tone sets between the various stations.

In specific embodiments implementing NBO counter when a subsequent trigger frame is received, the method may further comprise, at the station, determining whether an acknowledgment of the trigger-based PPDU response is received from the AP, and in case of successful trigger-based PPDU response transmission, setting a NFRP contention window, NCW, to a predefined value, and initializing the NBO counter to an integer value randomly selected from a uniform distribution in the range 0 to NCW, and in case of unsuccessful trigger-based PPDU response transmission, updating the NCW to 2×NCW+1 when NCW is less than a predefined maximum value, and randomly selecting the NBO counter in the range of 0 and NCW.

Again, this approach dynamically regulates the random access to the RU tone sets between the various stations.

In some embodiments involving a subsequent trigger frame, the method may further comprise, at the AP, receiving a trigger-based PPDU response to the subsequent trigger frame, on the assigned resource unit, and obtaining an AID of the responding station using a MAC address retrieved from the received trigger-based PPDU response.

Consequently, the AP may use the received data (in the PPDU response) in an appropriate manner depending on the station concerned.

In some embodiments, a RU tone set of the plurality is made of two adjacent groups of tones, each group being made of non-adjacent tones, and the NDP feedback report response is transmitted on one of the two groups of tones. For instance, the stations may use one or the other group to indicate different response to a question associated with the NFRP trigger frame.

In variants, a RU tone set of the plurality is made of a group of non-adjacent tones. This makes it possible to double the number of RU tone sets available to the stations for random access in the NDP Feedback Report procedure according to the first aspect of the invention.

According to a second aspect of the invention, it is provided a communication method in a wireless network, comprising the following steps at a (non-AP) station:

receiving, from an access point, AP, a null data packet, NDP, feedback report poll, NFRP, trigger frame, the NFRP trigger frame defining a first range of association identifiers, AIDs, of stations authorized to access a plurality of resource unit, RU, tone sets for NDP feedback report responses, determining, from the NFRP trigger frame, an access scheme to the RU tone sets, when it is determined a random access to the RU tone sets, obtaining a scale factor from a range scaling field in the NFRP trigger frame, obtaining a second range of station AIDs from the first range and the scale factor, when an AID of the station is included in the second range, randomly selecting a responding RU tone set from the plurality of RU tone sets, and sending a NDP feedback report response on the selected responding RU tone set.

Correspondingly, it is provided a communication method in a wireless network, comprising the following steps at an access point:

sending, to (non-AP) stations, a null data packet, NDP, feedback report poll, NFRP, trigger frame, the NFRP trigger frame defining a first range of association identifiers, AIDs, of stations authorized to access a plurality of resource unit, RU, tone sets for NDP feedback report responses, wherein the NFRP trigger frame further includes an access type indication defining whether the RU tone sets are accessed on a random basis by the stations, and a range scaling field defining a scale factor to obtain, from the first range, a second range of AIDs of stations authorized to access the plurality of RU tone sets on the random basis, and receiving, from at least one responding station having an AID in the second range, a NDP feedback report response on a responding RU tone set.

Consequently, it is further provided a short random access procedure for the stations where the AP has control on the number of addressed stations. The AP can then optimize network efficiency for random access. This is achieved by adjusting the scale factor using the range scaling field, e.g. to current network conditions. For instance, the AP may appropriately adjust a ratio between the number of stations attending to access one of RU tone sets on a random basis and the number of RU tone sets reserved by the AP.

For illustrative purposes, the AP may have currently assigned only 20 AIDs to stations in the range of AIDs [45,80], where few stations have an AID in punctured subrange [45,62] and the majority of stations have an AID in subrange [63,80]. With the second aspect of the invention, for a NDP Feedback Report procedure, the AP may provide 18 RU tone sets (or any other number) for random access and allow a higher number of AIDs, for instance 36 in the range from 45 to 80, to access them. All the stations of the range (i.e. the 20 stations) will contend to access one of random access RU tone sets, which appear satisfactory usage of the RU tone sets. In sharp contrast, the known techniques can only address 18 stations of the range [45,62], thereby allowing few stations to use the RU tone sets. A number of such RU tone sets will remain unused, thereby drastically reducing network efficiency.

The second aspect of the invention also allows the current 802.11 ax formats to be kept.

Correlatively, it is also provided a communication device, either the AP or a non-AP station, comprising at least one microprocessor configured for carrying out the steps of any of the above methods.

Some of these features are explained here below with reference to a method, while they can be transposed into device features.

In some embodiments, determining an access scheme is based on
- a trigger type field in the NFRP trigger frame. This option advantageously keeps retro-compatibility with legacy stations that will ignore the new type of trigger frame, or
- a feedback type field in the NFRP trigger frame. This option advantageously makes it possible to keep the current version of the NFRP trigger frame, or
- a value of the range scaling field in the NFRP trigger frame. This option also makes it possible to keep the current version of the NFRP trigger frame and existing feedback types.

Correspondingly, from AP perspective, the access type indication is provided with a specific value in a trigger type field or a feedback type field or the range scaling field in the NFRP trigger frame.

In some embodiments where the range scaling field is used to signal the access scheme, a zero value in the range scaling field defines a scheduled access to the RU tone sets and a non-zero value in the range scaling field defines a random access to the RU tone sets. It means that the range scaling field conveys the access type indication. Of course, another value of the field could be used as a variant, for instance the highest possible value (given the number of bits forming the field).

In some embodiments, an access type indication defining an access scheme to the RU tone sets is separate from a Starting AID field defining the first AID of the first range.

In some embodiments, the scale factor equals $2^{RA\_SF}$, where RA_SF is a value of the range scaling field. This simplifies the computation of the scale factor for the stations. In addition, the particular zero value provides a scale factor of 1 ($2^0$) which can be easily exploited as an access type indication for scheduled access to the RU tone sets. Of course, other functions or correspondence schemes between RA_SF and the scale factor may be provided, for instance using correspondence tables.

In some embodiments, the second range corresponds to the first range rescaled by the scale factor. This means the range width (or size) is rescaled by the factor. For instance, the second range has the same starting AID as the first range with a range width multiplied by the scale factor. This makes it possible to keep the current meaning of fields in the NFRP trigger frames, while providing an easy-implemented computation process.

Preferably, the range scaling field is a two-bit or three-bit field. This allows 4 or 8 rescaling levels to be defined for AID range adjustment, or 3 or 7 rescaling levels if one value (e.g. zero value) is kept to signal the random access scheme. These options reduce the amount of bits to be processed. For illustrative purposes, a scale factor computed with a power of two makes it possible with 7 rescaling levels (i.e. only 3 bits) to provide a second range covering all the assignable AIDs for a mere 20 MHz channel ($18 \times 2^7 = 2304 > 2007$ assignable AIDs).

A two-bit range scaling field may be enough when the first range (and thus the number of RU tone sets) comprises a higher number of AIDs (for wider channels with or without MIMO). For instance, an 80 MHz channel with MIMO provides 144 RU tone sets. 4 rescaling levels may thus provide a second range covering all the assignable AIDs ($144 \times 2^4 = 2304 > 2007$ assignable AIDs). It turns that a bit length of the range scaling field may depend on a width the first range (i.e. depend on a channel bandwidth field "UL BW" and a multiplexing flag field specified in the NFRP trigger frame).

Of course, other bit lengths may be used to provide a higher number of rescaling levels.

In some embodiments, the range scaling field is included in a Reserved field of a User Info field of the NFRP trigger frame according to Draft 4.1 of IEEE 802.11ax. This approach keeps retro-compatibility because it keeps unchanged the other fields currently used In a variant, the range scaling field is included in a Trigger Dependent Common Info field of a Common Info field of the NFRP trigger frame according to Draft 4.1 of IEEE 802.11 ax.

In some embodiments, the responding station has an AID outside the first range. This shows benefits of the rescaling of the second aspect of the invention, as the AP now receives NDP responses from stations that would not be scheduled using conventional NFRP techniques.

In some embodiments, the method further comprises determining the NDP feedback report response to be sent depending on a feedback type field in the NFRP trigger frame. This allows the responding station to appropriately use the tones in the randomly selected RU tone set.

In some embodiments, the first range includes the same number of AIDs as the number of RU tone sets in the plurality. This may advantageously correspond to the conventional signaling in a NFRP trigger frame itself. For instance, the first range is (determined from) defined by fields in the NFRP trigger frame, including a starting AID field, a channel bandwidth field and a multiplexing flag field. All these fields are those defined in Draft 4.1 of IEEE 802.11 ax.

In some embodiments, the method further comprises, when it is determined a scheduled access to the RU tone sets, selecting a responding RU tone set from the plurality of RU tone sets based on the position of an AID of the station within the first range. The station is thus able to respond to the NFRP trigger frame for both access schemes, scheduled or random, to the RU tone sets.

In some embodiments, the method may further comprise, at the station:
- receiving, from the AP, a subsequent trigger frame reserving a plurality of resource units, wherein a resource unit is assigned to the station based on an index of the responding RU tone set,
- responsive to the subsequent trigger frame, sending a trigger-based PPDU response on the assigned resource unit.

Correspondingly, the method may further comprise sending by the AP a subsequent trigger frame reserving a plurality of resource units, wherein a resource unit is assigned to the responding station using an index of the responding RU tone set. Up to nine responding stations may be targeted in the subsequent trigger frame per 20 MHz channel.

In this approach, the random access by the stations is moved from the conventional basic trigger frame to the NFRP trigger frame. It advantageously reduces the impact of unused random resource units on network efficiency because unused random resource units are lost for a shorter duration. The subsequent trigger frame assigns the RUs to specific stations that reported they have a need (i.e. not random RUs), thereby avoiding unused resource units for longer durations as in the known techniques.

In some embodiments, randomly selecting a responding RU tone set is based on a contention-based access method using a decrementing NFRP backoff, NBO, counter of the station. Use of NFRP backoff counters by the stations allows contention policy to be dynamically adjusted. The NFRP backoff counter may be a new backoff counter or an already existing 802.11 ax backoff counter, for instance the OFDMA backoff counter or OBO counter.

In specific embodiments, if the NBO counter is not greater than a number of RU tone sets in the NFRP trigger frame, the station randomly selects one of the RU tone sets (and may set the NBO counter to zero), otherwise the station decrements the NBO counter by the number of RU tone sets in the Trigger frame. This may be repeated upon receiving each of successive NFRP trigger frames. Advantageously, this approach dynamically regulates the random access to the RU tone sets between the various stations.

In specific embodiments implementing NBO counter when a subsequent trigger frame is received, the method may further comprise, at the station, determining whether an acknowledgment of the trigger-based PPDU response is received from the AP, and
  in case of successful trigger-based PPDU response transmission, setting a NFRP contention window, NCW, to a predefined value, and initializing the NBO counter to an integer value randomly selected from a uniform distribution in the range 0 to NCW, and
  in case of unsuccessful trigger-based PPDU response transmission, updating the NCW to 2×NCW+1 when NCW is less than a predefined maximum value, and randomly selecting the NBO counter in the range of 0 and NCW.

Again, this approach dynamically regulates the random access to the RU tone sets between the various stations.

According to a third aspect of the invention, it is provided a communication method in a wireless network, comprising the following steps at a (non-AP) station:
  receiving, from an access point, AP, a null data packet, NDP, feedback report poll, NFRP, trigger frame, the NFRP trigger frame reserving a plurality of resource unit, RU, tone sets for NDP feedback report responses by stations, each RU tone set comprising multiple (usually separate) groups of tones (conventionally used for multiple respective values of the NDP feedback report responses),
  determining whether the received NFRP trigger frame provides random access to the RU tone sets,
  in case of positive determination, randomly selecting a responding RU tone set from the plurality of RU tone sets, randomly selecting one of the groups of tones in the selected responding RU tone set, and sending a NDP feedback report response using the selected group of tones in the selected responding RU tone set.

It is possible to obtain at once (i.e. using only one NFRP trigger frame) feedback report responses from stations of a larger group of stations than the range of scheduled AIDs implemented in the known NDP Feedback Report procedure. This is made possible by offering random access to the RU tone sets while targeting the NFRP trigger frame to larger groups of stations.

Correspondingly, it is provided a communication method in a wireless network, comprising the following steps at an access point, AP:
  receiving null data packet, NDP, feedback report responses from stations responding to a NDP feedback report poll, NFRP, trigger frame, each NDP feedback report response being conveyed by one (single) group of tones in a responding RU tone set,
  determining collision in a responding RU tone set where two or more groups of tones of the responding RU tone set convey NDP feedback report responses.

By providing the groups of tones (i.e. FEEDBACK_STATUS value) to random selection by the non-AP stations, the third aspect of the invention makes it possible for the AP to detect half or more (depending on the number of tone groups per RU tone sets) of the collisions occurring on the responding RU tone sets.

The AP may thus provide a subsequent transmission opportunity for (only) responding stations of responding RU tone sets in which no collision is detected by the AP. The stations of the tone sets detected as collided are not scheduled in that case, thus reducing risks of collisions in the subsequent transmission opportunity. Consequently, network efficiency is increased. Of course, the AP may use the collision detection result to other purposes.

Correlatively, it is also provided a communication device, either the AP or a non-AP station, comprising at least one microprocessor configured for carrying out the steps of any of the above methods.

Optional features of embodiments of the third aspect of the invention are defined here below with reference to a method, while they can be transposed into device features.

In some embodiments, the determining step comprises determining whether an association identifier, AID, field in the received NFRP trigger frame includes a predefined AID value defining a random access for the stations to the plurality of RU tone sets. To keep compliance with current version of 802.11ax, the predefined AID value is preferably an AID outside the range of AIDs reserved for assignment to individual stations when the latter register to the AP.

In some embodiments, the determining step comprises determining whether the predefined AID value is one of:
  an AID reserved for stations not yet associated with the AP, e.g. predefined AID with value 2045. Not yet associated stations are not yet registered to the AP, i.e. they are not yet assigned with an individual AID. Consequently, the AP may easily obtain feedbacks from non-registered stations, for instance to subsequently provide MU opportunities for them to perform registration. In some embodiments, the AID field is a Starting AID field as defined in Draft 4.1 of IEEE 802.11 ax. Consequently, the standardized format of the NFRP trigger frame can be kept. Also, the predefined AID value may be outside a range of AIDs that the AP assigns to individual stations upon registration. Again, this keeps compliance with current 802.11 ax standard,
  a Basic Service Set Identifier, BSSID, index of a BSS to which the station belongs, and
  an AID targeting all the stations yet associated with the AP, e.g. with value 0 or 2047.
  Consequently, the AP may easily implement BSS-based strategies, by obtaining feedbacks from stations of a specific BSS. It may also target all the stations registered, regardless of the multiple BSSs that can be implemented.

In some embodiments, the determining step is based on a trigger type field in the NFRP trigger frame. This option advantageously keeps retro-compatibility with legacy stations that will ignore the new type of trigger frame.

In other embodiments, the determining step is based on a feedback type field in the NFRP trigger frame. This option advantageously makes it possible to keep the current format of the NFRP trigger frame.

In other embodiments, the determining step is based on a dedicated random-access signaling field in a User Info field of the NFRP trigger frame according to Draft 4.1 of IEEE 802.11 ax, e.g. in a Reserved field of the User Info field.

In some embodiments, the method may further comprise, at the station, determining whether an association identifier, AID, of the station belongs to a polling range of AIDs polled by the NFRP trigger frame, wherein the polling range is defined by fields in the NFRP trigger frame, including a Starting AID field, a channel bandwidth field and a multiplexing flag field. This approach matches the current 802.11 ax signaling of the polled stations.

In a variant, the method may further comprise, at the station, determining whether an association identifier, AID, of the station belongs to a group of AIDs polled by the NFRP trigger frame, wherein the group of polled AIDs is defined by a sole Starting AID field in the NFRP trigger frame. This may be above-mentioned value 0 or 2047 (for all registered stations), 2045 (for all not-yet-registered stations), any BSSID index (to poll the stations of a given BSS).

In some embodiments, the method may further comprise, at the station, determining whether the received NFRP trigger frame indicates random access at tone group level, where randomly selecting one of the groups of tones in the selected responding RU tone set is performed only in case it is determined that the received NFRP trigger frame indicates random access at tone group level. This makes it possible for the AP to control when the non-AP stations have to perform the two random selection steps or only the first one, to randomly access the RU tone sets. Correspondingly, at the AP, the method further comprises previously sending, to (non-AP) stations, a NFRP trigger frame reserving a plurality of resource unit, RU, tone sets for NDP feedback report responses by stations, wherein the NFRP trigger frame includes:
a RU tone set access type indication defining whether the RU tone sets are accessed on a random basis by the stations, and
a tone group access type indication defining whether the groups of tones in a responding RU tone set are accessed on a random basis by the stations.

The tone group access type indication may be a dedicated tone group random-access signaling flag in a User Info field of the NFRP trigger frame according to Draft 4.1 of IEEE 802.11 ax, e.g. in a Reserved field of the User Info field. Retro-compatibility is kept with current format of the NFRP trigger frame. In a variant, it may be implemented in a feedback type field of the NFRP trigger frame.

In some embodiments, the method may further comprise, at the station:
receiving, from the AP, a subsequent trigger frame reserving a plurality of resource units, wherein a resource unit is assigned to the station based on an index of the responding RU tone set,
responsive to the subsequent trigger frame, sending a trigger-based PPDU response on the assigned resource unit.

Correspondingly, the method may further comprise sending by the AP a subsequent trigger frame reserving a plurality of resource units (RU), wherein a resource unit is assigned to a responding station using an index of a responding RU tone set in which no collision is detected by the AP. Up to nine responding stations of RU tone sets not detected as collided may be targeted in the subsequent trigger frame per 20 MHz channel. None RU is provided for collided RU tone sets. This is to avoid having again collision on this RU.

In this approach, the random access by the stations is moved from the conventional basic trigger frame to the NFRP trigger frame. It advantageously reduces the impact of unused random resource units on network efficiency because unused random resource units are lost for a shorter duration. The subsequent trigger frame assigns the RUs to specific stations that reported they have a need (i.e. not random RUs), thereby avoiding unused resource units for longer durations as in the known techniques.

According to a fourth aspect of the invention, it is provided a communication method in a wireless network, comprising the following steps at a (non-AP) station:
receiving, from an access point, AP, a null data packet, NDP, feedback report poll, NFRP, trigger frame, the NFRP trigger frame reserving a plurality of resource unit, RU, tone sets for NDP feedback report responses by stations,
selecting a responding RU tone set from the plurality of RU tone sets,
sensing the selected responding RU tone set during a sensing period in which other stations are supposed (i.e. allowed) to send NDP feedback report responses to the NFRP trigger frame,
sending a NDP feedback report response on the selected responding RU tone when the latter is sensed idle during the sensing period.

A priority mechanism is therefore introduced where the non-AP station, which is not given priority, determines whether another non-AP station, which is given priority, already use the selected TU tone set. By deferring the use of the network by one non-AP station for the sensing period, the mechanism avoids the two non-AP station to simultaneously start using the same RU tone set, hence reduces risks of collision. Network efficiency is therefore improved.

Correspondingly, it is also provided a communication method in a wireless network, comprising the following steps at an access point:
sending, to (non-AP) stations, a null data packet, NDP, feedback report poll, NFRP, trigger frame, the NFRP trigger frame reserving a plurality of resource unit, RU, tone sets for NDP feedback report responses by stations, and
receiving NDP feedback report responses on respective responding RU tone sets,
wherein the AP starts receiving a first NDP feedback report response on a first responding RU tone set after an idle period (a sensing period for the corresponding responding station) during which the first responding RU tone set is idle and at least one other NDP feedback report response is received on another responding RU tone set.

Correlatively, it is also provided a communication device, either the AP or a non-AP station, comprising at least one microprocessor configured for carrying out the steps of any of the above methods.

Optional features of embodiments of the fourth aspect of the invention here below with reference to a method, while they can be transposed into device features.

In some embodiments, the method further comprises, at the station, determining a level of priority of the station to respond to the NFRP trigger frame, and performing the sensing only when it is determined a low level of priority. The non-AP stations can then take into account a current priority level if the latter is liable to evolve over time. Of course, in a variant where the priority of the non-AP station does not change, it may always sense the selected RU tone set without determining any level of station priority.

According to a feature, when it is determined a high level of priority of the station, the method further comprises, at the station, sending the NDP feedback report response on the selected responding RU tone as from the beginning of the sensing period. This means without sensing the selected responding RU tone during the sensing period. Other low-priority non-AP stations are then able to detect this feedback response on the RU tone set to avoid sending in turn their own feedback responses on the same RU tone set.

In some embodiments, the priority level of the station is based on a (EDCA) traffic access category having a non-empty buffer. This approach makes it possible to define the station priorities based on the type of data the non-AP stations have to send, and thus prioritize low latency traffics. For instance, buffered AC_VO and AC_VI data may define a high-priority non-AP station while buffered AC_BE and AC_BK data may define a low-priority non-AP station that will access an RU tone set only if no high-priority non-AP station has previously access it in response to the NFRP trigger frame. As the EDCA traffic ACs are already ordered by priority in 802.11 DCF (Distributed Coordination Function), the traffic AC to be taken into account may be the non-empty one having the highest 802.11 ax priority.

According to a specific feature, the traffic access category is the non-empty traffic access category having the lowest (EDCA) backoff counter from amongst a plurality of traffic access categories having each one a respective backoff counter decremented over time. This approach fulfils the EDCA prioritization scheme.

In other embodiments, the priority level of the station is based on an AID of the station. Some AIDs (e.g. a reserved range of AIDs) may be known as high-priority AID, while others are considered as low-priority AIDs. The priority may be defined by the value of one or more bits of the 12-bit AIDs. As an example, the x LSBs (least significant bits) should match a priority pattern; for instance, the LSB=1 to have half of high-priority AIDs, or the two LSBs=11 to have a quarter of high-priority AIDs, or the three LSBs=111 to have an eighth of high-priority AIDs, and so on.

The NFRP trigger frame may also target a continuous set of AIDs and schedule two or more non-AP stations per RU tone set. In this variant, the one with the lowest (or highest) AID may be considered as the high-priority one, and the others as low-priority ones.

In some embodiments, the method further comprises, at the station, retrieving a priority enablement flag from the NFRP trigger frame, and performing the sensing only if the priority enablement flag is enabled. This allows the AP to decide (through signaling) at NFRP trigger frame level when the priority mechanism according to the fourth aspect of the invention is to be applied by the non-AP stations.

From AP perspective, a communication method in a wireless network comprises the following steps:
  generating a NFRP trigger frame reserving a plurality of resource unit, RU, tone sets for NDP feedback report responses by stations,
  determining whether low-priority stations have to sense a selected responding RU tone set during a sensing period in which high-priority stations are supposed to send NDP feedback report responses to the NFRP trigger frame,
  setting a priority enablement flag in the NFRP trigger frame depending on the outcome of the determining step, and
  sending, to stations, the NFRP trigger frame.

In some embodiments, if the priority enablement flag is disabled, sending the NDP feedback report response on the selected responding RU tone as from the beginning of the sensing period. This means without sensing the selected responding RU tone during the sensing period.

In one embodiment, the priority enablement flag is included in a Reserved field of a User Info field of the NFRP trigger frame according to Draft 4.1 of IEEE 802.11 ax. This approach keeps retro-compatibility because it keeps unchanged the other fields currently used.

In a variant, the priority enablement flag is included in a Trigger Dependent Common Info field of a Common Info field of the NFRP trigger frame according to Draft 4.1 of IEEE 802.11 ax.

In yet another variant, the priority enablement flag is defined by a feedback type field in the NFRP trigger frame. This approach keeps compliance with the current format of the NFRP trigger frame as various values for the 802.11 ax Feedback Type field are available for new usages. For instance, feedback type field=1 may upgrade the conventional feedback type field=0 (polling of resource request function of buffered bytes) by differentiating the station behavior between high-priority ones and low-priority ones (which have to sense the selected RU tone set).

In some embodiments, the sensing period comprises at least a preamble period (following the NFRP trigger frame) during which the other stations are supposed to simultaneously transmit a PHY preamble of their NDP feedback report responses. Preamble of a NDP feedback report responses is made of various symbols such a well-known L-STF, L-LTF, L-SIG, RL-SIG, HE-SIG-A and HE-STF fields according to 802.11ax. It is usually transmitted over a (20 Mhz) channel formed of the plurality of RU tone sets. Therefore, the duration of the preamble period is defined in 802.11 ax and known by all the stations.

In some embodiments, if no PHY preamble is sensed on the selected responding RU tone during the preamble period, the sent NDP feedback report response includes a PHY preamble. This makes it possible for the AP to know the response is a NDP feedback report response, as no PHY preamble has been sent by any other station during the conventional preamble period. All the stations that sense during the preamble period start transmitting the PHY preamble of their responses simultaneously as from the end of the preamble period. This ensures alignment of the PHY preamble all over the (20 MHz) channel.

In some embodiments, if a PHY preamble is sensed on the selected responding RU tone during the preamble period, the sensing period further comprises an energy sensing period immediately following the preamble period, and if the selected responding RU tone set is sensed as idle during the energy sensing period, sending the NDP feedback report response includes transmitting only energy, without PHY preamble, on the selected responding RU tone set. This saves process at the station while changing nothing for the AP since the latter has already received a PHY preamble valid for the plurality of RU tone sets. One understands that the selected responding RU tone set is sensed during the energy sensing period only if a PHY preamble is sensed on the selected responding RU tone during the preamble period.

In some embodiments, the energy sensing period lasts a backoff time, i.e. 9 ms in 802.11 ax D4.1. This ensures the NFRP procedure to remain as short as in 802.11ax, although a priority mechanism has been added.

In some embodiments, the method further comprises determining, from the NFRP trigger frame, that the RU tone sets are accessed on a random basis, wherein selecting the responding RU tone set comprises randomly selecting the responding RU tone set from the plurality of RU tone sets. The priority mechanism according to the fourth aspect of the invention is well suitable to random RU tone sets where risks of collision exist.

For instance, the determining step comprises determining whether an association identifier, AID, field (such as the Starting AID field as defined in Draft 4.1 of IEEE 802.11 ax) in the received NFRP trigger frame includes a predefined AID value, e.g. 0, defining a random access for the stations to the plurality of RU tone sets.

The invention further relates to a non-transitory computer-readable medium storing a program which, when executed by a microprocessor or computer system in a communication device, causes the communication device to perform any method as defined above.

The non-transitory computer-readable medium may have features and advantages that are analogous to those set out above and below in relation to the communication methods and devices.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings.

FIGS. 6a and 6b illustrate, using flowcharts, general steps at the access point and at a non-AP station, respectively, corresponding to first embodiments;

FIGS. 14a and 14b illustrate, using flowcharts, general steps at the access point and at a non-AP station, respectively, corresponding to the third embodiments;

DETAILED DESCRIPTION

The invention will now be described by means of specific non-limiting exemplary embodiments and by reference to the figures.

In the description, the term legacy refers to non-802.11ax stations, meaning 802.11 stations of previous technologies that do not support OFDMA communications.

Figure 1:
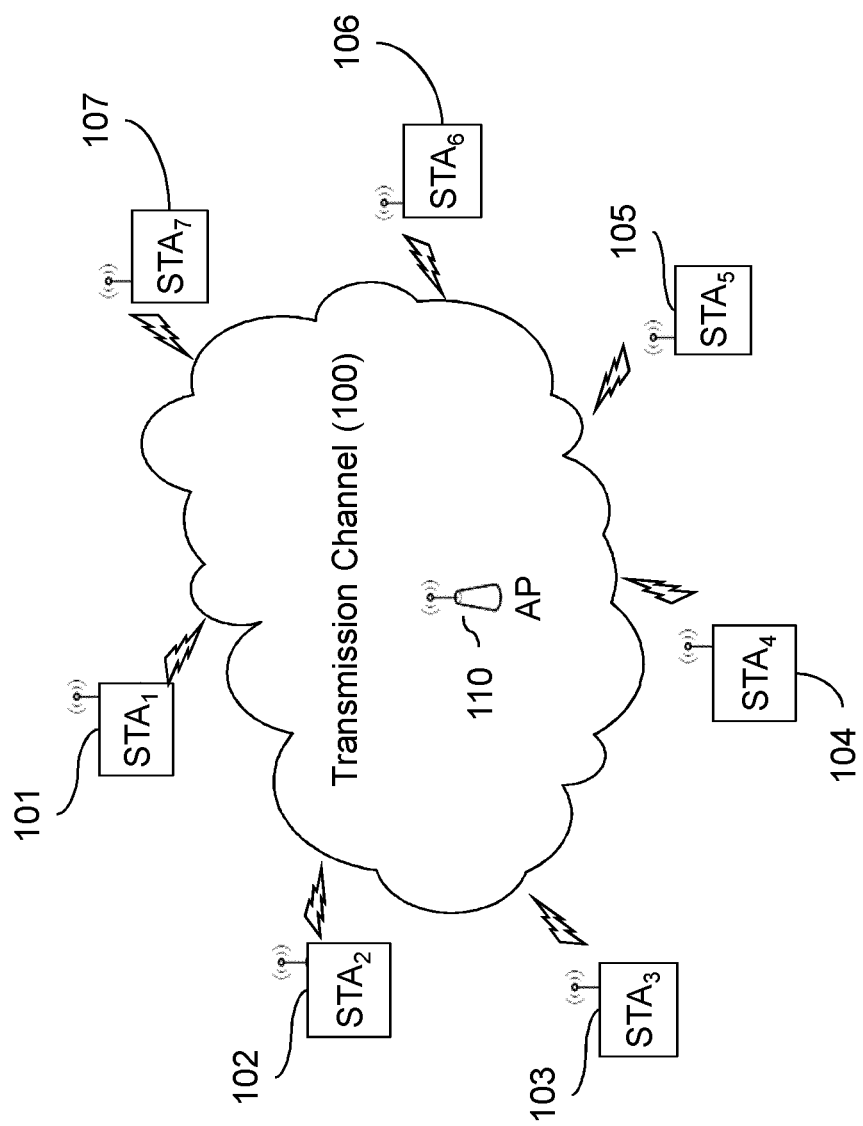
FIG. 1 illustrates a communication system in which embodiments of the invention may be implemented.

FIG. 1 illustrates a communication system in which several communication stations (or "nodes") 101-107 exchange data frames over a radio transmission channel 100 of a wireless local area network (WLAN), under the management of a central station, or access point (AP) 110, also seen as a station of the network. The radio transmission channel 100 is defined by an operating frequency band constituted by a single channel or a plurality of channels forming a composite channel.

In the following, the word "station" refers to any kind of station. The wording "access point station", or in short "access point" (AP), refers to the station playing the role of access point 110. The wording "non-access point station", or in short "non-AP station", or client station (STA) refers to the other stations 101-107. In the following, the terms HE STA and HE AP refer respectively to an 802.11 ax non-AP STA and an 802.11 ax AP.

The wireless communication system of FIG. 1 comprises physical access point 110 configured to manage the WLAN BSS (Basic Service Set), i.e. a group of non-AP stations which have previously registered to the AP.

A physical access point 110 may be configured to manage two or more WLANs (or BSSs), i.e. two or more groups of station. Each BSS is uniquely identified by a specific basic service set identifier, BSSID, and managed by a virtual AP implemented in the physical AP. A MAC address of the virtual AP is used as BSSID. Generally, the MAC addresses for the virtual APs are generated based on (or "derive from") a base MAC address specific to the physical access point, usually the base 48-bit MAC address of AP 110.

Within the context of a multiple BSSID set, one virtual AP is referred to as the 'transmitted BSSID' (only one per the multiple set) if the AP emits beacon frames. Each other virtual AP belonging to the multiple BSSID set is referred to as a 'non-transmitted BSSID'. The beacon frame includes the basic profiles and each profile elements that are mandatory for the non-transmitted BSSID. A BSSID Index is a value that identifies the non-transmitted BSSID, where value is a nonzero.

Conventional single-user transmission can occur on at least a primary 20 MHz channel (used for contention) and some secondary 20 MHz channels: The resulting bandwidth of an operating channel may be e.g. 20 MHz, 40 MHz, 80 MHz, 80+80 MHz, or 160+160 MHz, or 320 MHz. The channels may include one or more subcarriers or tones, for instance a 20 MHz channel is made of 242 tones.

Management of quality of service (QoS) has been introduced at station level in the wireless networks, through well-known EDCA mechanism defined in the IEEE 802.11e standard. EDCA (Enhanced Distributed Channel Access) mechanism defines four traffic access categories (ACs) or «priorities» to manage access to the medium: a voice access category (AC_VO), a video access category (AC_VI), a best effort access category (AC_BE) for standard applications and a background access category (AC_BK) when traffic is low.

Developments in the 802.11ax standard seek to enhance efficiency and usage of the wireless channel for dense environments.

In this perspective, multi-user (MU) transmission features have been considered that allow multiple simultaneous transmissions to/from different non-AP stations in both downlink (DL) and uplink (UL) directions from/to the access point. In the uplink, multi-user transmissions can be used to mitigate the collision probability by allowing multiple non-AP stations to simultaneously transmit to the AP.

To actually perform such multi-user transmission, it has been proposed to split a legacy 20 MHz channel into at least one subchannel, but preferably a plurality of sub-channels (elementary sub-channels), also referred to as sub-carriers or resource units (RUs) or "traffic channels", that are shared in the frequency domain by multiple users, based for instance on Orthogonal Frequency Division Multiple Access (OFDMA) technique. In some embodiments, the bandwidth of the RUs may be based on a number of active data subcarriers. In some embodiments, the bandwidth of the RUs is based on 26, 52, 106, 242 (a whole 20 MHz channel), 484 (40 MHz channel), 996 (80 MHz channel), or 2×996 (80+80 MHz or 160 MHz channel) active data subcarriers or tones.

While the MU DL transmission is fully managed by the AP, the MU UL transmission requires the AP sends a control frame to non-AP stations to trigger the simultaneous MU UL transmissions from the non-AP stations. Such control frame is known as a Trigger Frame (TF), various variants of which exist depending on the usage of the MU UL sub-carriers desired by the AP.

Figure 2:
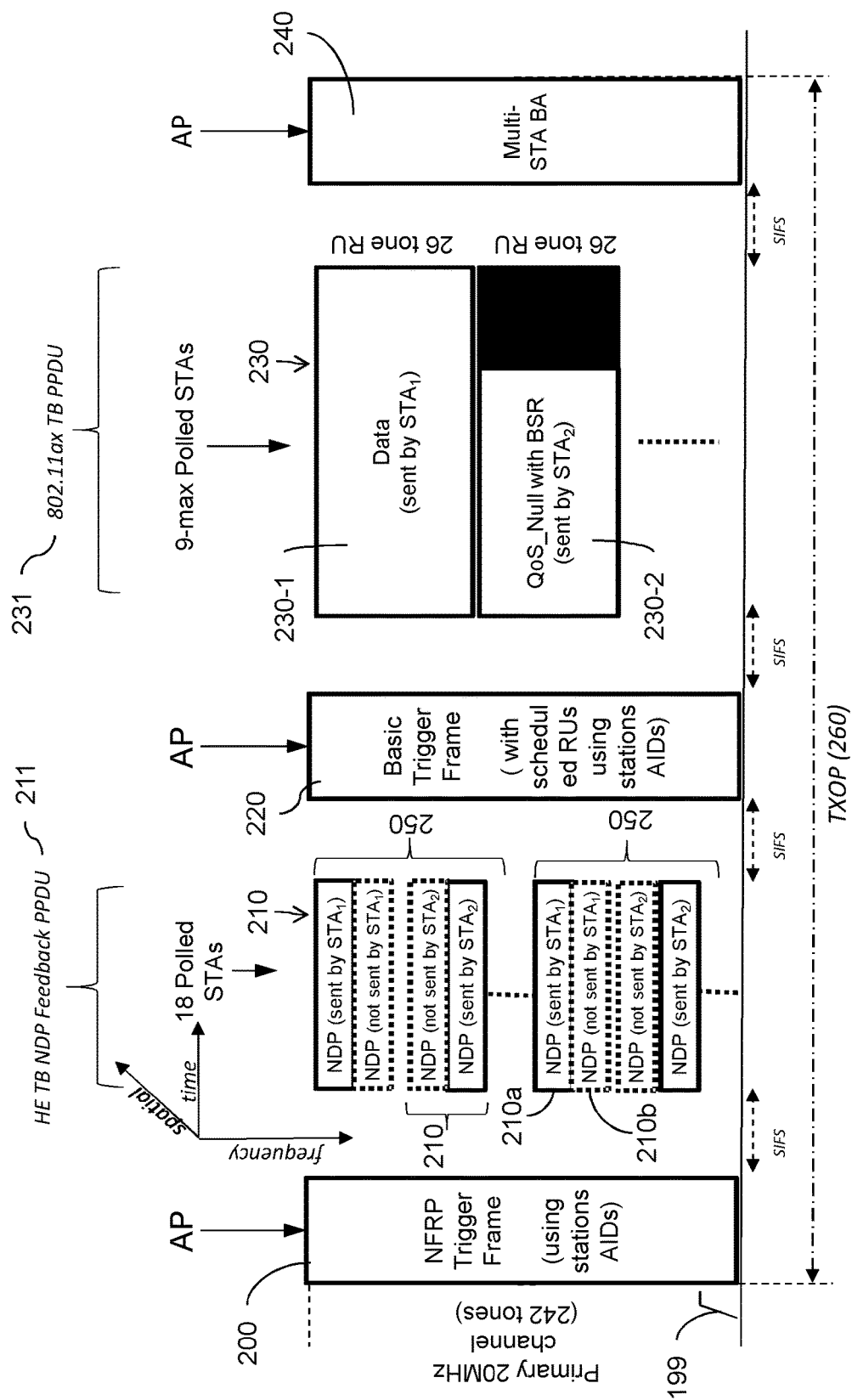
FIG. 2 illustrates two usages of trigger frames.

FIG. 2 illustrates two usages of trigger frames. In the exemplary embodiment shown, a short feedback report procedure according to 802.11ax (as described in section "26.5.7 NDP feedback report procedure" of Draft D4.1 of IEEE 802.11ax) is shown followed by an UL MU operation (as described in section "26.5.2 UL MU operation" of Draft D4.1 of IEEE802.11ax) based on the results of the short feedback report procedure.

The NDP feedback report procedure allows the AP 110 to collect feedback that is not channel sounding from multiple non-AP STAs 101-107. The AP sends an NFRP Trigger frame to solicit NDP feedback report response from many non-AP STAs that are identified by a range of scheduled AIDs ("802.11 ax range" in the following description) in the NFRP Trigger frame. A non-AP STA uses the information carried in the NFRP Trigger frame to know if it is scheduled, and in this case, may send a NDP feedback report response, usually a HE TB feedback NDP.

Next, based on the received NDP feedback report responses, the AP may, using UL MU operation, solicit simultaneous immediate response frames from one or more of the responding non-AP STAs.

Figure 2A:
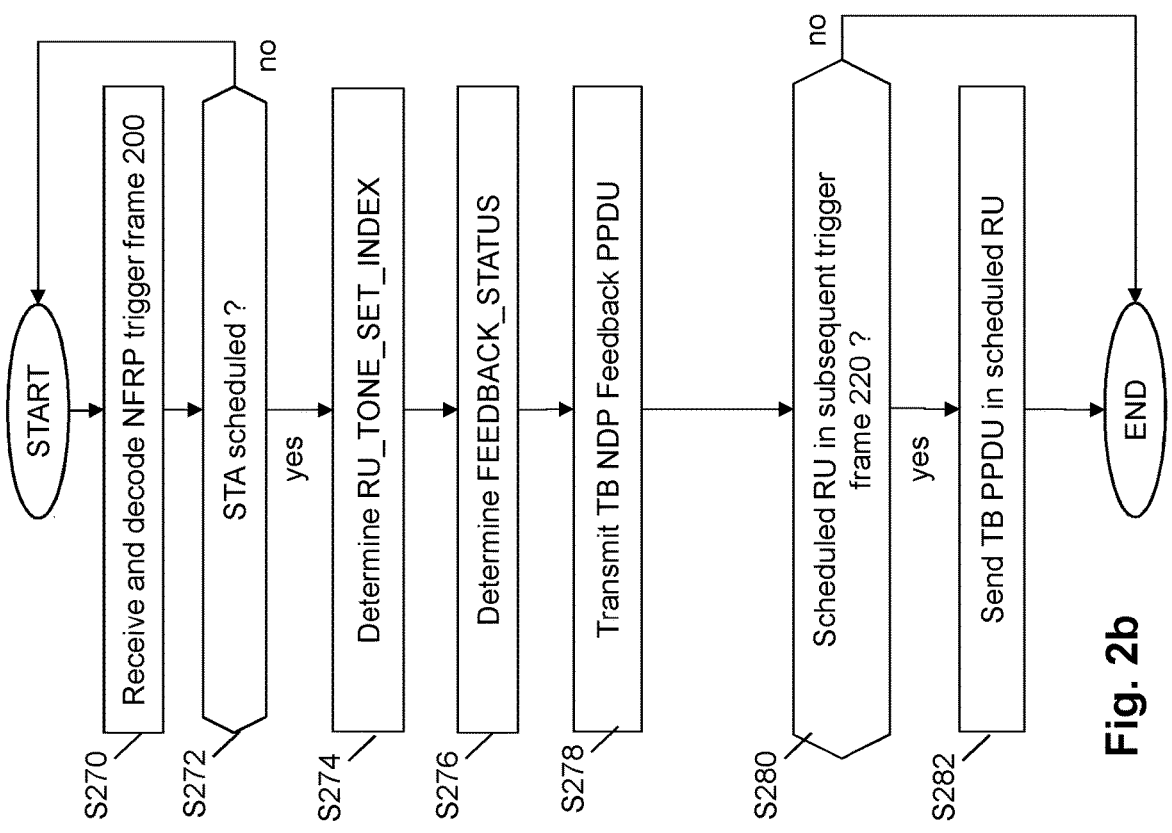
FIGS. 2a and 2b illustrate, using flowcharts, corresponding general steps at the access point and at a non-AP station, respectively.
Figure 2B:
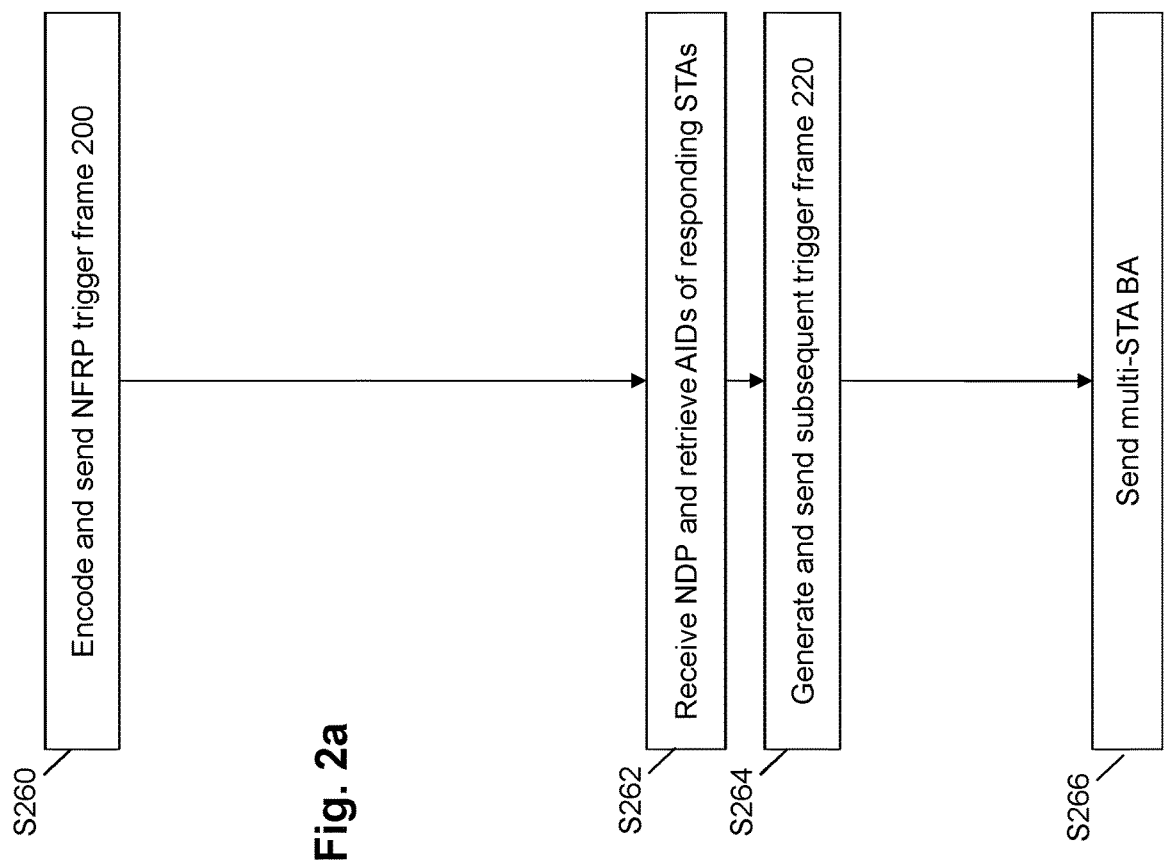

The example shown considers a single 20 MHz channel. Of course, the bandwidth of the channel and the number of RUs splitting a 20 MHz channel may be different from what is depicted. FIGS. 2a and 2b illustrate, using flowcharts, corresponding general steps at the AP and a non-AP STA, respectively.

The scenario begins at phase 199 wherein the AP 110 accesses the wireless medium to poll non-AP stations using a feedback short procedure. For example, the AP performs a contention-based method (which may include a clear channel assessment and an EDCA backoff) to acquire access to the wireless medium.

Upon accessing the medium, the AP 110 polls non-AP STAs to know their needs for transmission. To do so, it sends an NFRP trigger frame 200 which is a specific trigger frame. It identifies non-AP STAs by an 802.11 ax range of scheduled AIDs. This is step S260 of FIG. 2a.

At preliminary step S259 (not shown) may be performed by the AP to determines NFRP parameters values for NFRP trigger frame 200 to be sent.

Figure 3A:
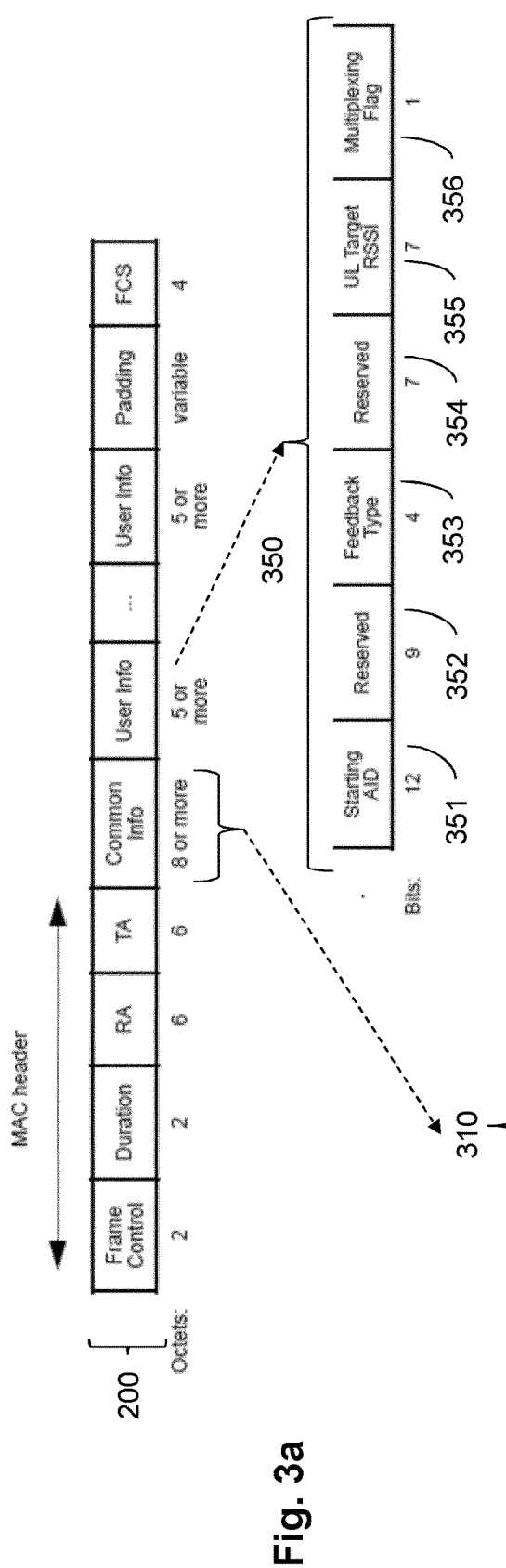
FIG. 3a illustrates the format of a trigger frame, in particular of NFRP type.

With reference to FIG. 3a, like each and every 802.11ax trigger frame, NFRP trigger frame 200 comprises:

a frame header with a standardized "Frame Control" field, a standardized "Duration" field, an "RA" field set to a broadcast MAC address, and a "TA" field set to a MAC address of the AP transmitting the trigger frame, a "Common Info" field 310, one or more "User Info" fields 350, and padding and FCS fields.

The "Common Info" field 310 comprises a "Trigger Type" subfield 320 which specifies the type of the trigger frame. For instance, NFRP trigger frame 200 is signaled by a value 7 in the "Trigger Type" subfield 320. It also comprises a 2-bit "UL BW" field 330 specifying the bandwidth of the channel considered, e.g. BW=0 to define a 20 MHz bandwidth, BW=1 for a 40 MHz bandwidth, BW=2 for an 80 MHz bandwidth, BW=3 for an 80+80 MHz or 160 MHz bandwidth (see Table 9-31c of the D4.1 version of 802.11 ax). It ends by a Trigger Dependent Common Info subfield 340 of variable length whose content depends on the "Trigger Type" subfield 320. The other fields shown are of less importance for the present invention.

Specific to the trigger frame of NFRP type, a single "User Info" field 350 is provided that comprises a 12-bit Starting AID field 351, a first reserved 9-bit portion 352, a 4-bit feedback type field 353, a second reserved 7-bit portion 354, a 7-bit UL Target RSSI field 355 and a 1-bit multiplexing flag field 356.

The Starting AID comprises the starting AID of the 802.11 ax range of AIDs targeted by the NFRP trigger frame 200, i.e. scheduled to respond to the poll. The range size or width $N_{STA}$ is defined by the "UL BW" field 330 together with the 1-bit multiplexing flag field 356, using the following formula $$N_{STA}=18\times 2^{BW}\times (\text{MultiplexingFlag}+1)$$

For instance, when the MultiplexingFlag is set to 0 (no MIMO), 18 non-AP STAs are requested to answer with a feedback response, per 20 MHz operating channel. When the MultiplexingFlag is set to 1, 36 non-AP STAs are scheduled per 20 MHz operating channel. It may be noted that some AIDs in the 18 or 36-wide range may not be currently assigned to a non-AP STA.

The multiplexing flag field 356 defines whether spatiality (MIMO) is provided: the flag indicates the number (minus 1) of non-AP STAs that are multiplexed on the same set of tones in the same RU.

The "feedback type" field 353 indicates a type of feedback that is being polled by the AP. For the time being, 802.11ax D4.1 only defines a feedback type equal to 0 that is a resource request. The corresponding polling thus seeks to know whether the responding non-AP STAs 101-107 are requesting UL resources to transmit PPDUs to the AP 110.

At step S259, the AP may determine the values for StartingAID field 351, Feedback Type field 353, Multiplexing Flag field 356 and UL BW field 330 and builds the NFRP trigger frame 200.

In the example of FIG. 2, the NFRP trigger frame 200 is sent (step S260) in a 20 MHz primary channel. However, as already discussed, the NFRP trigger frame 200 may also be sent through an extended channel such as 40 MHz, 80 MHz or larger bands to extend the number of polled stations. By sending trigger frame 200, the AP reserves a transmission opportunity 260 (TXOP) corresponding to the duration specified inside the NFRP trigger frame.

If the NFRP trigger frame is sent over an overall width larger than the primary 20 MHz channel, the 802.11 ax standard envisages that the NFRP trigger frame is duplicated (replicated) on each other 20 MHz channel forming the targeted composite channel. Thanks to the duplication of control-type frames in non-HT format, it is expected that every nearby legacy node (non-HT or 802.11 ac nodes) receiving the NFRP trigger frame (or a duplicate thereof) on its primary channel, then sets its NAV to the value specified in the NFRP trigger frame. This prevents these legacy nodes from accessing the channels of the targeted composite channel during the TXOP.

Each non-AP STA receiving frame 200 is able to first analyze the received frame 200 to determine whether the non-AP STA is concerned with it, in particular to determine whether the non-AP STA is associated with the BSSID indicated in the TA field of the frame (or if the indicated BSSID pertains to a multiple BSSID set for which the non-AP STA is member of).

In case of positive determination, it then determines whether received frame 200 is a NFRP trigger frame, thanks to the type specified in Trigger Type field 320. These determinations form step S270 (FIG. 2b).

Next, the non-AP STA determines whether it is scheduled by the received NFRP trigger frame (step S272). It is made by checking whether its AID value (assigned to the non-AP STA by the AP upon registration to the AP) falls within the 802.11 ax range ["Starting AID"; "Starting AID"+$N_{STA}$] as obtained from the fields UL BW 330, Starting AID 351 and Multiplexing flag 356 of the received NFRP trigger frame 200.

When the non-AP STA is not scheduled, nothing more happens at the non-AP station.

If it is polled by the NFRP trigger frame, the scheduled non-AP STA determines a RU tone set index, i.e. a RU tone set 210 on which the non-AP STA will transmit energy in response to the NFRP trigger frame. This is step S274. The non-AP STA usually selects a responding RU tone set based on the position of its AID within the above 802.11 ax range, meaning the first RU tone set for the non-AP station having the Starting AID as own AID, and so on.

Table 27-30 of 802.11ax D4.1 describes an example of how the tones forming 80 MHz, 40 MHz, 20 MHz channels are grouped into sets of tones.

For instance, 216 tones (indexed from −113 to −6 and 6 to 113) forming a 20 MHz channel are split into six bundles 250 of 36 continuous tones. Next each RU tone set is formed by two tones from each bundle (usually consecutive tones that are collocated from one bundle to the other), thereby resulting in 18 RU tone sets, each having a unique index RU_TONE_SET_INDEX. The two tones obtained from each bundle are assigned to two respective groups forming the RU tone set. It means that each RU tone set is formed of two groups of tones 210a and 210b.

For illustrative purposes, the tone set with RU_TONE_SET_INDEX=6 in a 20 MHz channel without spatiality is made of the two following groups of tones (subcarrier indices):

Group 210a: −103, −67, −31, 16, 52, 88

Group 210b: −102, −66, −30, 17, 53, 89

In this example, 6 tones are replicated in each group over the 20 MHz channel, each tone from one of the six bundles of tones 250.

A RU tone set is thus made of two adjacent groups of tones (−103 is adjacent to −102, −67 to −66 and so on.), each group being made of non-adjacent tones (−103 not adjacent to −67 and so on.).

Basically, the tone set index for the scheduled non-AP STA is computed from the difference between STA's AID value and "Starting AID" value (usually the difference plus 1). For instance, if this difference plus 1 equals 6, the above-detailed tone set having RU_TONE_SET_INDEX=6 is scheduled for the non-AP STA considered.

Next at step S276, the non-AP STA generates the NDP feedback report response to be sent to the AP.

In particular, the non-AP STA has to transmit energy on the first group 210a of subcarriers or tones to indicate a first response to the feedback type (field 353) polled by the NFRP trigger frame 200, and on the other hand, the non-AP STA must transmit energy on the second group 210b of subcarriers or tones to indicate a second response to the feedback type.

The response is named FEEDBACK_STATUS in the current D4.1 version of 802.11ax. For instance, for the Feedback Type field 353 set to 0 (Resource request), FEEDBACK_STATUS is set to 0 when the non-AP STA requests resource with buffered bytes for transmission between 1 and a resource request buffer threshold. The non-AP station will thus use the first group 210a of tones;

FEEDBACK_STATUS is set to 1 when the non-AP STA requests resource with buffered bytes for transmission above the resource request buffer threshold. The non-AP station will thus use the second group 210b of tones.

The non-AP station determines the NDP feedback report response to be sent depending on the feedback type field in the NFRP trigger frame.

Table 27-30 of 802.11ax D4.1 specifies which group of tones within a tone set has to be used depending on the FEEDBACK_STATUS value.

At step S276, the non-AP STA thus determines the FEEDBACK_STATUS value and therefore the group of tones to be used, either 210a or 210b, depending on the feedback it wishes to report to the AP.

Next at step S278, the non-AP STA transmits energy of the group corresponding to the FEEDBACK_STATUS value in the RU tone set of the determined RU_TONE_SET_INDEX. Technically speaking, the MAC block 502 of the non-AP STA generates a TXVECTOR to cause the non-AP STA to transmit on the RU tone set of the selected RU tone set index and, responsive to the TXVECTOR, the PHY block 503 of the non-AP STA sends an HE TB PPDU 211.

For illustration, Station 1 (corresponding to RU_TONE_SET_INDEX=1) transmits energy on its first group of tones 210a (as consequence, group 210b is represented with a dash line). On the contrary, Station 2 (corresponding to RU_TONE_SET_INDEX=1) transmits energy on its second group of tones 210b.

Figure 3B:
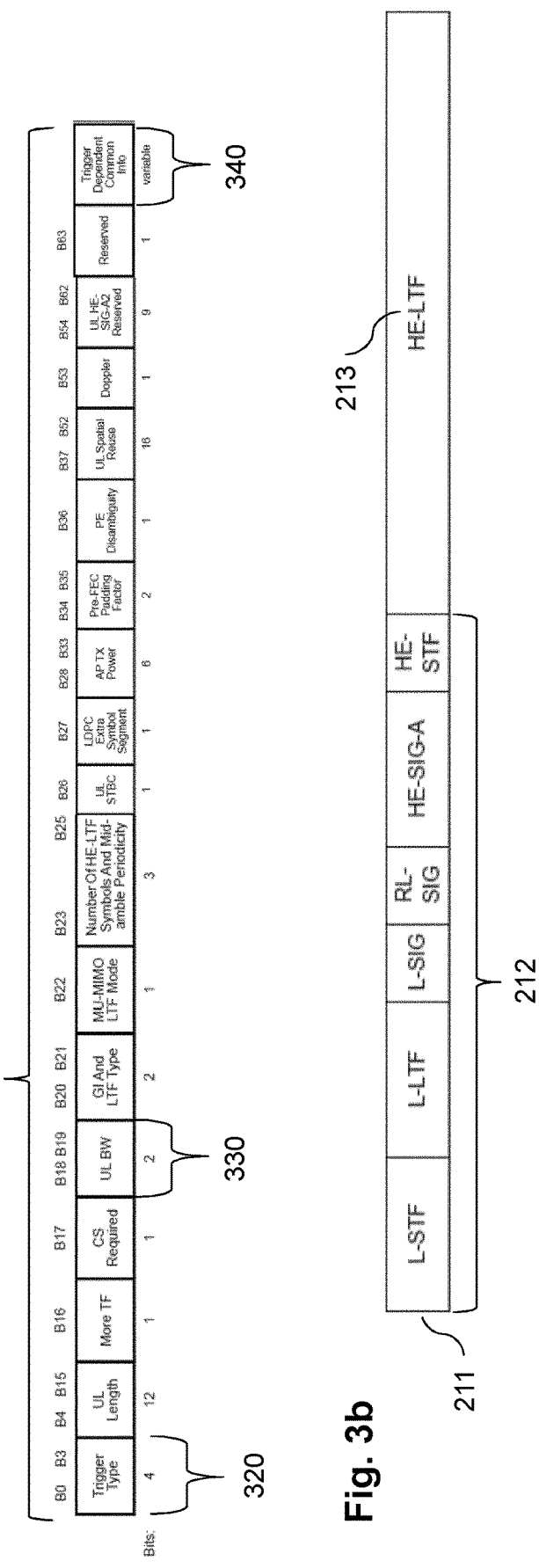
FIG. 3b illustrates the format of TB NDP PPDU.

Technically, the HE TB NDP Feedback PPDU 211 used as a feedback response is a single packet with no real data payload as shown in FIG. 3b. The PHY preamble 212 is emitted on 20 MHz width (thus several non-AP STAs may emit the same preamble) and the 'payload' is composed of a series of HE-LTF symbols 213, emitted on each tone forming the selected group 210a or 210b, to be used for the transmitted feedback (energy).

The non-AP STA commences the transmission of the NDP feedback report response at the SIFS time boundary after the end of the received NFRP trigger frame 200. The transmission duration for the PHY preamble is defined by the fixed number of symbols to be sent. The duration is referred to as "preamble period" $T_{preamble}$ (PHY preamble is not shown in FIG. 2 to simplify illustration, but represented for example in FIG. 16). Following the preamble period $T_{preamble}$, the non-AP STA transmits the HE-LTF symbols 213.

Then, the physical layer of the AP receives and decodes (S262) the RU tone sets where energy is present, to provide to its MAC layer with a list of used RU_TONE_SET_INDEX and the corresponding Feedback responses (FEEDBACK_STATUS values) depending on which group of tones, 210a or 210b, some energy has been detected.

Thanks to the fields UL BW 330, Starting AID 351 and Multiplexing flag 356 of the NFRP trigger frame 200 sent at step S260, the AP is able to retrieve the AID of each responding RU tone set with energy, and thereby retrieve the AID of each non-AP STA responding to the trigger frame 200. The MAC layer entity of the AP is consequently able to determine those NDP-scheduled non-AP STAs who have responded.

At step S264, the AP can send a subsequent trigger frame 220 (FIG. 2) to offer new opportunities (RUs) to the responding non-AP STAs, for example a 'Basic' type trigger frame or any convenient type. The 'Basic' type trigger frame is signaled by a "Trigger Type" subfield 320 having value 0.

Based on an AP's decision and the collected feedback responses 211, the trigger frame 220 may define a plurality of data resource units (RUs) 230 (here of 26 tones—of course other numbers of tones may be used). The multi-user feature of OFDMA allows the AP to assign different RUs to different non-AP STAs in order to increase competition. This helps to reduce contention and collisions inside 802.11 networks.

These RUs may be scheduled RUs assigned to the feedback-responding non-AP STAs, using the AIDs retrieved at step S264.

The trigger frame 220 may for instance include a plurality of User Info fields (FIG. 3a) for a respective plurality of scheduled RUs, each User Info field setting an AID (so-called AID12 field) of the scheduled non-AP STA for a given RU in the channel.

The non-AP STAs thus receive the subsequent trigger frame 220 and determine whether they are scheduled (step S280).

In the affirmative, the non-AP STA can use the RU scheduled to it (i.e. the one with the AID corresponding to the non-AP STA) and transmit data (HE TB PPDU) to the AP.

According to the exemplary illustration, Station 1 and Station 2 can thus be granted a RU 230. As an example, Station 1 emits a HE TB PPDU 231 in a first RU 230-1, and Station 2 emits a QoS_Null with Buffer Status Report (the HE TB PPDU is a MAC-PDU with no data payload but with a MAC header containing a BSR) in a second RU 230-2. As the Qos_Null is smaller, the second RU 230-2 is filled in with padding to match the transmission length specified in the trigger frame 220.

Upon receiving the HE TB PPDU 231, the AP acknowledges (or not) the data on each RU by sending a Multi-STA Block Acknowledgment (BA) response (240—FIG. 2), making it possible for each sending non-AP STA to know when its data transmission is successful (reception of the ACK) or not (no ACK after expiry of a time-out). This is step S266.

These explanations show the intent of the NFRP trigger frame mechanism according to the current version of the 802.11 ax standard: to receive feedbacks in a short time from a great number of associated non-AP stations.

The overall MU Uplink (UL) medium access sequence, including both NDP Feedback RUs and UL MU scheduled RUs, seems more efficient than conventional EDCA access scheme, especially in dense environments as envisaged by the 802.11 ax standard. This is because the number of collisions generated by simultaneous medium access attempts and the overhead due to the medium access are both reduced. The NFRP trigger frame 200 allows information to be requested from 18 non-AP stations per 20 MHz channel (more with spatial multiplexing), and the Basic trigger frame 220 allows RUs to be proposed to up to 9 stations which have shown their interest to be triggered (by responding to the NFRP trigger frame).

However, the Null-Data-Packet (NDP) Feedback Report procedure suffers from limitations, notably because of the number of triggered (scheduled) non-AP stations. As the mechanism is based on fixed 802.11ax range of AIDs (from Starting AID 351, one AID per RU tone set) where some AIDs in the 802.11ax range may not be used (e.g. released during the lifetime of the network cell), several successive NFRP polling phases are required to have better knowledge of the resource needs of more stations with a view of offering an efficient delivery of the data traffic compared to the required polling overhead.

The present invention seeks to overcome the foregoing limitations. In this perspective, the invention provides dynamicity improvement of the NFRP short feedback, i.e. be able to apply at once a feedback request for all stations of a group (e.g. a given BSS) regardless of the number of RU tone sets provided by the NFRP trigger frame.

To this end, first embodiments of the present invention provide a random-access mechanism for short feedback procedure. The AP thus provides a NFRP trigger frame wherein a predefined AID value (e.g. in the Starting AID field 351) defines a random access for the stations to the plurality of RU tone sets. Consequence of the random access to the RU tone sets, the number of non-AP stations that can be targeted by the "random-access" (RA) NFRP trigger frame is no longer limited by the number of RU tone sets.

A non-AP station which determines that an association identifier, AID, field in the received RA-NFRP trigger frame includes a predefined AID value defining a random access for the stations to the plurality of RU tone sets, may then randomly select a responding RU tone set from the plurality of RU tone sets and send a NDP feedback report response on the selected responding RU tone set.

The non-AP station may contend for access to the corresponding subcarriers or tones or may compute a backoff value prior to selecting a RU tone set index, the backoff value being compared to an available range of RU tone sets provided by the RA-NFRP trigger frame for random access.

All the non-AP stations targeted by the predefined AID value (e.g. all registered stations, all non-yet-registered stations, all stations of one or more BSSs, etc.) thus compete one each other to access the RU tone sets.

At its end, the AP can discriminate between unused RU tone sets and used RU tone sets, so that a subsequent trigger frame, for instance a basic one, is sent to provide new transmission opportunities (RUs) to responding non-AP stations. The overall scheme (random-based NDP feedback report procedure supplemented with a subsequent trigger frame) offers an efficient MU UL random scheme for the non-AP STAs because the random access is moved to the short NDP feedback report procedure compared to conventional UORA with large duration. Indeed, one unused RU tone set has lower impact on network efficiency than one unused OFDMA RU (UORA).

Furthermore, second embodiments of the present invention provide a random access mechanism for short feedback procedure wherein the AP specifies, in the NFRP trigger frame, an access type indication defining whether the RU tone sets are accessed on a random basis by the non-AP stations and a range scaling field defining a scale factor for the non-AP stations to obtain, from conventional 802.11 ax range of scheduled AIDs, a second (polling) range of AIDs of stations authorized to access the plurality of RU tone sets on a random basis.

Any non-AP station receiving such "random-access" (RA) NFRP trigger frame thus determines therefrom the access scheme to the RU tone sets. And, when it is determined a random access, the non-AP station obtains the scale factor from the range scaling field, computes the second (polling) range of station AIDs from the conventional 802.11 ax range and the scale factor. The second range is used to access the RU tone sets. In particular, if the AID of the non-AP station is included in the second (polling) range, the non-AP station randomly select a responding RU tone set from the plurality of RU tone sets. A NDP feedback report response can thus be sent on the selected responding RU tone set.

The AP thus receives a NDP feedback report response from at least one responding non-AP station having an AID in the second (polling) range and outside the conventional 802.11ax range.

Consequently, the AP has control (through the range scaling field) on the design of the second (polling) range compared to the conventional 802.11ax range that is defined by the Starting AID 351, the channel bandwidth 330 and the multiplexing flag 356. It may adjust the number of non-AP stations allowed to compete for randomly accessing the RU tone sets of the NDP Feedback Report procedure. This adjustment may consider network statistics as described below to dynamically provide optimum random-access efficiency given the varying network congestion.

Furthermore, third embodiments of the present invention provide that, in addition to randomly selecting a responding RU tone set from the plurality of RU tone sets, a polled non-AP station randomly selects one of the groups of tones in the selected responding RU tone set before sending a NDP feedback report response using the selected group of tones in the selected responding RU tone set.

The AP can thus determine collision in a responding RU tone set where two or more groups of tones of the responding RU tone set convey NDP feedback report responses. Based on the responding RU tone sets detected as collided and the responding RU tone sets detected as not collided as this stage (and also the unused RU tone sets), the AP can schedule a subsequent transmission opportunity only for responding stations of responding RU tone sets in which no collision is detected by the AP. This reduces the risks of having collided RU during the subsequent transmission opportunity. For RU tone sets made of two groups of tones, half of the collisions is early detected by the AP (from the short feedback procedure). Consequently, network efficiency is increased.

Furthermore, allowing a plurality of non-AP stations to concurrently access the same RU tone set may be done by defining (and thus signaling) a random access for the non-AP stations to the plurality of RU tone sets. In that case, a single feedback request may apply for all non-AP stations, possibly of a group (e.g. a given BSS), and the number of non-AP stations that can be targeted by the "random-access" (RA) NFRP trigger frame is no longer limited by the number of RU tone sets.

This may also be done by assigning two or more (let say N) AIDs per RU tone set, using the same mechanism as above: for instance, the polling range is ["Starting AID"; "Starting AID"+N×$N_{STA}$] and AIDs ["Starting AID"+x.N; "Starting AID"+x.N−1] are assigned to RU tone set with RU_TONE_SET_INDEX=x. This approach helps reducing the impact of the punctures in the conventional polling range.

However, the competition between various non-AP stations to access the RU tone set may be detrimental to network efficiency because collisions may occur. It would therefore be beneficial to organize the competition. In this respect, the inventors propose a priority mechanism for short feedback procedures.

An underlying idea of the proposal is for some low-priority non-AP stations to sense the RU tone set when the high-priority are supposed to already transmit their feedback responses. A clear RU tone set during the sensing allows the low-priority non-AP stations to transmit their feedback responses on the idle RU tone set. To time align the feedback responses between the high-priority and low-priority non-AP stations, the latter can send a shorter feedback response, for instance deprived of the PHY preamble.

In this respect, a non-AP station that receives a NFRP trigger frame, selects a responding RU tone set, senses the selected responding RU tone set during a sensing period in which the high-priority non-AP stations are supposed or allowed to send their NDP feedback report responses to the NFRP trigger frame, and if the sending shows that the selected responding RU tone is idle, therefore the non-AP station sends its NDP feedback report response on the idle selected responding RU tone. At least two behaviors are defined for the non-AP stations: those responding directly to the NFRP trigger frame and those sensing whether other non-AP stations have started responding to the NFRP trigger frame, before starting sending their own feedback responses.

The AP thus receives various NDP feedback report responses in response to the NFRP trigger frame. Due to the priority mechanism, the AP starts receiving the NDP feedback report response from the above non-AP station after an idle period (corresponding to the sensing period) during which the selected responding RU tone set is idle and at least one other NDP feedback report response is received on another RU tone set from another non-AP station.

Figure 4:
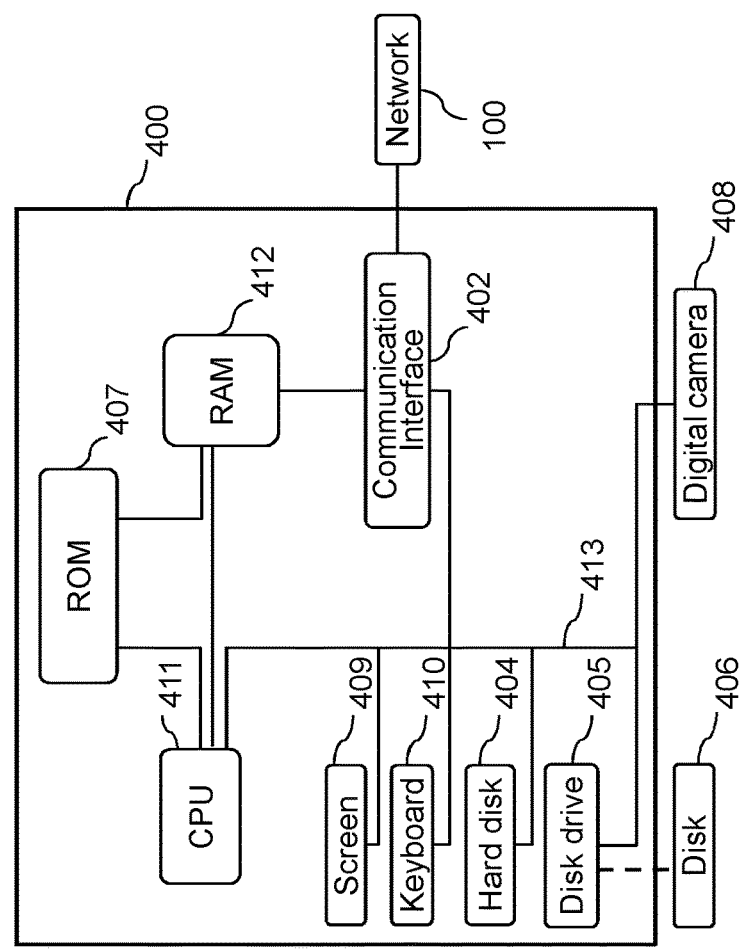
FIG. 4 shows a schematic representation a communication device in accordance with embodiments of the present invention.

FIG. 4 schematically illustrates a communication device 400 of the radio network 100, either the AP 110 or any non-AP STA 101-107, configured to implement at least one embodiment of the present invention. The communication device 400 may preferably be a device such as a microcomputer, a workstation or a light portable device. The communication device 400 comprises a communication bus 413 to which there are preferably connected:
- a central processing unit 411, such as a microprocessor, denoted CPU;
- a read only memory 407, denoted ROM, for storing computer programs for implementing the invention;
- a random-access memory 412, denoted RAM, for storing the executable code of methods according to embodiments of the invention as well as the registers adapted to record variables and parameters necessary for implementing methods according to embodiments of the invention; and
- at least one communication interface 402 connected to the radio communication network 100 over which digital data packets or frames or control frames are transmitted, for example a wireless communication network according to the 802.11ax/be protocols. The frames are written from a FIFO sending memory in RAM 412 to the network interface for transmission or are read from the network interface for reception and writing into a FIFO receiving memory in RAM 412 under the control of a software application running in the CPU 411.

Optionally, the communication device 400 may also include the following components:
- a data storage means 404 such as a hard disk, for storing computer programs for implementing methods according to one or more embodiments of the invention;
- a disk drive 405 for a disk 406, the disk drive being adapted to read data from the disk 406 or to write data onto said disk;
- a screen 409 for displaying decoded data and/or serving as a graphical interface with the user, by means of a keyboard 410 or any other pointing means.

The communication device 400 may be optionally connected to various peripherals, such as for example a digital camera 408, each being connected to an input/output card (not shown) so as to supply data to the communication device 400.

Preferably the communication bus provides communication and interoperability between the various elements included in the communication device 400 or connected to it. The representation of the bus is not limitative and in particular the central processing unit is operable to communicate instructions to any element of the communication device 400 directly or by means of another element of the communication device 400.

The disk 406 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to embodiments of the invention to be implemented.

The executable code may optionally be stored either in read only memory 407, on the hard disk 404 or on a removable digital medium such as for example a disk 406 as described previously. According to an optional variant, the executable code of the programs can be received by means of the communication network 403, via the interface 402, in order to be stored in one of the storage means of the communication device 400, such as the hard disk 404, before being executed.

The central processing unit 411 is preferably adapted to control and direct the execution of the instructions or portions of software code of the program or programs according to the invention, which instructions are stored in one of the aforementioned storage means. On powering up, the program or programs that are stored in a non-volatile memory, for example on the hard disk 404 or in the read only memory 407, are transferred into the random access memory 412, which then contains the executable code of the program or programs, as well as registers for storing the variables and parameters necessary for implementing the invention.

In a preferred embodiment, the apparatus is a programmable apparatus which uses software to implement the invention. However, alternatively, the present invention may be implemented in hardware (for example, in the form of an Application Specific Integrated Circuit or ASIC).

Figure 5:
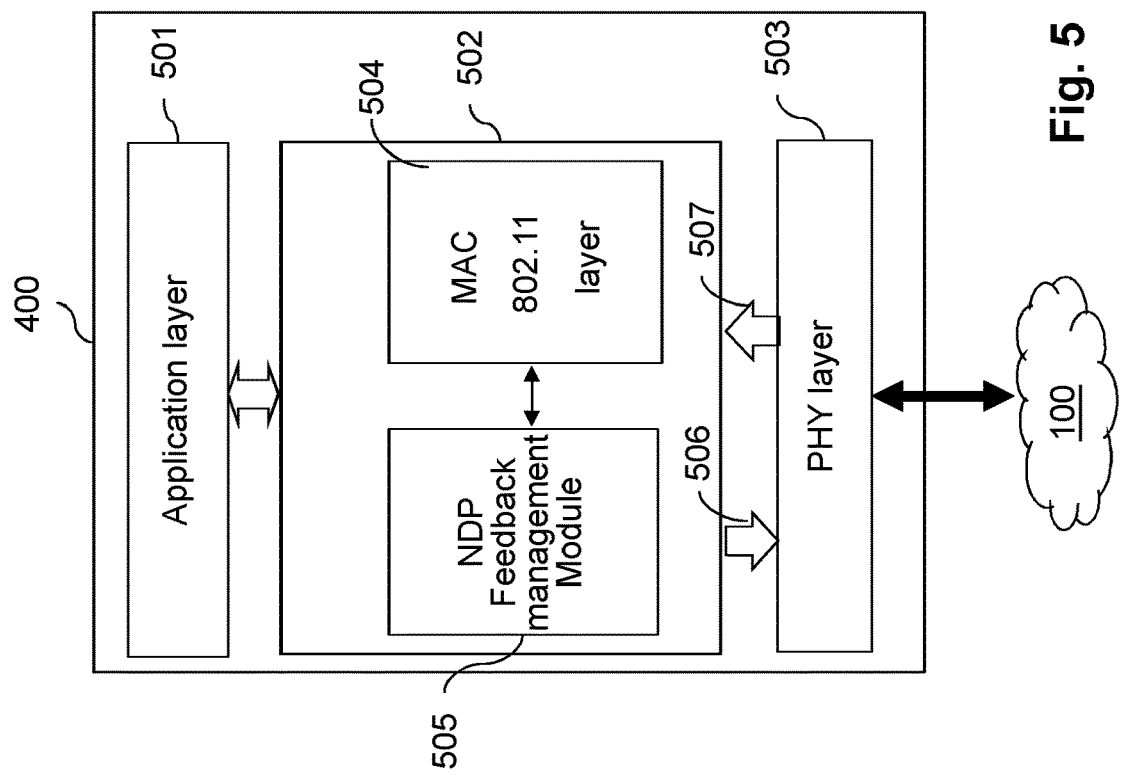
FIG. 5 schematically illustrates functional blocks of a communication device in accordance with embodiments of the present invention.

FIG. 5 is a block diagram schematically illustrating the architecture of the communication device 400 adapted to carry out, at least partially, the invention. As illustrated, communication device 400 comprises a physical (PHY) layer block 503, a MAC layer block 502, and an application layer block 501.

The PHY layer block 503 (e.g. a 802.11 standardized PHY layer) has the task of formatting, modulating on or demodulating from any 20 MHz channel or the composite channel, and thus sending or receiving frames over the radio medium used 100, such as 802.11 frames, for instance single-user frames, such as control frames (e.g. ACK, Trigger Frame), MAC data and management frames, based on a 20 MHz width to interact with legacy 802.11 stations or with 802.11 ax/be in legacy mode (such as for Trigger Frames), as well as MAC data frames of OFDMA type having preferably smaller width than 20 MHz legacy (typically 2 or 5 MHz), as well as NDP frames having preferably a PHY header transmitted on 20 MHz width and a short payload consisting on energy located on non-contiguous subcarriers or tones, to/from that radio medium.

The MAC layer block or controller 502 preferably comprises a MAC 802.11 layer 504 implementing conventional 802.11 ax/be MAC operations, and an additional block 505 for carrying out, at least partially, embodiments of the invention. The MAC layer block 502 may optionally be implemented in software, which software is loaded into RAM 412 and executed by CPU 411.

Preferably, the additional block 505 referred to as NDP Feedback Management module 505 is configured to implement steps according to embodiments that are performed by the communication device 400, notably transmitting operations for a transmitting/responding station and receiving operations for a receiving station.

Interfaces 506 and 507 are used by the MAC and PHY layer blocks to interact and to exchange information through TXVECTOR (from the MAC to the PHY layer—506) and the RXVECTOR (from the PHY to the MAC block—507). The TXVECTOR and RXVECTOR are defined in the clause 27.2.2 of the draft 4.1 of the 802.11 ax standard.

On top of the Figure, application layer block 501 runs an application that generates and receives data packets, for example data packets of a video stream. Application layer block 501 represents all the stack layers above MAC layer according to ISO standardization.

Embodiments of the present invention are now illustrated using various exemplary embodiments.

Although some of the proposed examples use the trigger frames 200 and 220 (see FIG. 2) sent by an AP for a multi-user (MU) uplink (UL) transmissions, equivalent mechanisms can be used in a centralized or in an ad hoc environment (i.e. without an AP). It means that the operations described below with reference to the AP may be performed by any station in an ad hoc environment. In particular, subsequent scheduling to provide scheduled transmission opportunities to the NFRP responding non-AP stations may be provided that is different from the 802.11ax UL MU operation.

Figure 6:
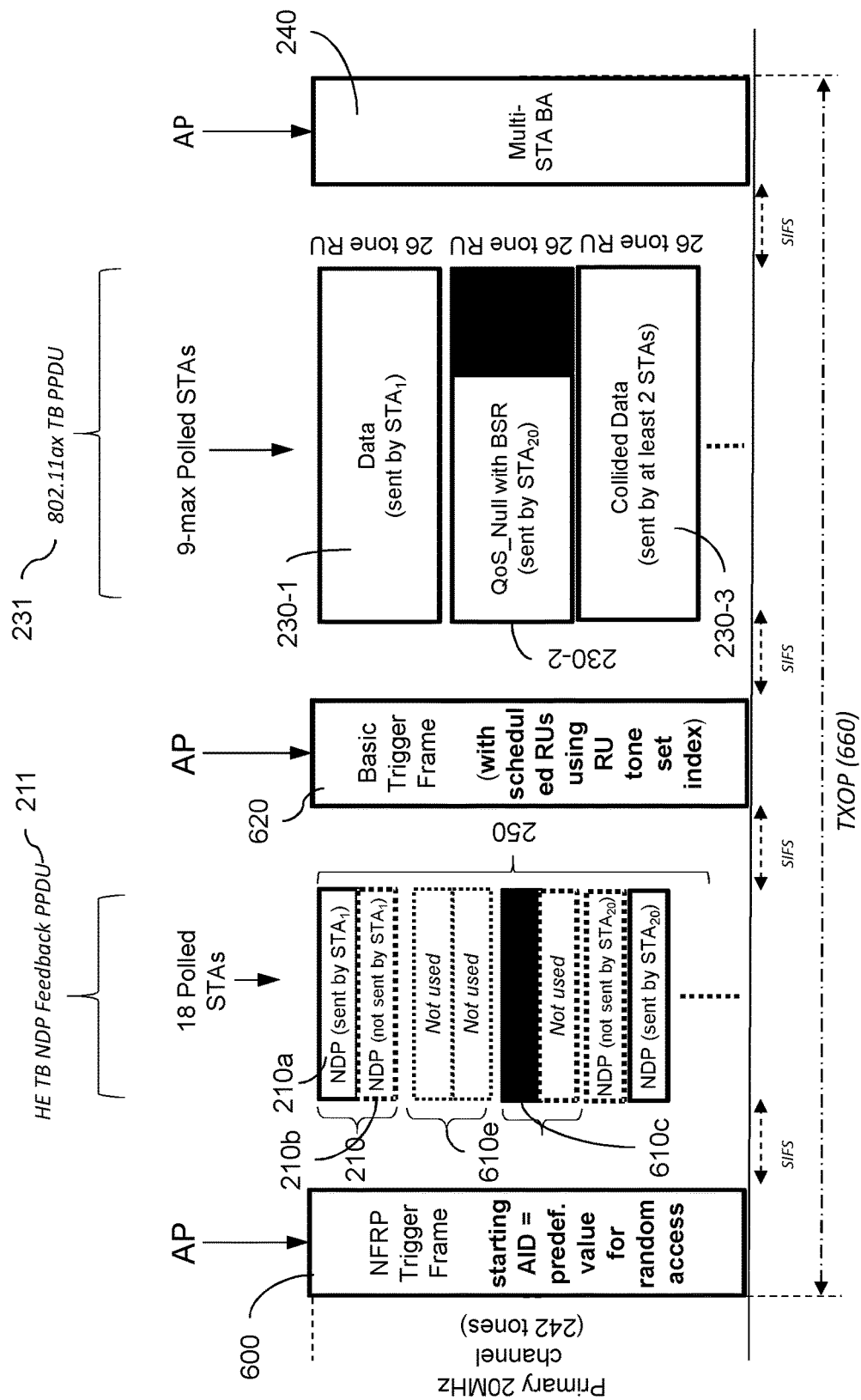
FIG. 6 illustrates, using the same scenario as FIG. 2, first embodiments of the invention providing random access to the RU tone sets during the NDP short feedback report procedure.

FIG. 6 uses the same timeline as FIG. 2 to illustrate first embodiments of the invention providing random access to the RU tone sets during the NDP short feedback report procedure. FIGS. 6a and 6b illustrate, using flowcharts, corresponding general steps at the AP and a non-AP STA, respectively. The reference numbers are unchanged when referring to the same elements, frames and steps as in FIG. 2.

At step S660, the AP 110 polls a large group of non-AP STAs to know their needs for transmission, by sending RA-NFRP trigger frame 600 wherein the Starting AID field 351 is set to a predefined AID value defining a random access for the stations to the plurality of RU tone sets. This sharply contrasts with the "Starting AID" field conventionally used which defines the first AID of a restricted range of AIDs scheduled to respond to the RA-NFRP Trigger frame.

Thanks to this specific predefined value, the non-AP STAs can know that a random scheme is requested for sending their feedback response to the AP.

If various predefined values are available, the AP may perform a strategy step based on network statistics and/or on history to decide which group of non-AP STAs has to be polled by the next RA-NFRP trigger frame 600.

Where no multiple BSSs are managed by the AP, the predefined AID value may be set to
- an AID targeting all the stations yet associated with the AP, e.g. predefined AID value=0, or
- an AID reserved for non-AP stations not yet associated with the AP, e.g. predefined AID value=2045. All the non-AP stations willing to join the AP can thus be polled and therefore known by the AP, for instance to speed up their registration/association process by providing subsequent RUs as described below.

Where multiple BSSID feature is implemented at the AP, the predefined AID value may be set to
- a Basic Service Set Identifier, BSSID, index of a BSS to poll all the non-AP stations belonging to this BSS, i.e. to 0 for transmitted BSSID or to the value of the BSSID Index corresponding to that BSS for a non-transmitted BSSID, or
- an AID targeting all the non-AP stations yet associated with the AP, regardless of their BSSs, e.g. predefined AID value=2047, or
- an AID reserved for non-AP stations not yet associated with the AP, e.g. predefined AID value=2045. All the non-AP stations willing to join the AP or a BSS can thus be polled and therefore known by the AP, for instance to speed up their registration/association process by providing subsequent RUs as described below.

All these proposed values (0, BSSID indexes, 2045, 2047) are outside the reserved 802.11ax range of AIDs that the AP is authorized to assign to individual non-AP stations upon registration. Of course, any other value not associated with a specific station could be selected.

At step S270, any non-AP station 101-107 receives the RA-NFRP Trigger frame 600 and decodes it. If the receiving non-AP station belongs to a BSS (or virtual BSS) of the transmitting AP, the Trigger Frame is not filtered by the PHY layer as defined in the standard. The filtering is made on so-called "colors" defined in the 802.11 ax standard, which mandates that the BSS colors of all the multiple BSSs managed by a single AP are the same.

At step S672, the non-AP STA determines whether a random-access NFRP feedback procedure takes place according to embodiments of the invention with a view of determining which RU tone set 210 to be used and whether the non-AP STA is concerned by this procedure.

This is made by checking the value of the Starting AID field 351:
- if its value belongs to the 802.11ax range of AIDs reserved to individual non-AP stations, the conventional processing (FIG. 2b) is performed,
- if its value is 0, BSSID indexes, 2045 or 2047, the non-AP STA checks whether it belongs to the group of non-AP stations targeted by the value (0 for any yet registered non-AP station in case of no multiple BSSID feature, BSSID index for non-AP stations of the corresponding BSS, 2045 for non-yet-associated stations, 2047 for any non-AP station already associated with the AP whose MAC address [BSSID] is specified in TA field of the MAC header).

At the end of step S672, the non-AP STA knows whether it is allowed to respond to the RA-NFRP trigger frame. In the affirmative, the non-AP STA determines whether it has interest in responding (test S673). In the affirmative, the process goes on at step S674.

At step S674, the non-AP STA determines a random RU tone set 210 to send its short NDP feedback report response 211. The selection of the RU tone set is made on a random basis by selecting an index from among the available indexes. All the RU tone sets are available for contention. Optionally, only the RU tone sets that fit into station capabilities are eligible for contention (e.g. a station operating on a limited band BW such as a 20 MHz-only station).

The number of RU tone set indexes ($N_{MAX\_SET}$) may be determined based on the following formula as above: $N_{MAX\_SET}=N_{feedback} \times 2^{BW} \times (MultiplexingFlag+1)$. As currently defined in 802.11ax D4.1, $N_{feedback}=18$.

The non-AP STA may then randomly select a random RU tone set Index to send its short feedback: RA_NFRP_SET_INDEX=random [0, $N_{MAX\_SET}-1$]. Here, it is chosen to start the indexes at 0. In variant, the first index may have another value, e.g. 1 or above, and the provided formulae are modified accordingly.

In this random access procedure, the non-AP STA may still indicate different responses to the feedback type (field 353) polled by the RA-NFRP trigger frame 600, depending on the group of tones used within the selected random RU tone set: for example, transmitting on the first group of RU tones 210a may indicate a FEEDBACK_STATUS equal to 0, and transmitting on the second group of RU tones 210b may indicate a FEEDBACK_STATUS equal to 1. In that case, the NDP feedback report response is transmitted on one of the two groups of tones.

In a variant where the polled non-AP STA have no choice in the response (this may be defined by a specific Feedback type in field 353), each group defined above (210a or 210b) may be considered as a separate random RU tone set available for contention by the polled non-AP STAs. In that case, a RU tone set is made of a group of non-adjacent tones.

This adds additional tone sets for Random selection: for instance, the number of available RU tone sets is double (36 indexes instead of 18 for a 20 MHz channel without spatial multiplexing). Consequently, less collisions statistically happen in the RU tone sets, thereby improving the usage of TB PPDU 231.

Figure 7:
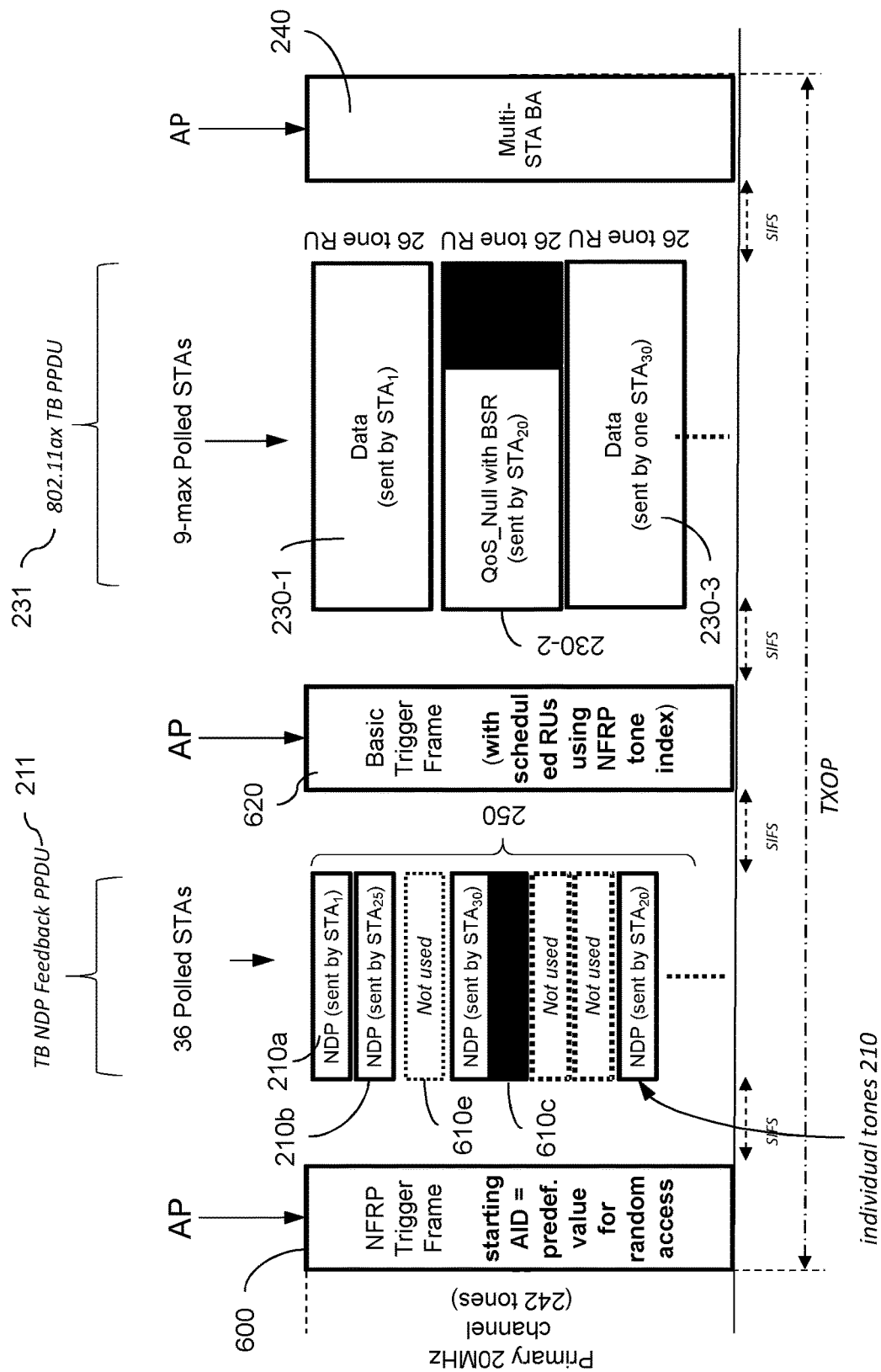
FIG. 7 illustrates, using the same scenario as FIGS. 2 and 6, variants of the invention providing random access to the RU tone sets during the NDP short feedback report procedure.

This variant is schematically illustrated in FIG. 7 (reusing the timeline of on FIG. 6) where each group of tones can be individually used: for instance, 210b by Station 25.

Once the random RU tone set (RA_NFRP_SET_INDEX) has been randomly selected at step S674, the non-AP STA determines the FEEDBACK_STATUS value, if any (e.g. not for the variant of FIG. 7) at step S276 and then transmits the NDP Feedback Report response 211 using the appropriate group of tones in the selected random RU tone set (step S278): for instance, Station 1 transmits energy (NDP) on RU tone sets 210a as illustrated in FIG. 6 or 7.

The non-AP STA transmits the header 212 of TB Feedback PPDU 211 on the 20 MHz channel corresponding to the selected RA_NFRP_SET_INDEX, and transmits on each of the subcarrier indexes forming the group for the FEEDBACK_STATUS value, the value of the HE-LTF sequence 213.

As become apparent in the Figures, due to the random selection, some RU tone sets may be not randomly selected, so that the corresponding tone groups 210a and 210b (applicable for FIG. 6) are left unused. Such situation is shown by reference 610e in the Figures.

Also, the random selection of RA_NFRP_SET_INDEX may result in having two or more non-AP STAs selecting the same RU tone set. Such situation is shown by reference 610c in the Figures.

Anyway, the AP receives and decodes (S262) the RU tone sets where energy is present, to provide to its MAC layer a list of used RU_TONE_SET_INDEX and the corresponding Feedback responses (FEEDBACK_STATUS values) if any (applicable to the scenario of FIG. 6 and not to the one of FIG. 7). At this stage, it is not possible for the AP to know which RU tone sets with energy are collided (610c) or not.

At step S664, the AP can send a subsequent trigger frame 620 to offer new opportunities (RUs) to the responding non-AP STAs, for example a 'Basic' type trigger frame or any convenient type. Preferably, the scheduled RUs are of narrow width (26 tones) to offer a maximum of nine RUs per 20 MHz channel. The AP may choose a subset of the responding non-AP STAs.

However, at this stage, the AP does not know which non-AP STAs have emitted energy on a given RU tone set 210. Consequently, it is impossible for the AP to schedule the responding non-AP STAs through their AIDs in the trigger frame 620.

The AP may thus assign a scheduled resource unit to a responding station using the index RU_TONE_SET_INDEX of the corresponding responding RU tone set to define the AID (so-called AID12 field) associated with the scheduled RU.

The AP may directly use the index RU_TONE_SET_INDEX as value for the AID12 field.

However, in order to avoid these scheduled index-based AIDs to fall on conventionally-used AIDs (for BSS or for individual non-AP STAs, typically values from 1 to 2007 and some values below 2048 such as 2045 and 2046, and value 4095 is reserved to indicate start of a Padding field), the AID associated with the scheduled resource unit in the subsequent trigger frame may be built from the index RU_TONE_SET_INDEX of the responding RU tone set and from an offset value Offset_AID.

For instance, the AID12 field of a User Info field defining the scheduled RU may be set to RA_NDP_AID:

$$RA\_NDP\_AID = Offset\_AID + RA\_NFRP\_SET\_INDEX + STARTING\_STS\_NUM \times N_{feedback} \times 2^{BW}$$

where

RA_NFRP_SET_INDEX is a selected one from the indexes of the responding RU tone sets used by the responding non-AP STA, STARTING_STS_NUM is parameter handling the spatial multiplexing. It is a station parameter that corresponds to a starting spatial stream number minus 1. It is set to 0 if the MultiplexingFlag 356 of the RA-NFRP trigger frame 600 is set to 0 (no spatial multiplexing), otherwise it is set as follows:

$$STARTING\_STS\_NUM = entire\ value(RA\_NFRP\_SET\_INDEX / N_{feedback} / 2^{BW})$$

The Offset_AID parameter is a predetermined offset value known by the non-AP STAs and the AP. In some embodiments, the Offset_AID parameter is transmitted by the AP to the stations in a management frame, e.g. periodically in beacon frames.

Preferably, the Offset_AID parameter is selected such that any subsequent RA_NDP_AID falls outside the legacy (802.11ax) range of Association Identifiers (AIDs) provided by AP to associated non-AP STAs. For instance, the offset value is 2048 or above. It is then added to the index RA_NFRP_SET_INDEX of the responding RU tone set to form the AID (AID12 field) associated with the scheduled resource unit.

Using an offset value of 2048 to form the 12-bit AID field makes it possible to work on the MSB (set to 1) to easily distinguish between conventional AIDs and those used for embodiments of the present invention. Furthermore, it allows scheduled RUs for non-AP STAs responding to the RA-NFRP trigger frame 600 to be mixed with scheduled RUs for other non-AP stations directly per their own AID value, with no risk of misunderstanding.

In case of mixing, the subsequent trigger frame 620 first declares all the resource units (it may be a single one) assigned to individual non-AP stations using their own assigned AID, and then declares all resource units (may be a single one) assigned to responding non-AP stations using indexes RA_NFRP_SET_INDEX of the responding RU tone sets (preferably using RA_NDP_AID).

Of course, the subsequent trigger frame 620 may only comprise resource units for non-AP stations responding to the RA-NFRP trigger frame 600 (i.e. RUs with only AID12 set based on RA_NDP_AID).

In all case, the subsequent trigger frame may only comprise scheduled resource units (assigned to respective individual non-AP stations) without random RUs.

At step S664, the AP 110 thus sends the subsequent basic trigger frame 620 so built.

Any non-AP STA receiving the subsequent trigger frame 620 thus determines (step S680) whether it is scheduled, i.e. whether a resource unit is assigned to the non-AP station based on the index RA_NFRP_SET_INDEX of the responding RU tone set determined and used by the non-AP station at steps S674 and S278.

The non-AP STA having responded to the RA-NFRP trigger frame 600 uses the formula above to determine its own RA_NDP_AID and compares it to the AID12 fields specified in the User Info fields of the subsequent trigger frame 620. The non-AP STA thus determines whether an AID associated with a scheduled resource unit in the subsequent trigger frame corresponds to the index RA_NFRP_SET_INDEX used, given the predefined offset value Offset_AID.

In a preferred embodiment where Offset_AID is set to value 2048, all RUs with MSB set to 1 are analyzed in order that the remaining value (not considering the MSB bit) equals to the RU tone set index RA_NFRP_SET_INDEX the non-AP station has previously used.

Of course, in case of mixing RUs with conventional AIDs and index-based AIDs, the non-AP station may be scheduled twice, in which case it should give priority to a scheduled RU with its own AID in order to offer the RU with its index-based AID (if any) to any other colliding non-AP STA having responded on the same RU tone set. In other words, if the non-AP station also determines in the subsequent trigger frame a resource unit that has an associated AID corresponding to an AID assigned by the AP to the non-AP station, the non-AP station discards or disregards the resource unit with the AID corresponding to the index of the selected responding RU tone set to use the resource unit with the assigned AID to send the trigger-based PPDU response. This approach reduces risks of collision in the RUs and may be easily achieved through the order of RU declaration performed by the AP in the subsequent trigger frame 620. Indeed, the non-AP STA may disregard any further User Info fields as soon as it finds one with its own AID. Therefore, placing the RUs with AIDs assigned upon registration before the RUs with index-based AIDs allows the above priority scheme to be naturally performed.

The non-AP station may thus first determine whether one Resource Unit is allocated to it by positively finding its station AID in the AID12 field of one RU. If not found, a further determination is performed in case that the non-AP station has previously sent a NDP feedback response 211 in response to the random-access NFRP trigger frame 600. The further determination relies on the formula for determining RA_NDP_AID value, considering the RU tone index RA_NFRP_SET_INDEX used for the NDP Feedback report response and the predetermined offset value (Offset_AID).

In case of positive determination at step S680, the non-AP STA can use the RU scheduled to it and transmit data 231 (TB PPDU) to the AP. This is step S282. The TB PPDU 231 contains the MAC address of the sending non-AP station, making it possible for the AP to identify each sending non-AP station.

The nature of the transmitted data may be function of the RA-NFRP trigger frame 600 previously received, for instance function of the Feedback type 353 and/or of the group of non-AP stations targeted by the predefined AID value in field 351.

As an example, if the feedback type indication 353 of the RA-NFRP trigger frame 600 is for a resource request, then the non-AP station may emit a data frame as it has packets in its queues and has asked (through NDP feedback report response 211) to be triggered in the next UL MU operation.

As another example, if the RA-NFRP trigger frame 600 is targeting non-associated stations (e.g. predefined AID value set to 2045), then the non-AP station may emit at least one association management frame, such as a Probe Request or (Re)Association Request or Authentication Request. This is because it intends to register with the AP. It turns that the association procedure is substantially speeded up compared to conventional techniques.

This approach of adjusting the nature of the data is illustrated in FIGS. 6 and 7:

Station 1 has randomly picked up a RU tone set index having value 0 (NDP feedback emitted on the first tone set), then its allocated a scheduled RU 230-1 with RA_NDP_AID=2048;

Station 20 has randomly picked up a RU tone set index having value 3 (NDP feedback emitted on 4th tone set), then its allocated a scheduled RU 230-2 with RA_NDP_AID=2051;

at least two stations have randomly picked up the same RU tone set index having value 2 (NDP feedback emitted on the third tone set corresponding to 610c), then they are allocated the same RU 230-3 because they use the same RA_NDP_AID=2050. As a result, the at least two non-AP stations collide in the RU 230-3.

The AP 110 thus receives the TB Data PPDU 231 over the multiple scheduled RUs. It can then acknowledge (or not) the data on each RU by sending a multi-STA block acknowledgment (BA) response 240, making it possible for each sending non-AP STA to know when its data transmission is successful (reception of the ACK) or not (no ACK after expiry of a time-out). This is step S266.

For instance, it may not acknowledge data over RU 230-3 (FIG. 6) as it detects a collision.

As the acknowledgment (no collision) generally uses the AIDs of the sending non-AP stations, the AP 110 may obtain an AID of the responding non-AP stations using the MAC addresses specified in the TB Data PPDU 231 and thus retrieved therefrom. The stations are thus only discriminated at this final stage.

For non-yet-associated non-AP stations having responded to the RA-NFRP trigger frame 600 (having predefined AID value to 2045 for instance), the AP still uses the MAC address of the sending non-AP station in the acknowledgment frame because no AID is available for this station. This corresponds to the Pre-association ack context according to the 802.11 ax standard, which acknowledges pre-association Management frames for multiple STAs using a single Multi-STA BlockAck frame.

The examples of FIGS. 6 and 7 show a single TXOP 660 during which the NDP Feedback Report procedure and subsequent UL MU operation are both conducted. This ensures that the feedback responses 211 are still relevant when they are exploited by the AP to provide the subsequent UL MU operation based on these responses. In addition, it advantageously avoids a random tone set index to be kept by a non-AP station outside the TXOP; otherwise, this would require keeping in memory this random index for further usage by Data trigger frame TF 620 or until a next RA-NFRP trigger frame 600.

However, TXOP 660 may be split into two separate TXOPs, and/or alternatively several subsequent trigger frames 620 (possibly cascaded) may be issued in order to address more non-AP stations responding to the NFRP trigger frame 600 (as only 9 maximum stations per 20 MHz can be triggered for data RU transmission per Basic trigger frame).

The proposed random-access scheme provides good efficiency: the collision is largely performed on the NDP feedback responses 211 which are shorter in duration, and the RUs used for TB PPDU 231 are never empty.

The best theoretical probabilities for classical random-access distributions (such as slotted ALOHA—type) are the following: probability of no collision (success) nearly 37%, compared to 37% for empty, and 26% collisions. This offers a theoretical efficiency ratio of 37% for UORA for instance.

The implementation of the present invention substantially improves this situation as the random access is moved to the short time NDP Feedback report procedure. It turns that no random RUs (and thus no empty RUs) are met in the subsequent UL MU operation (triggered by trigger frame 620).

Applying a random selection among 18 RU tone set index during the NDP Feedback report procedure provides approximately 6.66 (6) success indexes in addition to 4.68 (4) collisions (for a total of 10 full occupied indexes). As a result, it is expected that most of these occupied slots could be later scheduled in the TB PPDU (there is no scheduling for empty RU indexes).

Finally, on average, the maximum efficiency for the transmission above 9 RUs would be: 37/(37+26)=58.7% as there are no longer empty RUs. This is a high improvement compared to the conventional 37% of UORA scheme.

Figure 9:
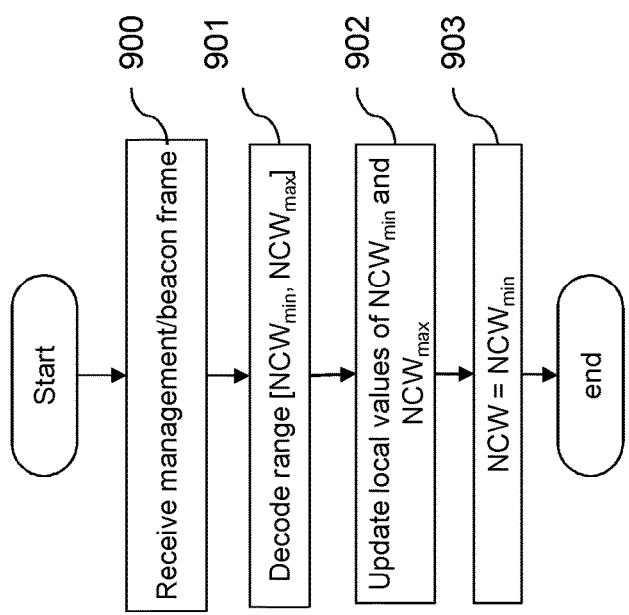
FIG. 9 illustrates, using a flowchart, exemplary general steps for any non-AP station to determine the NFRP Random Parameters (NFRP-RAPS) from the management frame received from the AP and to use them, according to the other embodiments of the invention.
Figure 8:
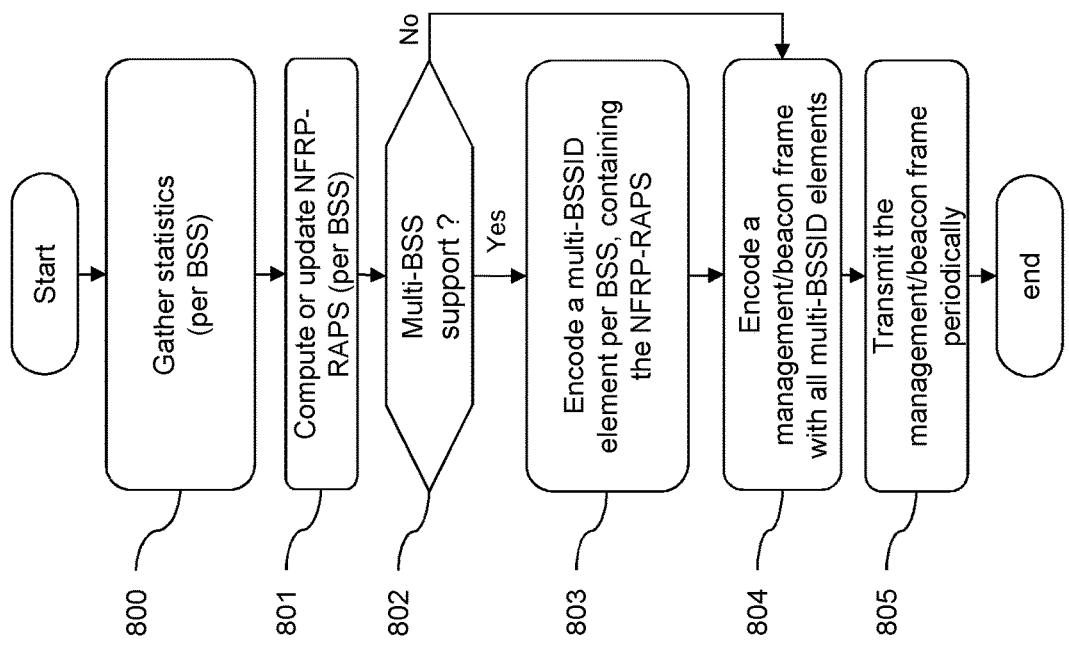
FIG. 8 illustrates, using a flowchart, exemplary general steps for an access point to determine NFRP Random Access contention Parameters according to other embodiments of the invention.
Figure 10:
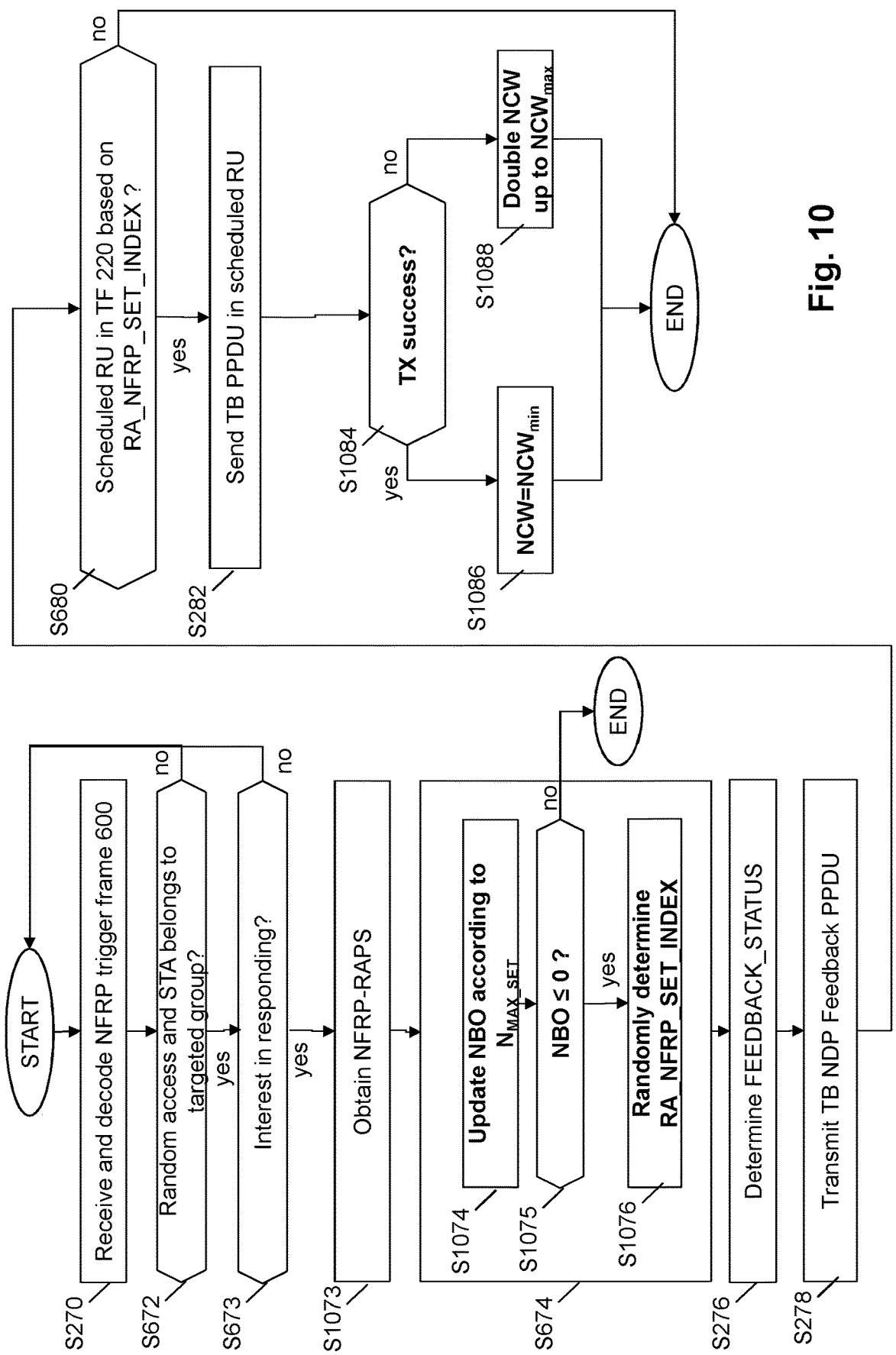
FIG. 10 illustrates, using a flowchart, general steps at a non-AP station using contention parameters to access the NFRP RU tone sets according to the other embodiments of the invention.

FIGS. 8 to 10 illustrate another embodiment of the present invention. Preceding description provides at step S674 a random selection of the RU tone set: RA_NFRP_SET_INDEX=random [0, $N_{MAX\_SET}-1$].

In these other embodiments, randomly selecting a responding RU tone set is based on a contention-based access method using a decrementing NFRP backoff, NBO, counter local to the non-AP station. The NBO is handled using NFRP Random Access contention parameters including a NFRP contention window.

These other embodiments advantageously adapt in a suitable way the random access scheme for NFRP RU Tone set indexes to the contention currently perceived in the network.

FIG. 8 illustrates, using a flowchart, exemplary general steps for the AP 110 to determine NFRP Random Access contention Parameters to be used by the non-AP stations when contending to the RA RU tone sets 210 and to build and send a management (e.g. beacon) frame including these Parameters.

A NFRP Random Access Parameter Set (NFRP-RAPS) is defined at the AP for management of the network. The NFRP-RAPS may include a Contention Window Range that indicates the minimum and maximum values of the contention window to be used by station for NFRP with random access; the range being composed of [$NCW_{min}$, $NCW_{max}$] (NCW standing for NFRP Contention Window). The NFRP-RAPS may also include the above-mentioned Offset_AID which indicates the offset for computation of the RA_NDP_AID value to be used in Basic Trigger Frame(s) following the NFRP with RA.

The NFRP-RAPS may be set and then be transmitted per BSSID (and thus determined per BSS).

These values are sent by the AP to the non-AP stations as a reference value for the latter.

At step 800, the AP gathers NFRP-RA and NFRP-RA-OFDMA statistics.

NFRP-RA statistics are gathered at the end of each NFRP-RA transmission (211) from non-AP stations responding to a RA-NFRP trigger frame 600: the AP collects and analyses the number of RU tone sets (210) that are unused for each previous RA-NFRP trigger frame 600.

The statistics may be saved for a sliding monitoring period. All the values are stored as NFRP-RA statistics.

NFRP-RA-OFDMA statistics are gathered at the end of each MU UL OFDMA transmission (231) from the non-AP stations triggered by a subsequent (to RA-NFRP) trigger frames 620: the AP collects and analyses the number of scheduled RUs that are collided and well used for each previous trigger frame. The statistics may be saved for a sliding monitoring period. All the values are stored as NFRP-RA-OFDMA statistics.

At step 801, the AP computes or updates the NFRP-RAPS based on the gathered statistics.

NCWmin can be adjusted based on NFRP-RA statistics, that is to say upon each transmission, or only after a predefined set of transmissions, of TB NDP Feedback responses 211. This value may have a substantial big impact on the efficiency metric related to unused RU tone set indexes.

NCWmax can be adjusted based on NFRP-RA-OFDMA statistics, that is to say upon each MU UL OFDMA transmission or only after a predefined set of MU UL OFDMA transmissions triggered by a trigger frame 620. This value may have a substantial impact on the efficiency metric, as it drives the collision ratio.

In some embodiments, the AP may want to select a greater NCWmin contention window resulting in more NDP tone set indexes being unused. This is because the unused tone set indexes are early discriminated.

The AP may determine the NFRP-RAPS per each BSS it administrates, based on the statistics.

Alternatively, in case of multiple BSSID, NFRP-RAPS computed/updated for the transmitted BSSID may be used as a default profile for the non-transmitted BSSID. Consequently, low-end AP devices may, by simplicity, only consider this profile for trigger frames 600/620 issued both from their non-transmitted BSSID contexts (with condition that no specific NFRP-RAPS is provided in their non-transmitted BSSID) and for their multi-BSS context. Those APs are considered as low-end APs because they are limited in their NFRP-RAPS capabilities to adapt the NFRP-RAPS per each BSS to changing conditions (like number of registered stations, contention, etc.).

The AP may also use any proprietary or internal consideration for determining these NFRP-RAPS values, as for example the density of stations, measured contention or network load encountered in each individual BSS it manages.

Next to step 801, steps 802, 803, 804 and 805 are in charge of building and broadcasting the management frame (e.g. beacon frame) conveying the obtained NFRP-RAPS to all the stations of the network (or to stations of a given BSS). Step 802 considers the case of multiple BSSs to encode each NFRP-RAPS per BSS (step 803) before forming the beacon frame with all the NFRP-RAPS (step 804). The beacon frame is then sent periodically (e.g. each 100 ms) at step 805.

Consequently, the non-AP stations periodically receive a new reference NFRP-RAPS element values as default contention parameters for their local NFRP contention scheme according to embodiments of the invention.

In a possible embodiment, the NFRP-RAPS element set is identical as the UL OFDMA-based Random Access (UORA) Parameter Set element specified by the 802.11 ax standard for the UORA procedure. A Contention Window range (called OCW Range in the standard) is used to indicate the minimum and maximum values of the OFDMA contention window: it has to be re-used for [NCWmin, NCWmax] range according to the invention. This approach reduces the number of parameters to share.

FIG. 9 illustrates, using a flowchart, exemplary general steps for any non-AP station to determine the NFRP Random Parameters (NFRP-RAPS) from the management frame received from the AP and to use them, according to embodiments of the invention.

To perform contention on the RU tone sets for NFRP, the non-AP station maintains an internal NCW contention window and an internal NBO counter. NCW is an integer in the range $NCW_{min}$ to $NCW_{max}$. The non-AP station obtains $NCW_{min}$ and $NCW_{max}$ from the last received NFRP-RAPS Parameter Set element carried in a management frame from the AP. If the station is associated with a non-transmitted BSSID of a multiple BSSID set, and a NFRP-RAPS is present in the non-transmitted BSSID profile, the non-AP station determines $NCW_{min}$ and $NCW_{max}$ through this non-transmitted BSSID profile (otherwise the non-AP station inherits the NFRP-RAPS form the transmitted BSSID profile).

As shown in the Figure, upon receiving a new beacon frame from the AP (step 900), the non-AP decode the frame to retrieve the NFRP-RAPS for the appropriate BSS if any (step 901).

Next, at step 902, the non-AP station sets its local lower boundary $NCW_{min}$ of the selection range $[NCW_{min}, NCW_{max}]$ to the $NCW_{min}$ reference value as decoded from the received beacon frame, and do the same for the local upper boundary $NCW_{max}$ based on the $NCW_{max}$ reference value as decoded.

Next, the current NCW value of the non-AP station is reset to $NCW_{min}$ (step 903).

These updated values will be used for the next random generation of the NBO value (random selection from range [0,NCW]).

FIG. 10 illustrates, using a flowchart, general steps at a non-AP station using contention parameters to access the NFRP RU tone sets. FIG. 10 is based on FIGS. 2b and 6b, where similar reference numbers correspond to similar elements, frames and steps.

As for FIG. 6b, the non-AP station receives a RA-NFRP trigger frame 600 (S270), determines whether it is targeted (S672) and if targeted, whether it finds interest in responding to the RA-NFRP trigger frame 600 (S673).

Next at step S1073, the non-AP station retrieved its local contention parameters, that is to say NBO and NCW.

NCW is initially set to $NCW_{min}$ and NBO is initially randomly drawn from [0, NCW]. In particular, each time the non-AP station associates with (or intends to transmit to) a different AP (or a different BSSID for non-AP STA with Multiple BSSID feature implemented), the non-AP station shall initially (i.e. prior to an initial transmission attempt triggered by the RA-NFRP trigger frame) set the value of NCW to $NCW_{min}$, and shall initialize its NBO counter to a random value drawn from a uniform distribution in the range 0 to NCW.

Step S674 of randomly selecting a RU tone set (or RA_NFRP_SET_INDEX) is updated to consider the new NFRP contention scheme.

It comprises a first sub-step S1074 of determining, from the received RA-NFRP trigger frame 600, the NFRP Tone Set Indexes available (or eligible) for contention, i.e. $N_{MAX\_SET}$ as defined above, and then of decrementing the NBO counter, e.g., NBO=NBO-$N_{MAX\_SET}$.

For instance, if the NBO counter is not greater than the number $N_{MAX\_SET}$ of eligible RU tone sets in the RA-NFRP trigger frame, the non-AP station sets the NBO counter to zero, otherwise the non-AP station decrements the NBO counter by the number $N_{MAX\_SET}$ of eligible RU tone sets in the Trigger frame.

Next at sub-step S1075, the non-AP station determines whether the resulting NBO value is negative or null.

If NBO is positive, NBO is already prepared to wait a further RA-NFRP trigger frame 600 for random access. The non-AP station is considered as not eligible to contend for access for the present RA-NFRP trigger frame 600, and the process ends for this trigger frame 600.

If NBO is negative or null (i.e. the NBO counter was not greater than the number $N_{MAX\_SET}$), then the non-AP station randomly selects (S1076) one of the eligible RU tone sets, in particular randomly selects RA_NFRP_SET_INDEX.

RA_NFRP_SET_INDEX is for instance randomly drawn from the available random tone indexes [0, $N_{MAX\_SET}$-1], as already described above.

In a variant, the non-AP station may use the last non-null (and non-negative) NBO counter (i.e. before step S1074) as RA_NFRP_SET_INDEX. This approach is still a random selection as the NBO counter has been randomly drawn. The RA_NFRP_SET_INDEX is selected in accordance to the value of NBO counter (which is also a random value, that fits into the range [0, $N_{MAX\_SET}$]).

Once the RA_NFRP_SET_INDEX is known, the process continues with already-described steps S276 (determination of the FEEDBACK_STATUS value), S278 (transmission of the TB NDP feedback PPDU 211 on the appropriate group of tones), S680 (reception of the subsequent trigger frame 620 scheduling a RU for RA_NDP_AID corresponding to the non-AP station) and S282 (sending of a TB PPDU 231 in UL direction in response to the subsequent trigger frame 620).

As shown in FIG. 6a for instance, the AP then sends a Multi-STA Block Acknowledgment (BA) response 240 at step S266. Although this acknowledgment is directly relying on reliability concerns (e.g. increasing of the sequence number of correct MPDU frames and liberation of space in transmission buffers), this information is important for contention mechanism of the RA-NFRP scheme. Indeed, this is the first time for the non-AP station to be aware of the correct completeness of the random access. It may thus adapt its contention parameters accordingly, for instance its NCW contention value.

Step S1084 is executed when the UL OFDMA transmission finishes on an accessed scheduled RU, upon having the status of transmission; either by receiving a positive or negative acknowledgment from the AP (a negative acknowledgment may be determined by not receiving an acknowledgment after an UL OFDMA transmission). Step S1084 thus determines whether the UL OFDMA transmission was successful or not, for instance by determining whether an acknowledgment of the trigger-based PPDU response is received from the AP (if not, the transmission was unsuccessful).

In case of successful MU UL OFDMA transmission, the non-AP station sets the NFRP contention window, NCW, to a (predetermined) low boundary value, for instance $NCW_{min}$ of the NFRP-RAPS of the station's BSS, and initializes the NBO counter to an integer value randomly selected from a uniform distribution in the range 0 to NCW. This is step S1086.

In case of unsuccessful MU UL OFDMA transmission, the non-AP station may double NCW and draw a new NBO value. For instance, it updates the NCW to 2×NCW+1 when NCW cannot be above $NCW_{max}$ of the NFRP-RAPS of the station's BSS, and randomly selects the NBO counter in the range of 0 and NCW. This is step S1088.

In the case that the non-AP station has transmitted NDP energy 211 on a randomly-selected RU tone set due to the expiration of its NBO counter (step S1074) but the non-AP station has not been scheduled in the subsequent trigger frame 620 (no step S282), the NCW value local to the non-AP station is not updated through steps S1086 or S1088, but kept unchanged. This is because the missing scheduling (by trigger frame 620) may be due to a decision (or selection) by the AP (e.g. too many non-AP stations may have responded to the RA-NFRP trigger frame 600 compared to the 9 RUs available for subsequent UL MU OFDMA transmission). No information is provided on tone contention, so the value of NCW is kept unchanged.

The embodiment of FIG. 10 thus relates to a contention method based on a computation of backoff values corresponding to a number of RU Tone Sets or corresponding Indexes a non-AP station waits before sending energy on a RU Tone Set.

Figures 11, 12:
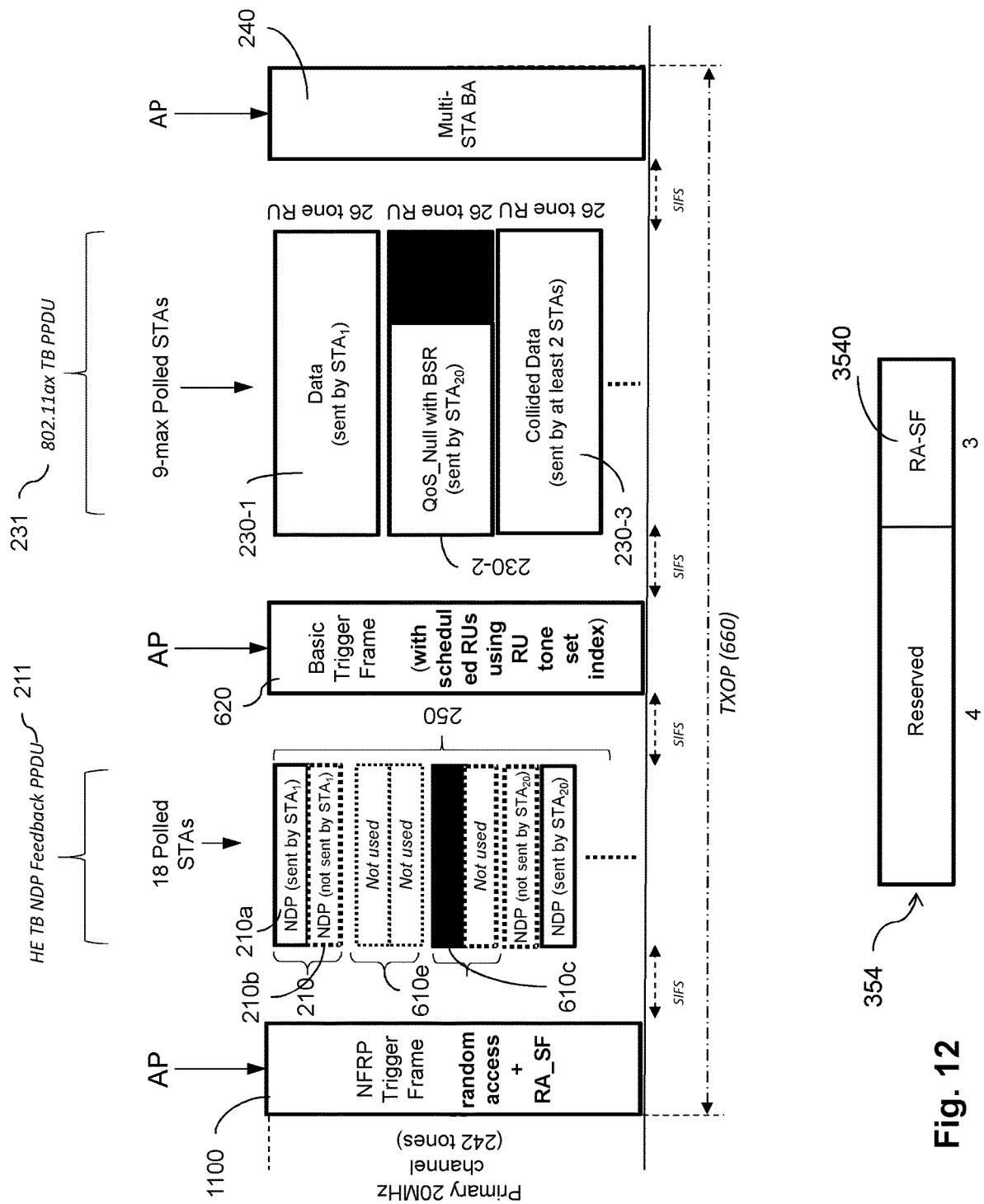
FIG. 11 illustrates, using the same scenario as FIG. 2, second embodiments of the invention providing random access to the RU tone sets during the NDP short feedback report procedure.
FIG. 12 illustrates a range scaling field in a NFRP trigger frame according to embodiments of the invention.
Figure 11B:
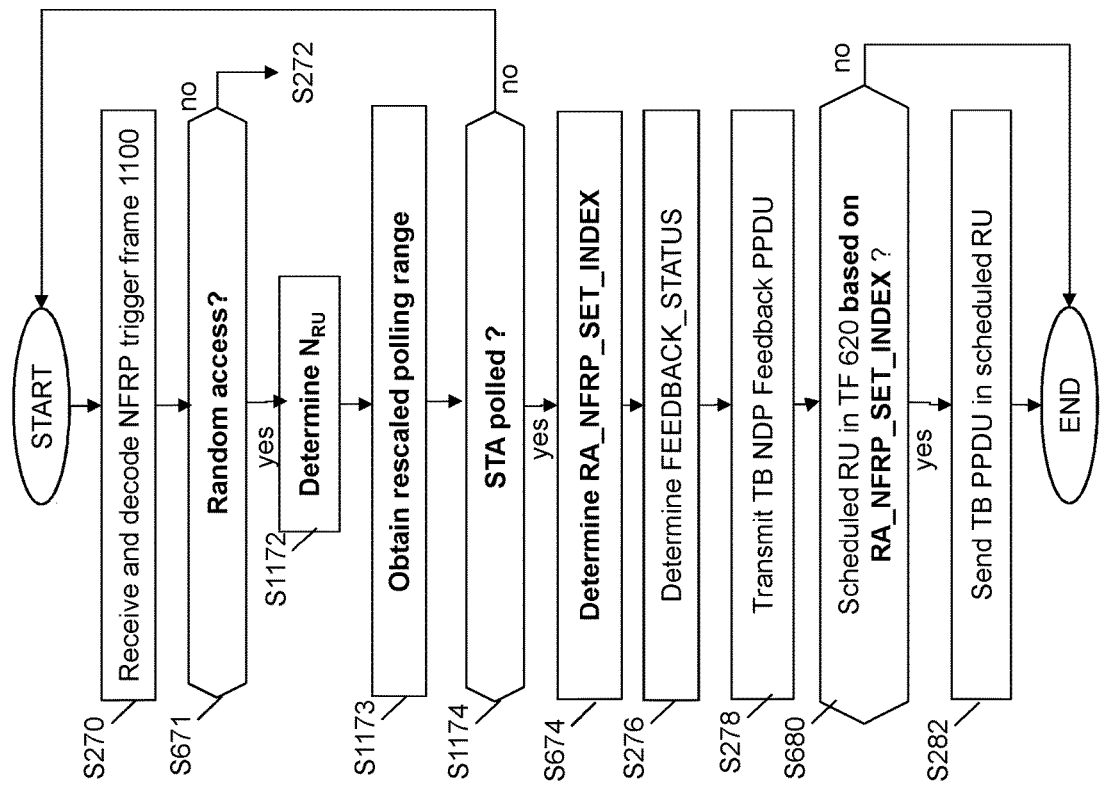
FIGS. 11a and 11b illustrate, using flowcharts, general steps at the access point and at a non-AP station, respectively, corresponding to the second embodiments.
Figure 11A:
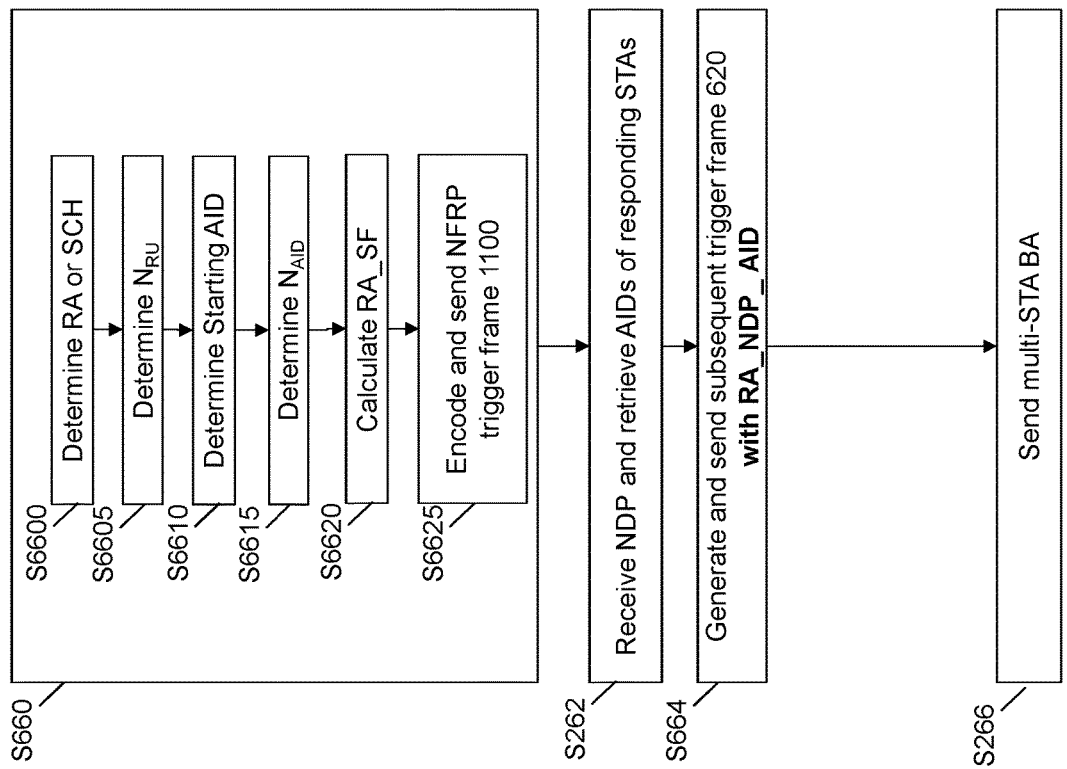

FIG. 11 uses the same timeline as FIG. 2 to illustrate second embodiments of the invention providing random access to the RU tone sets during the NDP short feedback report procedure. FIGS. 11a and 11b illustrate, using flowcharts, corresponding general steps at the AP and a non-AP STA, respectively. The reference numbers are unchanged when referring to the same elements, frames and steps as in FIG. 2.

At step S660, the AP 110 polls a large group of non-AP STAs to know their needs for transmission, by sending a NFRP trigger frame 1100 wherein an access type indication is set to define whether the RU tone sets are accessed on a random basis by the stations, and in case of random access, a range scaling field defining a scale factor for the non-AP stations to determine the large group of authorized AIDs from the conventional 802.11 ax range of AIDs.

Thanks to the indication, the non-AP STAs can know that a random scheme is requested for sending their feedback response to the AP.

Thanks to the scale factor, the AP can authorize a varying large number of non-AP stations to randomly access the RU tone sets.

Step S660 comprises multiple sub-steps.

At sub-step S6600, the AP determines whether the next NFRP trigger frame 1100 should offer scheduled (SCH) or random access (RA) to the RU tone sets that it defines. A decision can be based on a systematic approach (e.g. alternation between a scheduled one and a random one) or on any other rule.

At sub-step S6605, the AP determines the number $N_{RU}$ of resources (here RU tone sets) to allocate to the non-AP stations. The number may depend on the outcome of sub-step S6600. Conventional determination may be used in the case of a scheduled access to the RU tone sets.

This sub-step, in particular for random access, can be performed using statics built upon receiving previous random-access trigger based PPDUs (UORA and/or Random Access-based short Feedback procedures). Those PPDUs are received after transmission of a trigger frame for random access and contains the responses from the non-AP stations via a random-access procedure to the AP.

This is not the result of the random-access transmission (i.e. collided or not) that has interest, but rather the number of RUs or RU tone sets used.

The average usage ratio is preferably used, that is defined by the number of used RUs or RU tone sets divided by the total number of sur RUs/RU tone sets proposed for random access by a given trigger frame. The ratio is measured during successive random-access sessions. It gives a good view of the need for random access resources. Indeed, the theoretically ideal ratio should be 36.8% (similar to the well-known performances of the slotted ALOHA protocol) corresponding to the case where the number of random-access RUs/RU tone sets is equal to the number of contending non-AP stations. Therefore, applying this ratio to the total number of non-AP stations registered in the call gives a theoretically ideal number $N_{RU}$ of required RU tone sets.

The AP may use more precise statistics, for instance specific to a given group of non-AP stations. For instance, the AP may gather random-access-related statistics per AID range when it assigns AIDs from a given range to non-AP STAs according to some STA characteristics: RSSI, capabilities, etc. The AP may thus adjust the number $N_{RU}$ per AID range.

The AP can then infer UL BW value 330 and multiplexing flag 356 that match (or approximate) the number $N_{RU}$ such that $N_{RU}=N_{feedback}\times 2^{BW}\times$(MultiplexingFlag+1). As currently defined in 802.11 ax D4.1, $N_{feedback}=18$.

If the number $N_{RU}$ of required RU tone sets is too high with respect to the available bandwidth (including MIMO if any), or if the AP decides to reserve a portion of the available bandwidth for scheduled MU UL operation (e.g. 20 MHz out of 40 MHz), the number $N_{RU}$ is automatically reduced to what the bandwidth available for random access permits (BW 330 and multiplexing flag 356 are obtained based on the reduced value of $N_{RU}$). In that case, the AP will use the next sub-steps to adjust the number of contending non-AP stations given $N_{RU}$.

Next to sub-step S6605, sub-step S6610 determines the Starting AID value 351 to be set in the NFRP trigger frame 1100 for random access.

Typical Starting AID value can be the lowest AID assigned to a currently active and registered (to the AP) non-AP station. Such value potentially lets it possible to authorize all the registered non-AP stations to contend for (random) access to the RU tone sets (provided that the scale factor determined below is adapted).

Other determination rules may be used. For instance, the AP may decide to assign (to non-AP STAs) AIDs from different AID ranges depending on respective STA's characteristics. As an example, range 100-300 is used for one type of non-AP stations (e.g. that do not support MU UL) and range 400-500 for another type of non-AP stations (e.g. supporting random access), The AP may thus set the Starting AID value 315 to 100 or 400 (beginning of the range) to only poll non-AP stations of one type. Consequently, the AP can apply priority mechanisms on the non-AP stations.

Sub-steps S6605 and S6610 are independent one to each other and can be executed in a reverse order: the AP may first determine the Starting AID based on a type of non-AP stations it wants to poll and then determine the number $N_{RU}$ of resources required.

In case of scheduled scheme (determined at sub-step S6600), next sub-step is S6625 described below. Otherwise, next sub-step is S6615 where the AP determines a number $N_{STA}$ of non-AP stations to poll. By this sub-step, the AP determines the contention level on the random-access RU tone sets.

A maximum efficiency of the random-access procedure is obtained for a number of contending non-AP stations equal to the number of available RU tone sets. It means that the number of non-AP stations trying to access the RU tone sets on a random basis should be equal (or as close as possible) to the number $N_{RU}$ of RU tone sets previously determined.

However, as all the non-AP stations of a given AID range are not trying or willing to access the RU tone sets on a random basis (some may have no data to transmit, some may be asleep or in power save mode), the AP may use additional statistics to set $N_{STA}$ to a larger number than $N_{RU}$.

For instance, the AP may build statistics such as the average random-access rate, computed as the ratio between the number of polled non-AP stations and the number of used RU tone sets from previous NRFP-based random accesses. Consequently, $N_{STA}$ may be the result of $N_{RU}$ multiplied by such ratio. The ratio and $N_{STA}$ may be updated dynamically as new NRFP-based random accesses are performed.

Once $N_{STA}$ is known, sub-step S6620 determines the value of the scale factor defining the ratio between the polling range of AIDs to poll in order to authorize $N_{STA}$ non-AP stations to random access and the conventional (802.11 ax) range of AIDs corresponding to $N_{RU}$.

As mentioned above, the range of assignable AIDs may be punctured. Therefore, it is often that the polling range width $N_{AID}$ of authorized AIDs must be larger than $N_{STA}$ to actually authorize $N_{STA}$ non-AP stations to contend for random access to the RU tone sets.

The AP thus determines a temporary polling range of AIDs, starting at the Starting AID and containing at the number $N_{STA}$ of non-AP stations to poll. A temporary scale factor $SF_{temp}$ is determined by computing the ratio between the width or size of the temporary polling range and the number $N_{RU}$ of RU tone sets offered to random access.

The temporary polling range and scale factor may be definitive ones in case the coding of this scale factor $SF_{temp}$ is lossless.

In lossy embodiments, the temporary scale factor is encoded based on a power of 2, meaning that an integer RA_SF is searched so that $2^{RA\_SF}$ equals the temporary scale factor or approximates it. For instance, RA_SF=floor $[\log_2 (SF_{temp})]$ [logarithm to base 2]. The ceiling function may be used instead of the floor function. In that case, the final scale factor SF is $2^{RA\_SF}$ and the final polling range is the range starting from Starting AID with a width $N_{AID}$ equal to $N_{RU} \times SF$.

Next at sub-step S6625, the NFRP trigger frame 1100 (either for scheduled or random access) is built and sent. Usually, the NFRP trigger frame 1100 is prepared and placed in a transmission buffer to be transmitted during the next transmission opportunity for the AP.

In particular, UL BW value and multiplexing flag determined at sub-step S6605 are provided in fields 330 and 356 respectively; Starting AID obtained at sub-step S6610 is added to field 351.

The AP adds an access type indication defining whether the RU tone sets are accessed on a random basis by the non-AP stations or whether a scheduled access is proposed.

Various implementations are contemplated.

In first implementations, the access scheme is defined in the Trigger Type field 320. This means that conventional NFRP type (value 7) is used in case of scheduled access and a new dedicated RA-NFRP type (e.g. value 8) is used to signal random access to the RU tone sets.

These first implementations allow a new frame format to be defined, in particular by adapting the Trigger Dependent Common Info field 340 so as to contain a range scaling field (discussed below, in particular with reference to FIG. 12) to convey the above RA_SF value.

In second implementations, the access scheme is defined in the Feedback Type field 353. For both scheduled and random-access schemes, the trigger frame 1100 is of the NFRP type (field 320 set to 7) wherein the Feedback Type field takes specific values for random access.

For instance, currently used value 0 indicate Resource Request (as feedback type) for the scheduled non-AP stations. Another value, e.g. 1, may merely indicate random access is provided to the RU tone sets, without any type of feedback required. In a variant, the other value may simultaneously indicate random access is offered for Resource Request only (i.e. the FEEDBACK_STATUS provided in response responds to the amount of resources compared to a threshold).

Of course, other Feedback Type values may be defined for other purposes (power sensing, data queue evaluation, sleep state) and provided for both scheduled and random-access schemes.

The second implementations advantageously prevent from creating a new type of trigger frame, meaning the decoding of the frames remain unchanged (this is only the interpretation of the Feedback Type value that modifies the non-AP station's behavior).

In third implementations, the access scheme is defined through the value of a range scaling field conveying the above RA_SF value. For both scheduled and random-access schemes, the trigger frame 1100 is of the NFRP type (field 320 set to 7) and the Feedback Type field may be set as conventionally done.

The value 0 in the range scaling field should correspond to a scale factor of $2^0=1$ which is meaningless to modify the conventional 802.1 lax range of AIDs. Therefore, this value (0) may be used to indicate scheduled (i.e. conventional) access to the RU tone sets, while a non-zero value may indicate random access. Of course, other specific values for scheduled access may be used.

The AP also adds to the NFRP trigger frame 1100 a range scaling field (already introduced above) that includes the value of RA_SF (or 0 for instance in case of scheduled access for the third implementations). This is this information item that makes it possible to define the scale factor SF ($=2^{RA\_SF}$) to obtain, from the 802.11 ax range of AIDS, the polling range of AIDs of non-AP stations authorized to access the plurality of RU tone sets on the random basis.

The range scaling field may be a two-bit or three-bit field in the NFRP trigger frame 1100. With three bits, the field can have a value between 0 and 7 giving a Scale Factor value between 1 and 128. For a typical NFRP trigger frame offering 18 RU tone sets, the AP can then poll up to 2304 non-AP stations on a random basis, which that is more than the number of available AIDs the AP can assigned to non-AP stations upon registration.

Various positions in the NFRP trigger frame 1100 can be used for the range scaling field.

For instance, the range scaling field is included in a Reserved field of a User Info field, either field 352 or field 354, of the NFRP trigger frame 1100. FIG. 12 illustrates the addition of a 3-bit range scaling field 3540 in the Reserved field 354.

In a variant, the range scaling field is included in the Trigger Dependent Common Info field 340 of the Common Info field 310 of the NFRP trigger frame 1100. This variant may be used for the first implementations above (where a new Trigger Frame type is defined).

At step S270, any non-AP station 101-107 receives the NFRP Trigger frame 1100 and decodes it. If the receiving non-AP station belongs to a BSS (or virtual BSS) of the transmitting AP, the Trigger Frame is not filtered by the PHY layer as defined in the standard. The filtering is made on so-called "colors" defined in the 802.11 ax standard, which mandates that the BSS colors of all the multiple BSSs managed by a single AP are the same.

At step S671, the non-AP STA determines, from the NFRP trigger frame, an access scheme to the RU tone sets. It thus retrieves the access type indication provided by the AP in the NFRP trigger frame 1100.

The non-AP STA may merely read the value of the Trigger Type field 320 for the first implementations: either it is 7 meaning a scheduled access scheme is requested or it is 8 meaning that a random-access scheme is implemented.

The non-AP STA may merely read the value of the Feedback Type field 353 for the second implementations: e.g. either it is 0 meaning a scheduled access scheme (with Resource Request type) is requested or it is 1 meaning that a random-access scheme (possibly with Resource Request type) is implemented.

For the third implementations, the non-AP STA may merely read the value of range scaling field 3540: e.g. either it is 0 meaning a scheduled access scheme is requested or it is non-zero meaning that a random-access scheme is implemented.

In case of scheduled access scheme, the process continues at step S272 of FIG. 2b.

Otherwise (random access scheme), next step is step S1172 where the non-AP STA determines the number $N_{RU}$ of RU tone sets available for random access.

The non-AP station computes $N_{RU}=N_{feedback}\times 2^{BW}\times$(MultiplexingFlag+1), with BW retrieved from field 330 and MultiplexingFlag retrieved from field 356.

Step S1172 substantially corresponds to the determination of the conventional 802.11 ax range of AIDs (made of $N_{RU}$ together with the Starting AID 351).

Next step is step S1173 where the non-AP station obtains the polling range of AIDs. This is done by first retrieving RA_SF from the range scaling field 3540, then by obtaining a scale factor SF from RA_SF of the range scaling field: $SF=2^{RA\_SF}$, then by computing the width $N_{AID}$ of the polling range as following: $N_{AID}=N_{RU}\times SF$ and by retrieving the Starting AID from field 351. The polling range is thus ["Starting AID"; "Starting AID"+$N_{AID}$].

The polling range thus corresponds to the 802.11 ax range rescaled by the scale factor SF, meaning the range width (or size) is rescaled by SF. In particular, the polling range has the same starting AID as the 802.11 ax range with a range width multiplied by the scale factor.

Next, step S1174 consists for the non-AP station to determine whether it is targeted by the received NFRP trigger frame or not. In particular, it includes checking whether the AID of the non-AP station is included in the polling range. If the STA's AID is lower than the sum of the Starting AID 351 and $N_{AID}$ value determined at step S1173, then the non-AP station is addressed by the current NFRP trigger frame, and can therefore contend to access one of the available RU tone sets on a random basis.

In the negative, the process ends.

In the affirmative, the process continues at step S674.

At step S674, the non-AP STA determines a random RU tone set 210 to send its short NDP feedback report response 211. The selection of the RU tone set is made on a random basis by selecting an index from among the available indexes. All the RU tone sets are available for contention.

The number of RU tone set indexes ($N_{RU}$) has been determined at step S1172.

The non-AP STA may then randomly select a random RU tone set Index to send its short feedback: RA_NFRP_SET_INDEX=random [0, $N_{RU}-1$]. Here, it is chosen to start the indexes at 0. In variant, the first index may have another value, e.g. 1 or above, and the provided formulae are modified accordingly.

In this random access procedure, the non-AP STA may still indicate different responses to the feedback type (field 353) polled by the RA-NFRP trigger frame 1100, depending on the group of tones used within the selected random RU tone set: for example, transmitting on the first group of RU tones 210a may indicate a FEEDBACK_STATUS equal to 0, and transmitting on the second group of RU tones 210b may indicate a FEEDBACK_STATUS equal to 1. In that case, the NDP feedback report response is transmitted on one of the two groups of tones.

Once the random RU tone set (RA_NFRP_SET_INDEX) has been randomly selected at step S674, the non-AP STA determines the FEEDBACK_STATUS value, if any at step S276 and then transmits the NDP Feedback Report response 211 using the appropriate group of tones in the selected random RU tone set (step S278): for instance, Station 1 transmits energy (NDP) on RU tone sets 210a as illustrated in FIG. 11.

The non-AP STA transmits the header 212 of TB Feedback PPDU 211 on the 20 MHz channel corresponding to the selected RA_NFRP_SET_INDEX, and transmits on each of the subcarrier indexes forming the group for the FEEDBACK_STATUS value, the value of the HE-LTF sequence 213.

As become apparent in the Figures, due to the random selection, some RU tone sets may be not randomly selected, so that the corresponding tone groups 210a and 210b are left unused. Such situation is shown by reference 610e in the Figures.

Also, the random selection of RA_NFRP_SET_INDEX may result in having two or more non-AP STAs selecting the same RU tone set. Such situation is shown by reference 610c in the Figures.

Anyway, the AP receives and decodes (S262) the RU tone sets where energy is present, to provide to its MAC layer a list of used RU_TONE_SET_INDEX and the corresponding Feedback responses (FEEDBACK_STATUS values) if any. At this stage, it is not possible for the AP to know which RU tone sets with energy are collided (610*c*) or not.

In particular, due to the invention, the AP receives responses from responding non-AP stations having AIDs in the polling range in case of random access, some of them possibly in the extended part of the range, i.e. outside the 802.11ax range defined by UL BW 330 and Multiplexing flag 356.

At step S664, the AP can send a subsequent trigger frame 620 to offer new opportunities (RUs) to the responding non-AP STAs, for example a 'Basic' type trigger frame or any convenient type. Preferably, the scheduled RUs are of narrow width (26 tones) to offer a maximum of nine RUs per 20 MHz channel. The AP may choose a subset of the responding non-AP STAs.

In case where the NFRP trigger frame 1100 was based on a scheduled access scheme, the subsequent trigger frame 620 is built conventionally as described in FIG. 2*a*.

In case where the NFRP trigger frame 1100 was based on a random-access scheme, the AP does not know, at this stage, which non-AP STAs have emit energy on a given RU tone set 210. Consequently, it is impossible for the AP to schedule the responding non-AP STAs through their AIDs in the trigger frame 620.

The AP may thus assign a scheduled resource unit to a responding station using the index RU_TONE_SET_INDEX of the corresponding responding RU tone set to define the AID (so-called AID12 field) associated with the scheduled RU.

The AP may directly use the index RU_TONE_SET_INDEX as value for the AID12 field.

However, in order to avoid these scheduled index-based AIDs to fall on conventionally-used AIDs (for BSS or for individual non-AP STAs, typically values from 1 to 2007 and some values below 2048 such as 2045 and 2046, and value 4095 is reserved to indicate start of a Padding field), the AID associated with the scheduled resource unit in the subsequent trigger frame may be built from the index RU_TONE_SET_INDEX of the responding RU tone set and from an offset value Offset_AID.

For instance, the AID12 field of a User Info field defining the scheduled RU may be set to RA_NDP_AID:

$$RA\_NDP\_AID = Offset\_AID + RA\_NFRP\_SET\_INDEX + STARTING\_STS\_NUM \times N_{feedback} \times 2^{BW}$$

where

RA_NFRP_SET_INDEX is a selected one from the indexes of the responding RU tone sets used by the responding non-AP STA, STARTING_STS_NUM is parameter handling the spatial multiplexing. It is a station parameter that corresponds to a starting spatial stream number minus 1. It is set to 0 if the MultiplexingFlag 356 of the NFRP trigger frame 1100 is set to 0 (no spatial multiplexing), otherwise it is set as follows:

$$STARTING\_STS\_NUM = entire\ value(RA\_NFRP\_SET\_INDEX/N_{feedback}/2^{BW})$$

The Offset_AID parameter is a predetermined offset value known by the non-AP STAs and the AP. In some embodiments, the Offset_AID parameter is transmitted by the AP to the stations in a management frame, e.g. periodically in beacon frames (each 100 ms).

Preferably, the Offset_AID parameter is selected such that any subsequent RA_NDP_AID falls outside the legacy range of Association Identifiers (AIDs) provided by AP to associated non-AP STAs. For instance, the offset value is 2048 or above. It is then added to the index RA_NFRP_SET_INDEX of the responding RU tone set to form the AID (AID12 field) associated with the scheduled resource unit.

Using an offset value of 2048 to form the 12-bit AID field makes it possible to work on the MSB (set to 1) to easily distinguish between conventional AIDs and those used for the present invention. Furthermore, it allows scheduled RUs for non-AP STAs responding to the RA-NFRP trigger frame 1100 to be mixed with scheduled RUs for other non-AP stations directly per their own AID value, with no risk of misunderstanding.

In case of mixing, the subsequent trigger frame 620 first declares all the resource units (it may be a single one) assigned to individual non-AP stations using their own assigned AID, and then declares all resource units (may be a single one) assigned to responding non-AP stations using indexes RA_NFRP_SET_INDEX of the responding RU tone sets (preferably using RA_NDP_AID).

Of course, the subsequent trigger frame 620 may only comprise resource units for non-AP stations responding to the RA-NFRP trigger frame 1100 (i.e. RUs with only AID12 set based on RA_NDP_AID).

In all case, the subsequent trigger frame may only comprise scheduled resource units (assigned to respective individual non-AP stations) without random RUs.

At step S664, the AP 110 thus sends the subsequent basic trigger frame 620 so built.

Any non-AP STA receiving the subsequent trigger frame 620 thus determines (step S680) whether it is scheduled, i.e. whether a resource unit is assigned to the non-AP station based on the index RA_NFRP_SET_INDEX of the responding RU tone set determined and used by the non-AP station at steps S674 and S278.

The non-AP STA having responded to the NFRP trigger frame 1100 uses the formula above to determine its own RA_NDP_AID and compares it to the AID12 fields specified in the User Info fields of the subsequent trigger frame 620. The non-AP STA thus determines whether an AID associated with a scheduled resource unit in the subsequent trigger frame corresponds to the index RA_NFRP_SET_INDEX used given the predefined offset value Offset_AID.

In a preferred embodiment where Offset_AID is set to value 2048, all RUs with MSB set to 1 are analyzed in order than the remaining value (not considering the MSB bit) equals to the RU tone set index RA_NFRP_SET_INDEX the non-AP station has previously used.

Of course, in case of mixing RUs with conventional AIDs and index-based AIDs, the non-AP station may be scheduled twice, in which case it should give priority to a scheduled RU with its own AID in order to offer the RU with its index-based AID (if any) to any other colliding non-AP STA having responded on the same RU tone set. In other words, if the non-AP station also determines in the subsequent trigger frame a resource unit that has an associated AID corresponding to an AID assigned by the AP to the non-AP station, the non-AP station discards or disregards the resource unit with the AID corresponding to the index of the selected responding RU tone set to use the resource unit with the assigned AID to send the trigger-based PPDU response. This approach reduces risks of collision in the RUs and may be easily achieved through the order of RU declaration performed by the AP in the subsequent trigger frame 620. Indeed, the non-AP STA may disregard any further User Info fields as soon as it finds one with its own AID. Therefore, placing the RUs with AIDs assigned upon registration before the RUs with index-based AIDs allows the above priority scheme to be naturally performed.

The non-AP station may thus first determine whether one Resource Unit is allocated to it by positively finding its station AID in the AID12 field of one RU. If not found, a further determination is performed in case that the non-AP station has previously sent a NDP feedback response 211 in response to the random-access NFRP trigger frame 1100. The further determination relies on the formula for determining RA_NDP_AID value, considering the RU tone index RA_NFRP_SET_INDEX used for the NDP Feedback report response and the predetermined offset value (Offset_AID).

In case of positive determination at step S680, the non-AP STA can use the RU scheduled to it and transmit data 231 (TB PPDU) to the AP. This is step S282. The TB PPDU 231 contains the MAC address of the sending non-AP station, making it possible for the AP to identify each sending non-AP station, in particular to retrieve the AID assigned to each sending non-AP station upon registration.

The AP 110 thus receives the TB Data PPDU 231 over the multiple scheduled RUs. It can then acknowledge (or not) the data on each RU by sending a multi-STA block acknowledgment (BA) response 240, making it possible for each sending non-AP STA to know when its data transmission is successful (reception of the ACK) or not (no ACK after expiry of a time-out). This is step S266.

For instance, it may not acknowledge data over RU 230-3 (FIG. 11) as it detects a collision.

As the acknowledgment (no collision) generally uses the AIDs of the sending non-AP stations, the AP 110 may obtain an AID of the responding non-AP stations using the MAC addresses specified in the TB Data PPDU 231 and thus retrieved therefrom. The stations are thus only discriminated at this final stage.

The example of FIG. 11 shows a single TXOP 660 during which the NDP Feedback Report procedure and subsequent UL MU operation are both conducted. This ensures that the feedback responses 211 are still relevant when they are exploited by the AP to provide the subsequent UL MU operation based on these responses. In addition, it advantageously avoids a random tone set index to be kept by a non-AP station outside the TXOP; otherwise, this would require keeping in memory this random index for further usage by Data trigger frame TF 620 or until a next NFRP trigger frame 1100.

However, TXOP 660 may be split into two separate TXOPs, and/or alternatively several subsequent trigger frames 620 (possibly cascaded) may be issued in order to address more non-AP stations responding to the NFRP trigger frame 1100 (as only 9 maximum stations per 20 MHz can be triggered for data RU transmission per Basic trigger frame).

The proposed random-access scheme according to the various second embodiments of the invention provides good efficiency similarly to first embodiments of the invention discussed above.

Also, by setting the range scaling field to appropriate scale factor values, the AP can dynamically control the number of non-AP stations concurrently contending to RU tone sets of a short feedback procedure. This allows the AP to achieve optimized network efficiency for random access.

Figure 13:
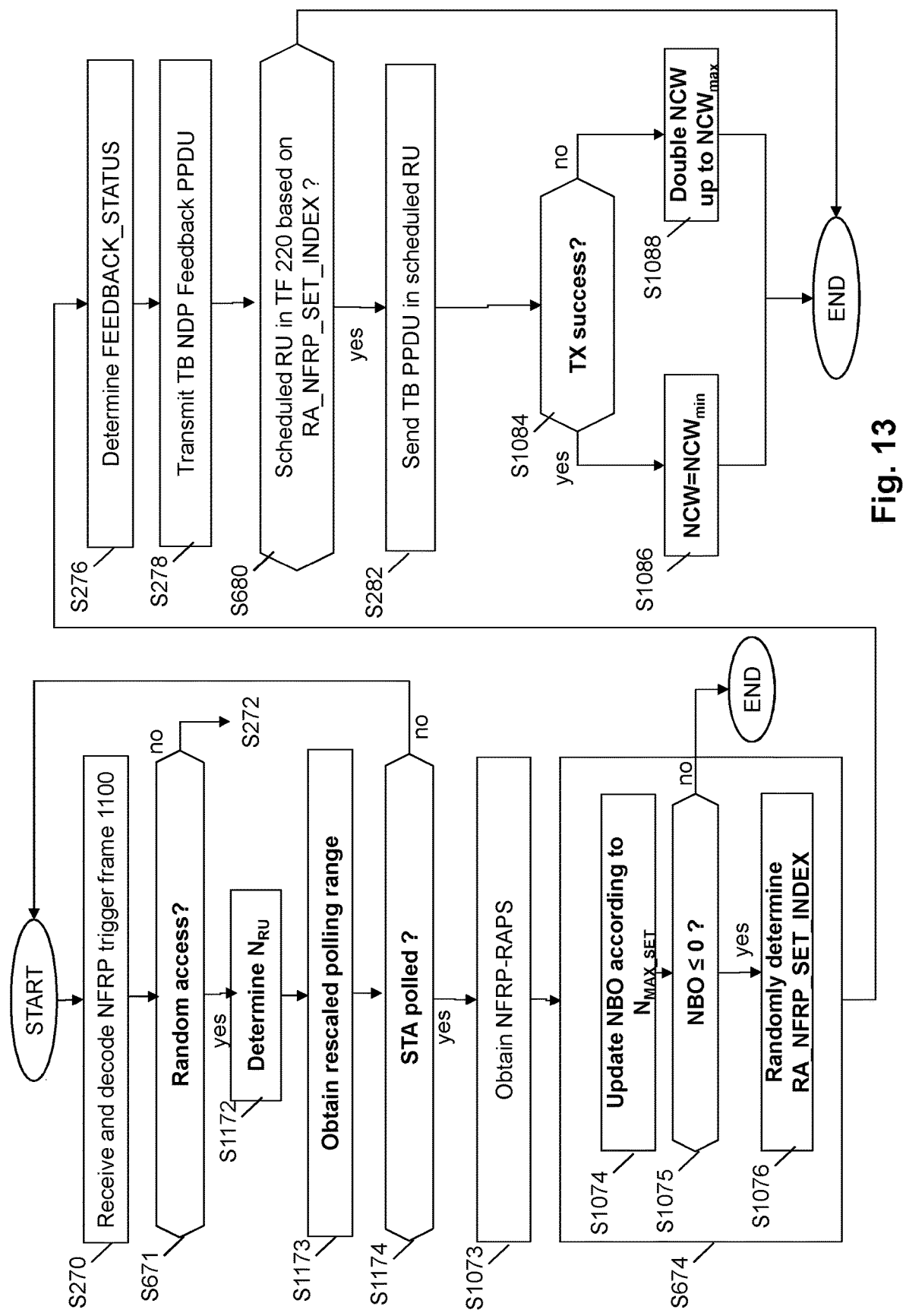
FIG. 13 illustrates, using a flowchart, general steps at a non-AP station using contention parameters to access the NFRP RU tone sets according to the other embodiments of the invention.

FIGS. 8 and 9 in combination with FIG. 13 illustrate other embodiments of the second embodiments of the present invention. Preceding description provides at step S674 a random selection of the RU tone set: RA_NFRP_SET_INDEX=random [0, $N_{RU}$-1].

In these other embodiments, randomly selecting a responding RU tone set is based on a contention-based access method using a decrementing NFRP backoff, NBO, counter local to the non-AP station. The NBO is handled using NFRP Random Access contention parameters including a NFRP contention window.

These other embodiments advantageously adapt in a suitable way the random-access scheme for NFRP RU Tone set indexes to the contention currently perceived in the network.

As described above, FIG. 8 illustrates, using a flowchart, exemplary general steps for the AP 110 to determine NFRP Random Access contention Parameters to be used by the non-AP stations when contending to the RA RU tone sets 210 and to build and send a management (e.g. beacon) frame including these Parameters. Also, FIG. 9 illustrates, using a flowchart, exemplary general steps for any non-AP station to determine the NFRP Random Parameters (NFRP-RAPS) from the management frame received from the AP and to use them, according to embodiments of the invention.

FIG. 13 illustrates, using a flowchart, general steps at a non-AP station using contention parameters to access the NFRP RU tone sets. FIG. 13 is based on FIGS. 2b and 11b, where similar reference numbers correspond to similar elements, frames and steps.

As for FIG. 11b, the non-AP station receives a NFRP trigger frame 1100 (S270), determines whether it provides random access (S671) and if so, the non-AP station determines $N_{RU}$ (S1172) and the polling range of AIDs (S1173) before determining whether it is polled or not (S1174).

If it is polled, next at step S1073, the non-AP station retrieved its local contention parameters, that is to say NBO and NCW.

NCW is initially set to $NCW_{min}$ and NBO is initially randomly drawn from [0, NCW]. In particular, each time the non-AP station associates with (or intends to transmit to) a different AP (or a different BSSID for non-AP STA with Multiple BSSID feature implemented), the non-AP station shall initially (i.e. prior to an initial transmission attempt triggered by the RA-NFRP trigger frame) set the value of NCW to $NCW_{min}$, and shall initialize its NBO counter to a random value drawn from a uniform distribution in the range 0 to NCW.

Step S674 of randomly selecting a RU tone set (or RA_NFRP_SET_INDEX) is updated to consider the new NFRP contention scheme.

It comprises a first sub-step S1074 of determining, from the received RA-NFRP trigger frame 1100, the NFRP Tone Set Indexes available (or eligible) for contention, i.e. $N_{RU}$ as defined above, and then of decrementing the NBO counter, e.g., NBO=NBO–$N_{RU}$.

For instance, if the NBO counter is not greater than the number $N_{RU}$ of eligible RU tone sets in the RA-NFRP trigger frame, the non-AP station sets the NBO counter to zero, otherwise the non-AP station decrements the NBO counter by the number $N_{RU}$ of eligible RU tone sets in the Trigger frame.

Next at sub-step S1075, the non-AP station determines whether the resulting NBO value is negative or null.

If NBO is positive, NBO is already prepared to wait a further RA-NFRP trigger frame 1100 for random access. The non-AP station is considered as not eligible to contend for access for the present RA-NFRP trigger frame 1100, and the process ends for this trigger frame 1100.

If NBO is negative or null (i.e. the NBO counter was not greater than the number $N_{RU}$), then the non-AP station randomly selects (S1076) one of the eligible RU tone sets, in particular randomly selects RA_NFRP_SET_INDEX.

RA_NFRP_SET_INDEX is for instance randomly drawn from the available random tone indexes [0, $N_{RU}$-1], as already described above.

In a variant, the non-AP station may use the last non-null (and non-negative) NBO counter (i.e. before step S1074) as RA_NFRP_SET_INDEX. This approach is still a random selection as the NBO counter has been randomly drawn. The RA_NFRP_SET_INDEX is selected in accordance to the value of NBO counter (which is also a random value, that fits into the range [0, $N_{RU}$]).

Once the RA_NFRP_SET_INDEX is known, the process continues with already-described steps S276 (determination of the FEEDBACK_STATUS value), S278 (transmission of the TB NDP feedback PPDU 211 on the appropriate group of tones), S680 (reception of the subsequent trigger frame 620 scheduling a RU for RA_NDP_AID corresponding to the non-AP station) and S282 (sending of a TB PPDU 231 in UL direction in response to the subsequent trigger frame 620).

As shown in FIG. 11a for instance, the AP then sends a Multi-STA Block Acknowledgment (BA) response 240 at step S266. Although this acknowledgment is directly relying on reliability concerns (e.g. increasing of the sequence number of correct MPDU frames and liberation of space in transmission buffers), this information is important for contention mechanism of the RA-NFRP scheme. Indeed, this is the first time for the non-AP station to be aware of the correct completeness of the random access. It may thus adapt its contention parameters accordingly, for instance its NCW contention value.

Step S1084 is executed when the UL OFDMA transmission finishes on an accessed scheduled RU, upon having the status of transmission; either by receiving a positive or negative acknowledgment from the AP (a negative acknowledgment may be determined by not receiving an acknowledgment after an UL OFDMA transmission). Step S1084 thus determines whether the UL OFDMA transmission was successful or not, for instance by determining whether an acknowledgment of the trigger-based PPDU response is received from the AP (if not, the transmission was unsuccessful).

In case of successful MU UL OFDMA transmission, the non-AP station sets the NFRP contention window, NCW, to a (predetermined) low boundary value, for instance $NCW_{min}$ of the NFRP-RAPS of the station's BSS, and initializes the NBO counter to an integer value randomly selected from a uniform distribution in the range 0 to NCW. This is step S1086.

In case of unsuccessful MU UL OFDMA transmission, the non-AP station may double NCW and draw a new NBO value. For instance, it updates the NCW to 2×NCW+1 when NCW cannot be above $NCW_{max}$ of the NFRP-RAPS of the station's BSS, and randomly selects the NBO counter in the range of 0 and NCW. This is step S1088.

In the case that the non-AP station has transmitted NDP energy 211 on a randomly-selected RU tone set due to the expiration of its NBO counter (step S1074) but the non-AP station has not been scheduled in the subsequent trigger frame 620 (no step S282), the NCW value local to the non-AP station is not updated through steps S1086 or S1088, but kept unchanged. This is because the missing scheduling (by trigger frame 620) may be due to a decision (or selection) by the AP (e.g. too many non-AP stations may have responded to the RA-NFRP trigger frame 1100 compared to the 9 RUs available for subsequent UL MU OFDMA transmission). No information is provided on tone contention, so the value of NCW is kept unchanged.

The embodiment of FIG. 13, similarly to FIG. 10 for first embodiments, thus relates to a contention method based on a computation of backoff values corresponding to a number of RU Tone Sets or corresponding Indexes a non-AP station waits before sending energy on a RU Tone Set.

Figure 14:
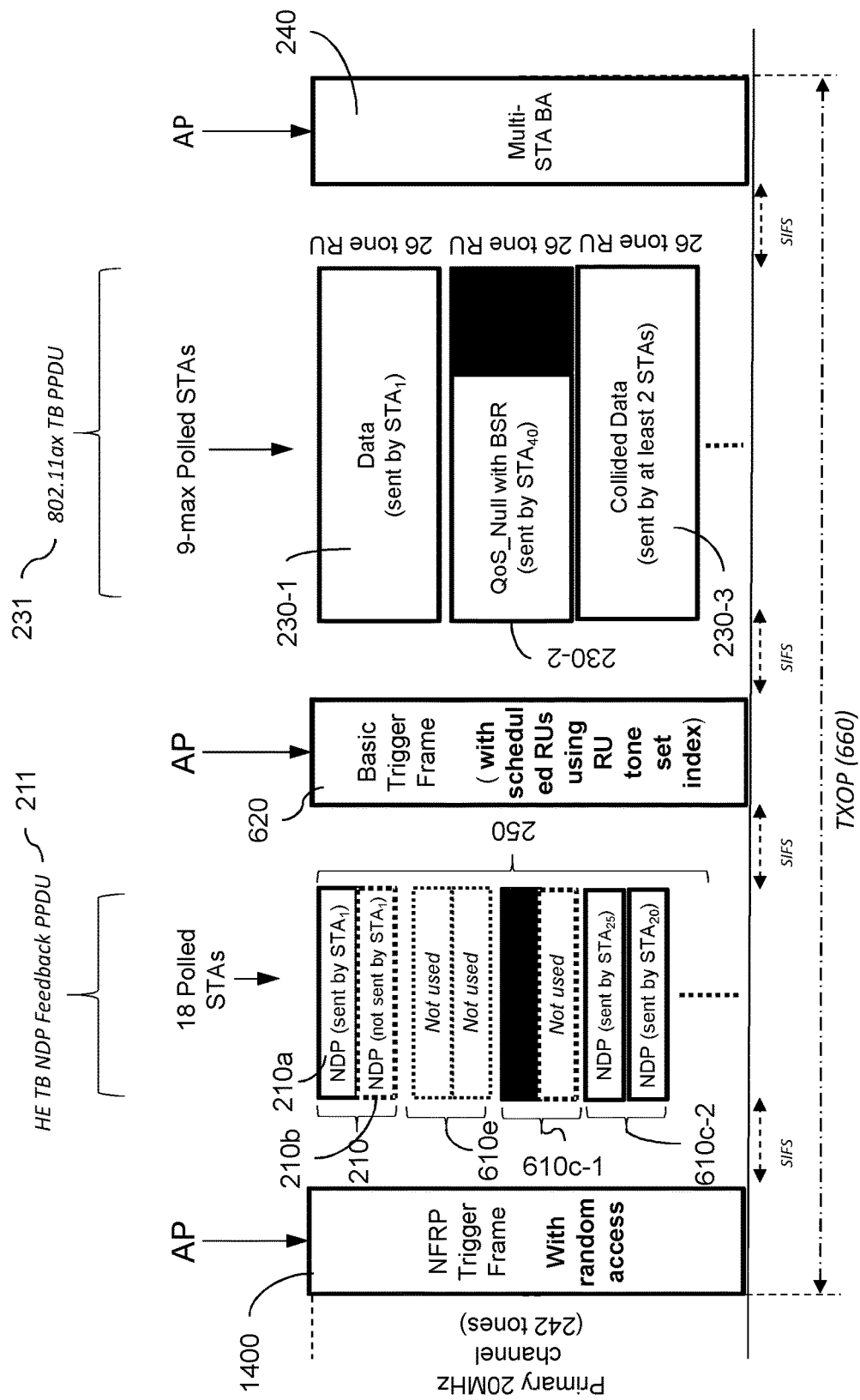
FIG. 14 illustrates, using the same scenario as FIG. 2, third embodiments of the invention providing random access to the RU tone sets during the NDP short feedback report procedure.

FIG. 14 uses the same timeline as FIG. 2 to illustrate third embodiments of the invention providing random access to the RU tone sets during the NDP short feedback report procedure. FIGS. 14a and 14b illustrate, using flowcharts, corresponding general steps at the AP and a non-AP STA, respectively. The reference numbers are unchanged when referring to the same elements, frames and steps as in FIG. 2.

At step S660, the AP 110 polls a large group of non-AP STAs to know their needs for transmission, by accessing the network using conventional EDCA medium access mechanism and then sending a random-access (RA) NFRP trigger frame 1400, i.e. which provides random access to the RU tone sets it defines. The decision of the AT to provide RA-NFRP trigger frame and not a conventional RA-NFRP trigger frame is outside the scope of the invention.

The AP determines the number $N_{RU}$ of resources (here RU tone sets) to allocate to the non-AP stations for random access. The AP can then infer UL BW value 330 and multiplexing flag 356 that match (or approximate) the number $N_{RU}$ such that $$N_{RU}=N_{feedback} \times 2^{BW} \times (\text{MultiplexingFlag}+1). \text{ As currently defined in 802.11 ax D4.1}, N_{feedback}=18.$$

According to the invention, two levels of random selection can be implemented at the stations to respond and thus are signaled in the RA-NFRP trigger frame 1400: random selection of a responding RU tone set from the available RU tone sets and random selection of one of the groups of tones forming the selected responding RU tone set.

Both signaling can be embedded in the same signaling field or can be encoded using two separate fields (a RU tone set access type indication for the first random selection and a tone group access type indication for the second random selection) in the RA-NFRP trigger frame 1400.

Exemplary signaling are proposed below.

In some embodiments, the Starting AID field 351 is set to a predefined AID value defining a random access for the stations to the plurality of RU tone sets. This sharply contrasts with the "Starting AID" field conventionally used which defines the first AID of a restricted range of AIDs scheduled to respond to the RA-NFRP Trigger frame.

Thanks to this specific predefined value, the non-AP STAs can know that a random scheme is requested for sending their feedback response to the AP.

If various predefined values are available, the AP may perform a strategy step based on network statistics and/or on history to decide which group of non-AP STAs has to be polled by the next RA-NFRP trigger frame 1400.

Where no multiple BSSs are managed by the AP, the predefined AID value may be set to
  an AID targeting all the stations yet associated with the AP, e.g. predefined AID value=0, or
  an AID reserved for non-AP stations not yet associated with the AP, e.g. predefined AID value=2045. All the non-AP stations willing to join the AP can thus be polled and therefore known by the AP, for instance to speed up their registration/association process by providing subsequent RUs as described below.

Where multiple BSSID feature is implemented at the AP, the predefined AID value may be set to a Basic Service Set Identifier, BSSID, index of a BSS to poll all the non-AP stations belonging to this BSS, i.e. to 0 for transmitted BSSID or to the value of the BSSID Index corresponding to that BSS for a non-transmitted BSSID, or an AID targeting all the non-AP stations yet associated with the AP, regardless of their BSSs, e.g. predefined AID value=2047, or an AID reserved for non-AP stations not yet associated with the AP, e.g. predefined AID value=2045. All the non-AP stations willing to join the AP or a BSS can thus be polled and therefore known by the AP, for instance to speed up their registration/association process by providing subsequent RUs as described below.

All these proposed values (0, BSSID indexes, 2045, 2047) are outside the reserved range of AIDs that the AP is authorized to assign to individual non-AP stations upon registration. Of course, any other value not associated with a specific station could be selected.

In other embodiments, the access scheme (either at RU tone set level and/or at tone group level) is defined in the Trigger Type field 320. This means that conventional NFRP type (value 7) is used in case of scheduled access and a new dedicated RA-NFRP type (e.g. value 8) is used to signal random access to the RU tone sets.

In yet other embodiments, the access scheme (either at RU tone set level and/or at tone group level) is defined in the Feedback Type field 353.

For instance, currently used value 0 indicate Resource Request (as feedback type) for scheduled non-AP stations as conventionally done. Another value, e.g. 1, may merely indicate random access is provided to the RU tone sets and to the tone groups, without any type of feedback required. Two values, e.g. 1 and 2 may allow distinguishing between a random access scheme at RU tone set level only and a random access scheme at both RU tone set and tone group levels.

Of course, other Feedback Type values may be defined for other purposes (power sensing, data queue evaluation, sleep state) and provided for both scheduled and random access schemes.

The yet other embodiments advantageously prevent from creating a new type of trigger frame, meaning the decoding of the frames remain unchanged (this is only the interpretation of the Feedback Type value that modifies the non-AP station's behavior).

In other embodiments, the access scheme is defined using a new field (not defined in 802.11 ax D4.1), for instance a dedicated random-access signaling field in a User Info field of the NFRP trigger frame according to Draft 4.1 of IEEE 802.11 ax, e.g. in a Reserved field 352 or 354 of the User Info field 350.

Any of these signaling schemes may be used to signal at once both random accesses at RU tone set level and at tone group level.

In a variant, any of these signaling schemes may be used to signal one of the two levels, e.g. be a RU tone set access type indication to signal random access at RU tone set level, while the other level (e.g. tone group level) is signaled using a separate field, either one of the preceding one or an additional one. The AP can thus choose between a single-step random selection approach (only the choice of the RU tone set is made randomly) and a two-step random selection approach (where the choice of the group of tones is also made randomly).

For example, the RU tone set access type indication may be provided through a specific AID value in field 351 or a new Trigger Frame type in field 320 or a new Feedback Type in field 353 and the tone group access type indication may be provided by an additional dedicated tone group random-access signaling (one-bit) flag provided in Reserved field 352 or 354 or in Trigger Dependent Common Info field 340.

Also, the RU tone set access type indication may be provided through a specific AID value in field 351 or a new Trigger Frame type in field 320 and the tone group access type indication may be provided by a dedicated Feedback Type in field 353.

At step S660, the AP 110 also defines the range of polled non-AP stations that will concurrently access the RU tone sets based on a random scheme.

As mentioned above, specific values in the Starting AID field 351 may define groups of polled non-AP stations for random access to the RU tone sets.

In variants, the polling range of AIDs polled by the NFRP trigger frame is defined by the Starting AID field 351, the channel bandwidth field 330 and a multiplexing flag field 356 using the above formula $N_{RU}$ to define the range ["Starting AID"; "Starting AID"+$N_{RU}$].

Other variants may rely on one or more additional fields (e.g. in Reserved field 352 and/or 354) to define range borders, for instance an Ending AID which can be combined with Starting AID 351 to form polling range ["Starting AID"; "Ending AID" ].

At step S270, any non-AP station 101-107 receives a NFRP Trigger frame and decodes it. If the receiving non-AP station belongs to a BSS (or virtual BSS) of the transmitting AP, the Trigger Frame is not filtered by the PHY layer as defined in the standard. The filtering is made on so-called "colors" defined in the 802.11ax standard, which mandates that the BSS colors of all the multiple BSSs managed by a single AP are the same.

At step S671, the non-AP STA determines, from the NFRP trigger frame, the access scheme to be applied to access the RU tone sets: scheduled, single-step random access or two-step random access.

The non-AP STA retrieves the access type indication provided by the AP in the NFRP trigger frame 1400, either a single indication signaling at once both random accesses at RU tone set level and at tone group level or the RU tone set access type indication This step merely consists for the non-AP station in reading the appropriate field:

the value of the Trigger Type field 320 in some embodiments: either it is 7 meaning a scheduled access scheme is requested or it is 8 meaning that a random-access scheme is implemented;

the value of the Feedback Type field 353 for other embodiments: e.g. either it is 0 meaning a scheduled access scheme (with Resource Request type) is requested or it is 1 meaning that a random-access scheme (possibly with Resource Request type) is implemented;

the value of a dedicated new field in Reserved field 352 or 354 of the User Info field 350; or the value of the Starting AID field 351: if the value belongs to the range of AIDs reserved to individual non-AP stations, the conventional processing (FIG. 2b) is performed. If not, a random-access scheme is provided by the NFRP trigger frame 1400.

The non-AP STA thus knowns whether the RU tone sets are scheduled to specific non-AP stations or are available to contention (random access). In case of random access, the non-AP STA also knows whether a single-step random access (i.e. random selection on the RU tone sets only) or a two-step random access (random selection on the RU tone sets and thereafter on the tone groups) has to be implemented.

In case of a scheduled access scheme, the process continues at step S272 of FIG. 2.

Otherwise (random access scheme), next step is step S1174 where the non-AP station determines whether it is polled by the RA-NFRP trigger frame 1400.

This is done by checking whether the AID of the non-AP station belongs to the polling range as defined above.

For instance, if the value of the Starting AID is 0, BSSID indexes, 2045 or 2047, the non-AP STA checks whether it belongs to the group of non-AP stations targeted by the value (0 for any yet registered non-AP station in case of no multiple BSSID feature, BSSID index for non-AP stations of the corresponding BSS, 2045 for non-yet-associated stations, 2047 for any non-AP station already associated with the AP whose MAC address [BSSID] is specified in TA field of the MAC header).

In the negative of test S1174, the process ends.

In the affirmative, the process continues at step S673 where the non-AP STA determines whether it has interest in responding or not. In the negative the process ends. In the affirmative, the process continues at step S674.

At step S674, the non-AP STA first determines a random RU tone set 210 to send its short NDP feedback report response 211. The selection of the RU tone set is made on a random basis by selecting an index from among the available indexes. All the RU tone sets are available for contention. Optionally, only the RU tone sets that fit into station capabilities are eligible for contention (e.g. a station operating on a limited band BW such as a 20 MHz-only station).

The number of RU tone set indexes ($N_{MAX\_SET}$) may be determined based on the following formula as above: $N_{MAX\_SET} = N_{feedback} \times 2^{BW} \times (\text{MultiplexingFlag}+1)$. $N_{MAX\_SET}$ equals $N_{RU}$ determined by the AP to build the NFRP trigger frame 1400 (see step S660 above).

The non-AP STA may then randomly select a random RU tone set Index to send its short feedback: RA_NFRP_SET_INDEX=random [0, $N_{MAX\_SET}$−1]. Here, it is chosen to start the indexes at 0. In variant, the first index may have another value, e.g. 1 or above, and the provided formulae are modified accordingly.

In other embodiments, randomly selecting a responding RU tone set is based on a contention-based access method using a decrementing NFRP backoff, NBO, counter local to the non-AP station. The NBO is handled using NFRP Random Access contention parameters including a NFRP contention window.

If the random-access scheme provided by RA-NFRP Trigger Frame 1400 includes random access at tone group level (test S675), the non-AP station randomly selects (step S676) one of the $N_{feedback}$ groups of tones in the selected responding RU tone set having RA_NFRP_SET_INDEX. This is equivalent to randomly selecting a value for FEEDBACK_STATUS. Next step is step S278.

Note that since a random selection is performed between the possible values for the FEEDBACK_STATUS, the FEEDBACK_STATUS value is meaningless in the two-step random access mechanism. Consequently, the Feedback Type field 353 no longer defines a question with various possible responses.

If the random-access scheme provided by RA-NFRP Trigger Frame 1400 does not includes random access at tone group level (test S675), the process goes to step S276, where the non-AP STA determines the FEEDBACK_STATUS value.

Next to step S676 or S276, the non-AP station transmits the NDP Feedback Report response 211 using the selected group of tones (corresponding to the FEEDBACK_STATUS so determined or randomly selected) in the selected random RU tone set (step S278): for instance, Station 1 transmits energy (NDP) on RU tone sets 210a as illustrated in FIG. 14.

The non-AP STA transmits the header 212 of HE TB Feedback PPDU 211 on the 20 MHz channel corresponding to the selected RA_NFRP_SET_INDEX, and transmits on each of the subcarrier indexes forming the group for the FEEDBACK_STATUS value, the value of the HE-LTF sequence 213.

As become apparent in the Figures, due to the random selection, some RU tone sets may be not randomly selected, so that the corresponding tone groups 210a and 210b are left unused. Such situation is shown by reference 610e in the Figures.

Also, the random selection of RA_NFRP_SET_INDEX may result in having two or more non-AP STAs selecting the same RU tone set. Such situation is shown by reference 610c in the Figures.

For instance, two (or more) non-AP STAs may select and thus transmit simultaneously on the same group of tones (see 610c-1). In other cases, two (or more) non-AP STAs may randomly select and thus transmit simultaneously on different groups of tones (see 610c-2) within the same RU tone set.

Anyway, the PHY of the AP receives and decodes (S262) the RU tone sets where energy is present, to provide to its MAC layer a list of used RU_TONE_SET_INDEX and the corresponding Feedback responses (FEEDBACK_STATUS values).

At step S663, the AP determines collision in a responding RU tone set where two or more groups of tones of the responding RU tone set convey NDP feedback report responses. The AP may analyze each RU tone set:
- either no FEEDBACK_STATUS value is obtained from the PHY layer, meaning the RU tone set has not been used;
- or a single FEEDBACK_STATUS value is obtained from the PHY layer, meaning the RU tone set has been used and no collision has been detected for the time being (however an undetectable collision may have occurred, the energy of the two responding non-AP stations being added);
- or two (or more, up to $N_{feedback}$) FEEDBACK_STATUS values are obtained from the PHY layer, meaning the RU tone set has been collided by two or more responding non-AP stations. In other words, the RU tone set is detected as collided if two of its tone groups are used by responding non-AP stations.

Figure 15:
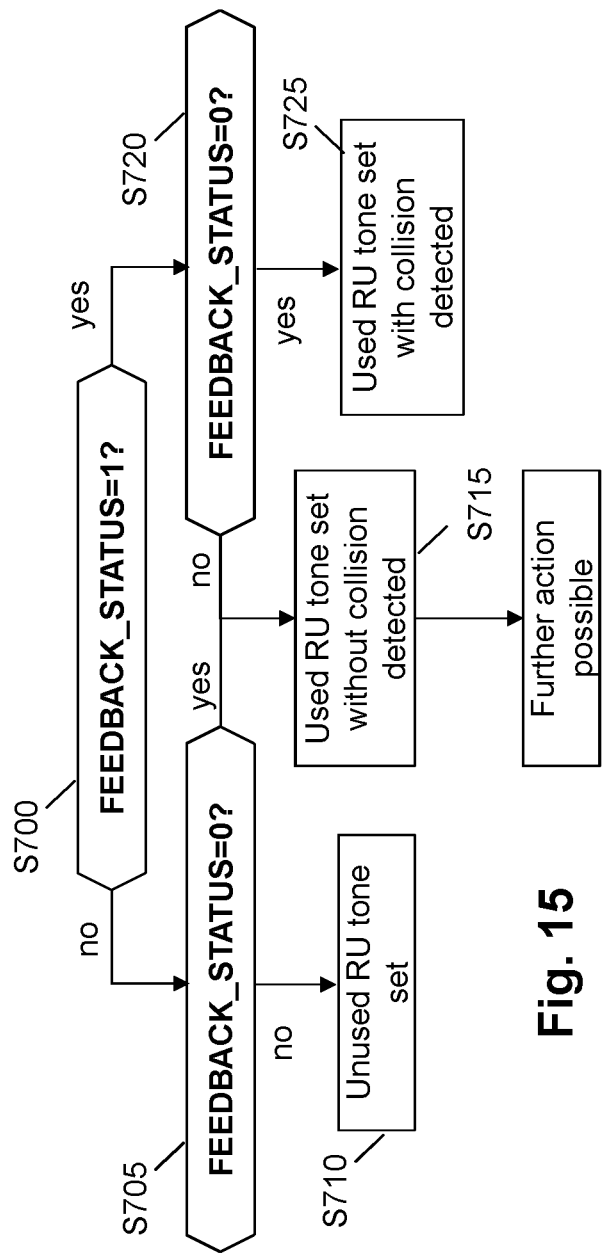
FIG. 15 illustrates, using a flowchart, exemplary steps of determining collision in a responding RU tone sets, according to embodiments of the invention.

For example, FIG. 15 shows, using a flowchart, an exemplary processing of the collision determination for a given RU tone set made of two-tone groups (meaning two values of the FEEDBACK_STATUS may be used by a responding non-AP station as in 802.11 ax D4.1).

It is first determined at step S700 whether a FEEDBACK_STATUS equal to 1 is received by the AP.

If not, it is determined at step S705 whether a FEED-BACK_STATUS equal to 0 is received by the AP for the current RU tone set. If not, no energy is finally detected on the RU tone set, which is thus detected as unused (S710). Otherwise, a single FEEDBACK_STATUS has been received: the RU tone set is used and no collision has been detected (S715), i.e. a collision, if any, is undetectable by the AP at this stage. This RU tone set can thus be used to schedule the corresponding responding non-AP station during a subsequent UL MU transmission.

In the affirmative of step 700, it is determined at step S720 whether a FEEDBACK_STATUS equal to 0 is also received by the AP for the current RU tone set. If not, a single FEEDBACK_STATUS have been received: the RU tone set is used and no collision has been detected (S715), i.e. a collision, if any, is undetectable by the AP at this stage. Otherwise, two FEEDBACK_STATUS have been received meaning that at least two non-AP stations have responded using the same RU tone set: the RU tone set is collided (S725) and can no longer be referenced by the AP in a subsequent UL MU transmission.

Of course, the processing of FIG. 15 can be changed, for instance by first detecting a response with FEEDBACK_STATUS=0 and then with FEEDBACK_STATUS=1.

The AP can thus detect half of the collisions during the short feedback procedure (for RU tone sets made of two groups of tones). For RU tone sets made of $N_{feedback}$ groups of tones, the detection ratio increases to $(N_{feedback}-1)/N_{feedback}$.

At step S664, the AP can send a subsequent trigger frame 620 to offer new opportunities (RUs) to only the responding non-AP STAs of the responding RU tone sets in which no collision is detected by the AP, for example a 'Basic' type trigger frame or any convenient type. Indeed, where a collision has been detected, several non-AP stations are liable to use the new opportunity offered for the user of the responding RU tone set: this will inevitably result in a new collision.

Preferably, the scheduled RUs are of narrow width (26 tones) to offer a maximum of nine RUs per 20 MHz channel. The AP may choose a subset of the responding non-AP STAs.

However, at this stage, the AP does not know which non-AP STAs have emit energy on a given RU tone set 210. Consequently, it is impossible for the AP to schedule the responding non-AP STAs through their AIDs in the trigger frame 620.

The AP may thus assign a scheduled resource unit to a responding station using the index RU_TONE_SET_INDEX of the corresponding responding RU tone set to define the AID (so-called AID12 field) associated with the scheduled RU.

The AP may directly use the index RU_TONE_SET_INDEX as value for the AID12 field.

However, in order to avoid these scheduled index-based AIDs to fall on conventionally-used AIDs (for BSS or for individual non-AP STAs, typically values from 1 to 2007 and some values below 2048 such as 2045 and 2046, and value 4095 is reserved to indicate start of a Padding field), the AID associated with the scheduled resource unit in the subsequent trigger frame may be built from the index RU_TONE_SET_INDEX of the responding RU tone set and from an offset value Offset_AID.

For instance, the AID12 field of a User Info field defining the scheduled RU may be set to RA_NDP_AID:

$$RA\_NDP\_AID = \text{Offset\_AID} + RA\_NFRP\_SET\_INDEX + STARTING\_STS\_NUM \times N_{feedback} \times 2^{BW}$$

where

RA_NFRP_SET_INDEX is a selected one from the indexes of the responding RU tone sets used by the responding non-AP STA, STARTING_STS_NUM is a parameter handling the spatial multiplexing. It is a station parameter that corresponds to a starting spatial stream number minus 1. It is set to 0 if the MultiplexingFlag 356 of the RA-NFRP trigger frame 1400 is set to 0 (no spatial multiplexing), otherwise it is set as follows:

$$STARTING\_STS\_NUM = \text{entire value}(RA\_NFRP\_SET\_INDEX / N_{feedback} / 2^{BW})$$

The Offset_AID parameter is a predetermined offset value known by the non-AP STAs and the AP. In some embodiments, the Offset_AID parameter is transmitted by the AP to the stations in a management frame, e.g. periodically in beacon frames (each 100 ms).

Preferably, the Offset_AID parameter is selected such that any subsequent RA_NDP_AID falls outside the legacy range of Association Identifiers (AIDs) provided by AP to associated non-AP STAs. For instance, the offset value is 2048 or above. It is then added to the index RA_NFRP_SET_INDEX of the responding RU tone set to form the AID (AID12 field) associated with the scheduled resource unit.

Using an offset value of 2048 to form the 12-bit AID field makes it possible to work on the MSB (set to 1) to easily distinguish between conventional AIDs and those used for the present invention. Furthermore, it allows scheduled RUs for non-AP STAs responding to the RA-NFRP trigger frame 1400 to be mixed with scheduled RUs for other non-AP stations directly per their own AID value, with no risk of misunderstanding.

In case of mixing, the subsequent trigger frame 620 first declares all the resource units (it may be a single one) assigned to individual non-AP stations using their own assigned AID, and then declares all resource units (may be a single one) assigned to responding non-AP stations using indexes RA_NFRP_SET_INDEX of the responding RU tone sets (preferably using RA_NDP_AID).

Of course, the subsequent trigger frame 620 may only comprise resource units for non-AP stations responding to the RA-NFRP trigger frame 1400 (i.e. RUs with only AID12 set based on RA_NDP_AID).

In all case, the subsequent trigger frame may only comprise scheduled resource units (assigned to respective individual non-AP stations) without random RUs.

At step S664, the AP 110 thus sends the subsequent basic trigger frame 620 so built.

Any non-AP STA receiving the subsequent trigger frame 620 thus determines (step S680) whether it is scheduled, i.e. whether a resource unit is assigned to the non-AP station based on the index RA_NFRP_SET_INDEX of the responding RU tone set determined and used by the non-AP station at steps S674 and S278.

The non-AP STA having responded to the RA-NFRP trigger frame 1400 uses the formula above to determine its own RA_NDP_AID and compares it to the AID12 fields specified in the User Info fields of the subsequent trigger frame 620. The non-AP STA thus determines whether an AID associated with a scheduled resource unit in the subsequent trigger frame corresponds to the index RA_NFRP_SET_INDEX used given the predefined offset value Offset_AID.

In a preferred embodiment where Offset_AID is set to value 2048, all RUs with MSB set to 1 are analyzed in order than the remaining value (not considering the MSB bit) equals to the RU tone set index RA_NFRP_SET_INDEX the non-AP station has previously used.

Of course, in case of mixing RUs with conventional AIDs and index-based AIDs, the non-AP station may be scheduled twice, in which case it should give priority to a scheduled RU with its own AID in order to offer the RU with its index-based AID (if any) to any other colliding non-AP STA having responded on the same RU tone set. In other words, if the non-AP station also determines in the subsequent trigger frame a resource unit that has an associated AID corresponding to an AID assigned by the AP to the non-AP station, the non-AP station discards or disregards the resource unit with the AID corresponding to the index of the selected responding RU tone set to use the resource unit with the assigned AID to send the trigger-based PPDU response. This approach reduces risks of collision in the RUs in particular for those corresponding to responding RU tone sets in which the AP has not detected a collision using the invention. This approach may be easily achieved through the order of RU declaration performed by the AP in the subsequent trigger frame 620. Indeed, the non-AP STA may disregard any further User Info fields as soon as it finds one with its own AID. Therefore, placing the RUs with AIDs assigned upon registration before the RUs with index-based AIDs allows the above priority scheme to be naturally performed.

The non-AP station may thus first determine whether one Resource Unit is allocated to it by positively finding its station AID in the AID12 field of one RU. If not found, a further determination is performed in case that the non-AP station has previously sent a NDP feedback response 211 in response to the random-access NFRP trigger frame 1400. The further determination relies on the formula for determining RA_NDP_AID value, considering the RU tone index RA_NFRP_SET_INDEX used for the NDP Feedback report response and the predetermined offset value (Offset_AID).

In case of positive determination at step S680, the non-AP STA can use the RU scheduled to it and transmit data 231 (TB PPDU) to the AP. This is step S282. The TB PPDU 231 contains the MAC address of the sending non-AP station, making it possible for the AP to identify each sending non-AP station, in particular to retrieve the AID assigned to each sending non-AP station upon registration.

The nature of the transmitted data may be function of the RA-NFRP trigger frame 1400 previously received, for instance function of the Feedback type 353 (not applicable if random selection at tone group level is implemented) and/or of the group of non-AP stations targeted by the predefined AID value in field 351.

As an example, if the feedback type indication 353 of the RA-NFRP trigger frame 1400 is for a resource request, then the non-AP station may emit a data frame as it has packets in its queues and has asked (through NDP feedback report response 211) to be triggered in the next UL MU operation.

As another example, if the RA-NFRP trigger frame 1400 is targeting non-associated stations (e.g. predefined AID value set to 2045), then the non-AP station may emit at least one association management frame, such as a Probe Request or (Re)Association Request or Authentication Request. This is because it intends to register with the AP. It turns that the association procedure is substantially speeded up compared to conventional techniques.

This approach of adjusting the nature of the data is illustrated in FIG. 14:

- Station 1 has randomly picked up a RU tone set index having value 0 (NDP feedback emitted on the first tone set), then its allocated scheduled RU 230-1 with RA_NDP_AID=2048;
- Station 40 has randomly picked up a RU tone set index having value 6 (NDP feedback emitted on 7th tone set—not shown), then its allocated scheduled RU 230-2 with RA_NDP_AID=2054;
- at least two stations have randomly picked up the same RU tone set index having value 2 (NDP feedback emitted on the third tone set corresponding to 610c-1), then they are allocated the same RU 230-3 because they use the same RA_NDP_AID=2050. As a result, the at least two non-AP stations collide in the RU 230-3.

Thanks to the collision detection of the present invention, the two stations having randomly picked up the same RU tone set index having value 3 (NDP feedback emitted on the fourth tone set corresponding to 610c-2) and having used different group of tones within the RU tone set, are not scheduled in the subsequent trigger frame 620.

The AP 110 thus receives the TB Data PPDU 231 over the multiple scheduled RUs. It can then acknowledge (or not) the data on each RU by sending a multi-STA block acknowledgment (BA) response 240, making it possible for each sending non-AP STA to know when its data transmission is successful (reception of the ACK) or not (no ACK after expiry of a time-out). This is step S266.

For instance, it may not acknowledge data over RU 230-3 (FIG. 14) as it detects a collision.

As the acknowledgment (no collision) generally uses the AIDs of the sending non-AP stations, the AP 110 may obtain an AID of the responding non-AP stations using the MAC addresses specified in the TB Data PPDU 231 and thus retrieved therefrom. The stations are thus only discriminated at this final stage.

For non-yet-associated non-AP stations having responded to the RA-NFRP trigger frame 1400 (having predefined AID value to 2045 for instance), the AP still uses the MAC address of the sending non-AP station in the acknowledgment frame because no AID is available for this station. This corresponds to the Pre-association ack context according to the 802.11 ax standard, which acknowledges pre-association Management frames for multiple STAs using a single Multi-STA BlockAck frame.

The examples of FIG. 14 show a single TXOP 660 during which the NDP Feedback Report procedure and subsequent UL MU operation are both conducted. This ensures that the feedback responses 211 are still relevant when they are exploited by the AP to provide the subsequent UL MU operation based on these responses. In addition, it advantageously avoids a random tone set index to be kept by a non-AP station outside the TXOP; otherwise, this would require keeping in memory this random index for further usage by Data trigger frame TF 620 or until a next RA-NFRP trigger frame 1400.

However, TXOP 660 may be split into two separate TXOPs, and/or alternatively several subsequent trigger frames 620 (possibly cascaded) may be issued in order to address more non-AP stations responding to the NFRP trigger frame 1400 (as only 9 maximum stations per 20 MHz can be triggered for data RU transmission per Basic trigger frame).

The proposed random-access scheme provides good efficiency: the collision is largely performed on the NDP feedback responses 211 which are shorter in duration and some of them are early detected during the short feedback procedure, and the RUs used for TB PPDU 231 are never empty.

Figure 16:
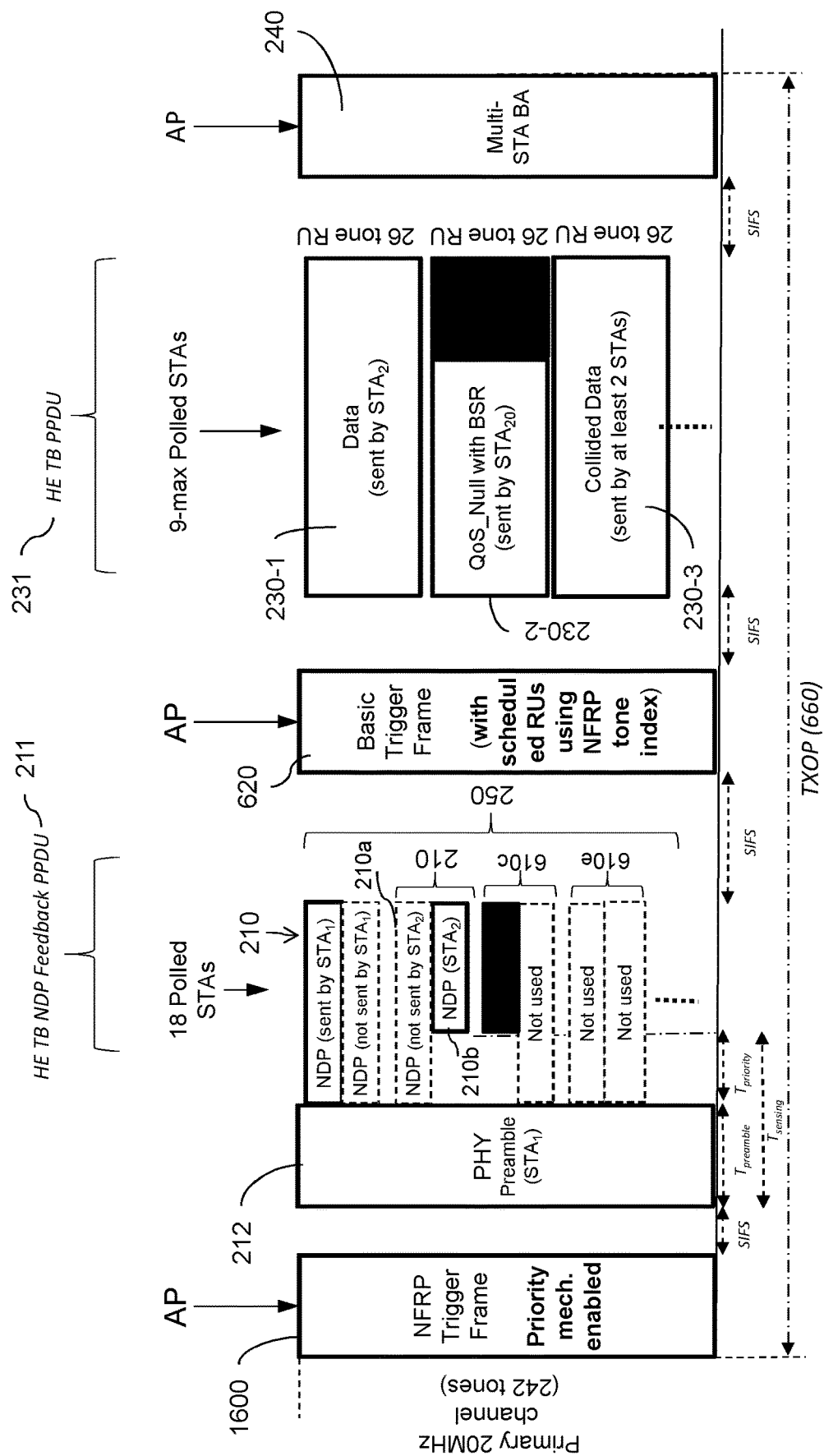
FIG. 16 illustrates, using the same scenario as FIG. 2, fourth embodiments of the invention providing a priority mechanism when high-priority non-AP stations respond to a NFRP trigger frame of a NDP short feedback report procedure.
Figure 17:
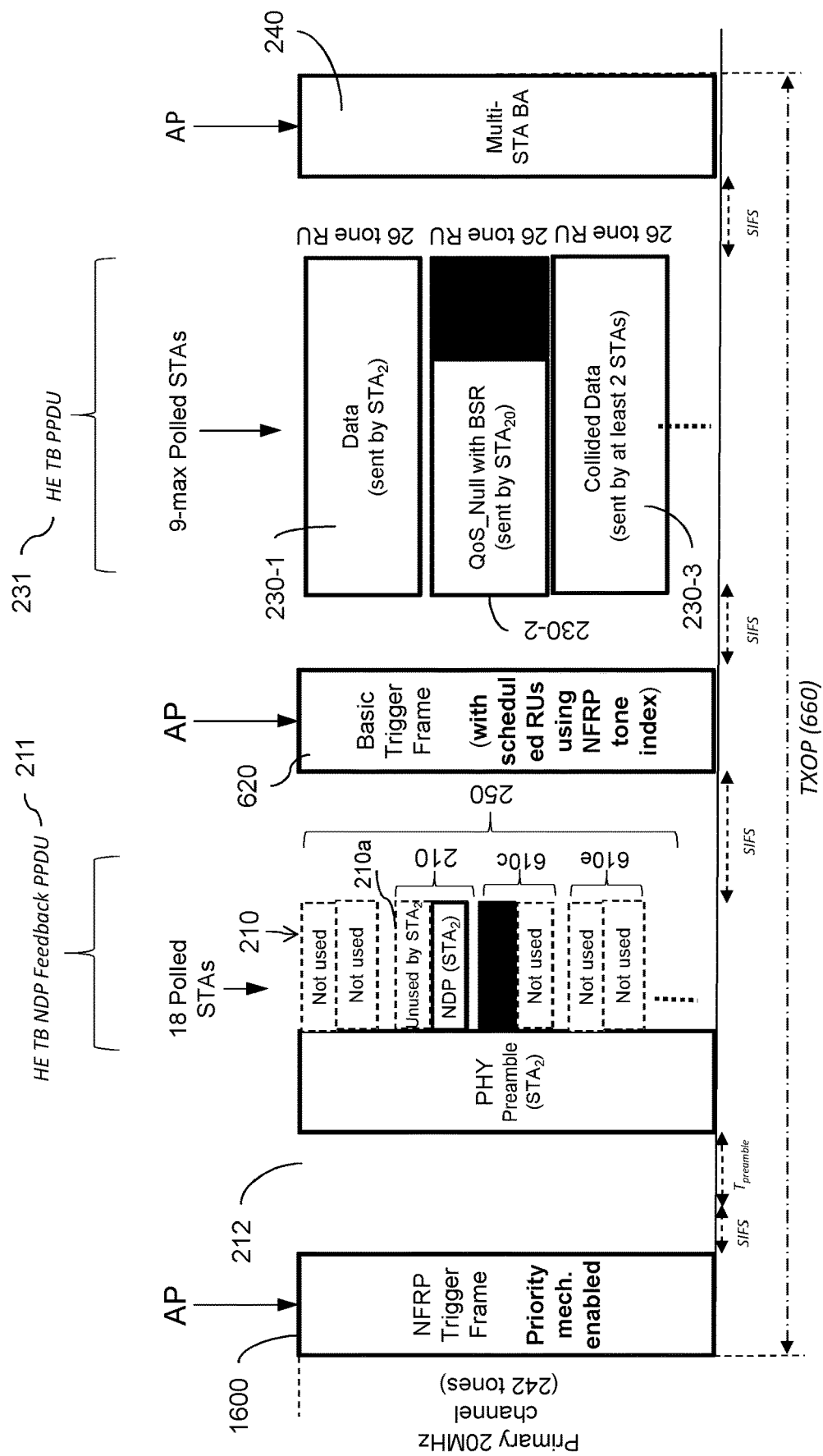
FIG. 17 illustrates a variant of FIG. 16 in which no high-priority non-AP station responds to the NFRP trigger frame.

FIG. 16 uses the same timeline as FIG. 2 to illustrate fourth embodiments of the proposed priority mechanism when high-priority non-AP stations respond to the NFRP trigger frame, while FIG. 17 illustrates the same embodiments when no high-priority non-AP station responds to the NFRP trigger frame.

Figure 16A:
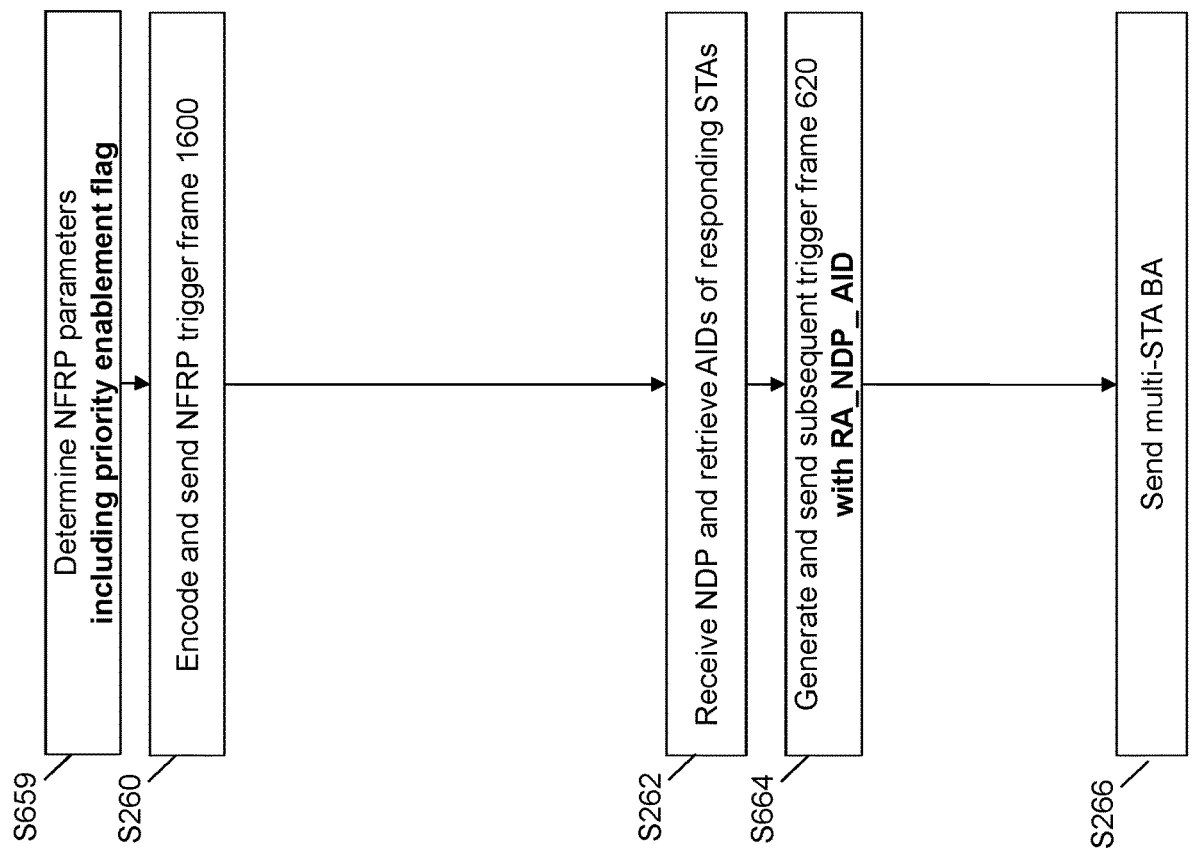
FIGS. 16a and 16b illustrate, using flowcharts, general steps at the access point and at a non-AP station, respectively, corresponding to the fourth embodiments.
Figure 16B:
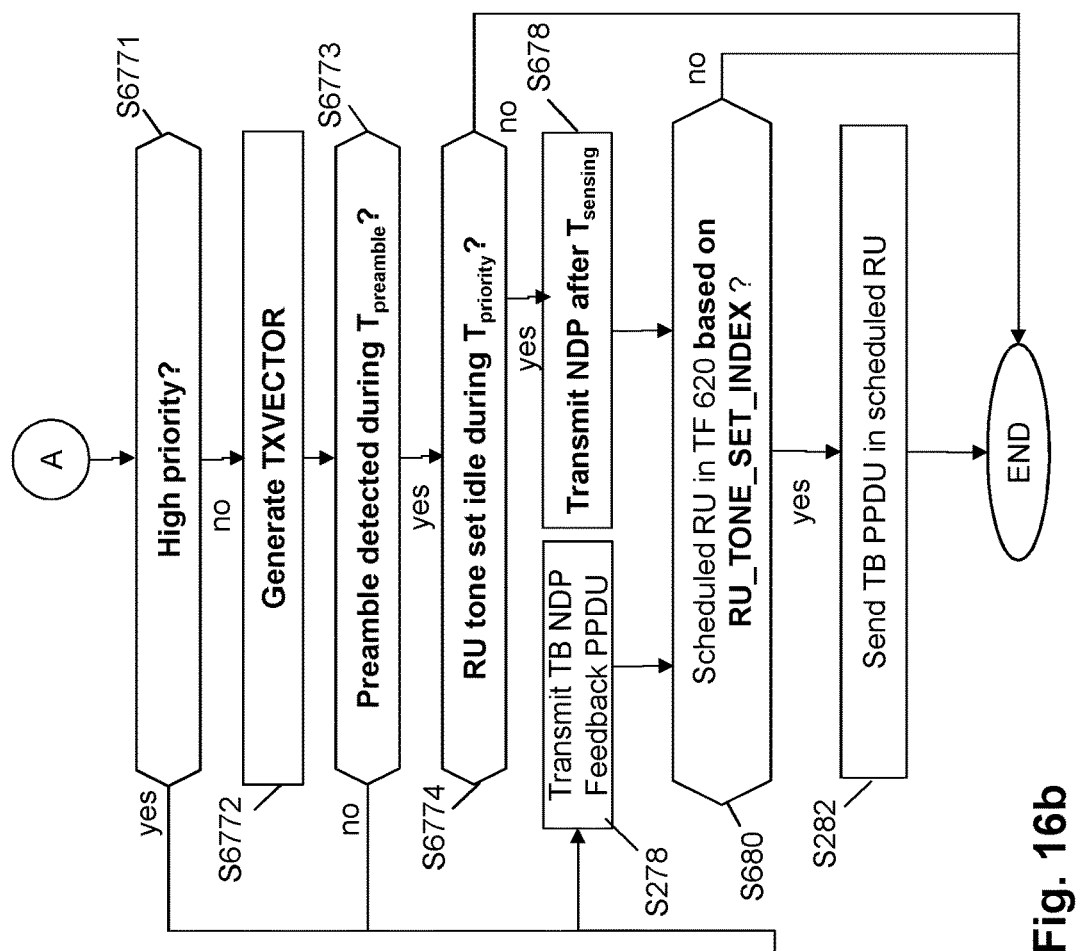
Figure 16B:
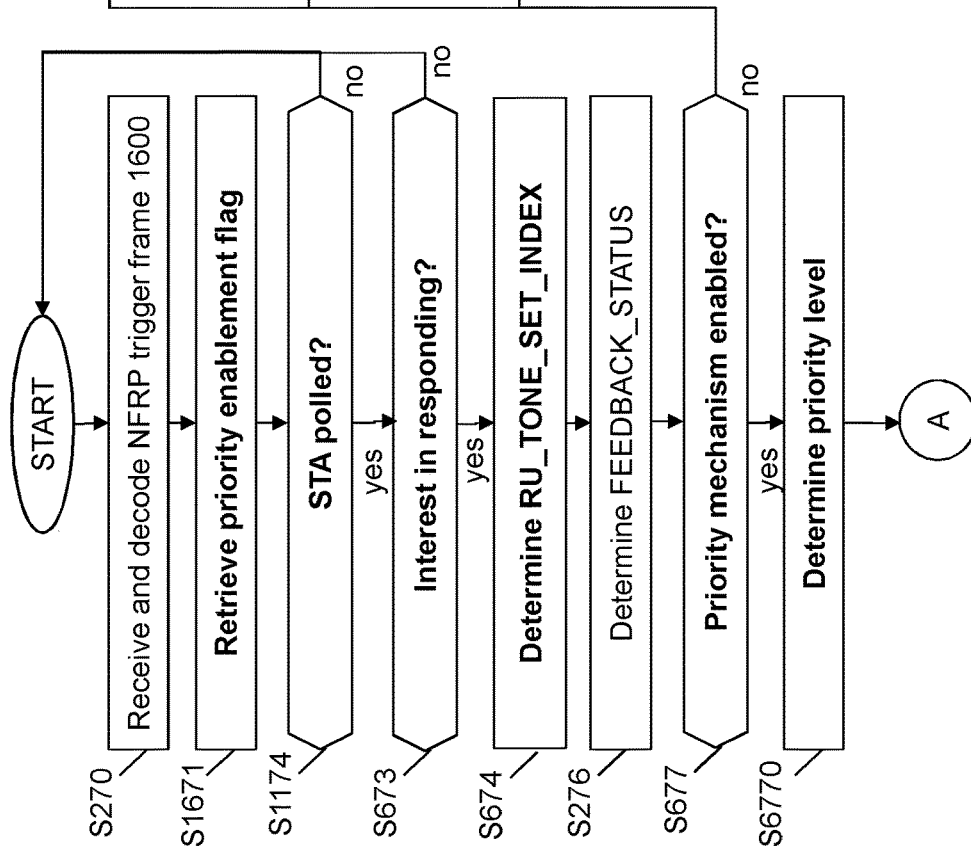

FIGS. 16a and 16b illustrate, using flowcharts, corresponding general steps at the AP and a non-AP STA, respectively. The reference numbers are unchanged when referring to the same elements, frames and steps as in FIG. 2.

The AP 110 is willing to poll non-AP stations using a feedback short procedure in order to provide UL MU operation.

At step S659, the AP 110 determines NFRP parameters values for NFRP trigger frame 1600 to be sent and builds it.

As the priority mechanism of the invention is used to mitigate risks of collision when accessing the RU tone sets, the NFRP trigger frame 1600 has to offer the RU tone sets to a plurality of non-AP stations when the priority mechanism is active.

In one embodiment, the priority mechanism is systematically used, continuously active. In that case no signaling is required. The priority mechanism can be enabled when the stations exchange their capabilities during the setup of the network.

Otherwise, the AP has to signal to the non-AP stations whether the priority mechanism is currently used or not. This may be signaled at NFRP trigger frame level, meaning that the AP can decide to activate or not the priority mechanism at each new NFRP trigger frame 1600.

First, the AP determines whether the priority mechanism has to be used or not, i.e. it determines whether low-priority stations have to sense a selected responding RU tone set during a sensing period in which high-priority stations are supposed to send NDP feedback report responses to the NFRP trigger frame. The reasons why to activate or not the priority mechanism are out of the scope of the present invention. For illustrative purposes, the AP may consider the number of registered non-AP stations, history statistics on collisions on previous RU tone sets, etc.

The AP then sets a priority enablement flag in the NFRP trigger frame depending on the outcome of the determining step. In particular, in the affirmative (priority mechanism to be used), the priority enablement flag is enabled.

Various way to signal the priority enablement flag may be envisioned.

Preferably, it is a 1-bit flag to offer two levels of priorities. Of course, other embodiments may provide a x-bit field to allow up to $2^x$ levels of priorities (and then $2^x$ station behaviors to sense during gradually longer sensing periods).

In one embodiment, the priority enablement flag is included in Reserved field 352 or 354.

In a variant, it is included in Trigger Dependent Common Info field 340.

In other embodiments, the Feedback Type (field 353) may indicate simultaneously both the question to be answered by the non-AP stations during the short feedback procedure and the enabling or not if the priority mechanism. The Feedback Type thus acts as a priority enablement flag.

802.11 ax D4.1 currently defines Feedback Type=0 for resource request without the priority mechanism of the invention. Another value of the Feedback Type may be used still for resource request but with usage of the priority mechanism. This advantageously keeps retro-compatibility with the current version of 802.11 ax. For instance

| Feedback Type 353 (priority enablement flag) | Question to the polled stations | Usage of the priority mechanism |
| --- | --- | --- |
| 0 | resource request | NO |
| 1 | resource request | YES |

While this proposal defines a single level of priority associated with a sensing period as described below, other values of the Feedback Type 353 may help to define a higher number of station priority levels associated with sensing periods having different durations or that are consecutive.

Of course, other questions may be defined, with or without the priority mechanism, using other Feedback Type values.

In yet other embodiments, a range of station AIDs may be reserved for non-AP stations concerned by the priority mechanism. The AP thus assigned these AIDs to the non-AP stations for which it wishes to offer the priority mechanism. Such assignment may be based on the station capabilities exchanged during the registration. Therefore, by targeting some of these reserved AIDs through the StartingAID field, the AP implicitly indicates when the priority mechanism is enabled. The StartingAID field thus acts as a priority enablement flag.

In the example of the Figures, the AP decides to use the priority mechanism by setting the priority enablement flag accordingly.

Various options are available for the AP to designate the plurality of non-AP stations that are competing on each RU tone set when the priority mechanism is used.

In some embodiments, the NFRP trigger frame 1600 may offer random access to the RU tones sets to a large group of non-AP stations. The NFRP trigger frame 1600 is thus referred to as RA-NFRP trigger frame. To that end, the Starting AID field 351 may be set to a predefined AID value defining a random access for the stations to the plurality of RU tone sets. This sharply contrasts with the "Starting AID" field conventionally used which defines the first AID of a restricted range of AIDs scheduled to respond to the RA-NFRP Trigger frame. Thanks to this specific predefined value, the non-AP STAs can know that a random scheme is requested for sending their feedback response to the AP. A decision for the AP to offer random access and to decide which group of non-AP STAs has to be polled may be based on network statistics and/or on history.

The predefined AID value may be set to 0 to target all the non-AP stations yet associated with the AP, or be set to a Basic Service Set Identifier, BSSID, index of a BSS to poll all the non-AP stations belonging to this BSS, or any other value that targets a specific group of non-AP stations.

In a variant to random access, the AP may decide to assign two or more AIDs per RU tone set. For instance, the Starting AID field 351 may keep its meaning while the polling range is extended. The AP may decide on the number N of AIDs assigned per RU tone set. This number may be signaled (by the priority enablement flag or field described above) is various numbers are available. The number of polled stations is thus increased to $N \times N_{STA}$ and the non-AP stations with AIDs belonging to ["Starting AID"+x.N; "Starting AID"+x.N−1] are assigned to RU tone set with RU_TONE_SET_INDEX=x.

The other NFRP parameters may be determined in a conventional way.

Next, at step S260, the AP 110 sends the NFRP trigger frame 1600 to poll non-AP STAs to know their needs for transmission, by sending the NFRP trigger frame 1600.

At step S270, any non-AP station 101-107 receives the NFRP Trigger frame 1600 and decodes it. If the receiving non-AP station belongs to a BSS (or virtual BSS) of the transmitting AP, the Trigger Frame is not filtered by the PHY layer as defined in the standard. The filtering is made on so-called "colors" defined in the 802.11 ax standard, which mandates that the BSS colors of all the multiple BSSs managed by a single AP are the same.

At step S1671, the non-AP station retrieves the priority enablement flag from the NFRP trigger frame 1600. This step is optional depending on whether the AP signals the priority mechanism in the trigger frame.

At step S1174, the non-AP STA determines whether it is polled (i.e. targeted) by the NFRP trigger frame 1600 or authorized to access the RU tone sets on a random basis.

In case of a RA-NFRP trigger frame, the non-AP station checks StartingAID 351 to verify whether the non-AP station belongs to the group of stations allowed to contend for access to the RU tone sets.

In case the NFRP trigger frame 1600 defines a polling range [StartingAID, StartingAID+N×$N_{STA}$], the non-AP station only checks whether its AID belongs to the polling range. As mentioned above, the value N may depend on the priority enablement flag or field retrieved at step S1671.

At the end of step S1174, the non-AP STA knows whether it is allowed to respond to the NFRP trigger frame. In the affirmative, the non-AP STA determines whether it has interest in responding (test S673), for instance depending on whether it has buffered data to transmit. In the affirmative, the process goes on at step S674.

At step S674, the non-AP STA determines the index RU_TONE_SET_INDEX of the RU tone set 210 to be used to transmit its short NDP feedback report response 211 in response to the NFRP trigger frame 1600.

In case of a RA-NFRP trigger frame, the selection of the RU tone set is made on a random basis, by randomly selecting an index from among the available indexes. All the RU tone sets are available for contention. Optionally, only the RU tone sets that fit into station capabilities are eligible for contention (e.g. a station operating on a limited band BW such as a 20 MHz-only station).

The non-AP STA therefore randomly selects a RU tone set Index to send its short feedback: RU_TONE_SET_INDEX=random [0, $N_{STA}$−1]. Here, it is chosen to start the indexes at 0. In variant, the first index may have another value, e.g. 1 or above, and the provided formulae are modified accordingly.

In case the NFRP trigger frame 1600 defines a polling range [StartingAID, StartingAID+N×$N_{STA}$], the scheduled non-AP STA usually selects a responding RU tone set based on the position of its AID within the above polling range: RU_TONE_SET_INDEX=x when its own AID belongs to ["Starting AID"+x.N; "Starting AID"+x.N−1].

Once the random RU tone set (RU_TONE_SET_INDEX) has been randomly selected at step S674, the non-AP STA determines the FEEDBACK_STATUS value, if any, at step S276.

At step S677, the non-AP station determines whether it has to use the priority mechanism. This may be based on the priority enablement flag (various signaling options) retrieved at step S1671. In a variant, the priority mechanism may be systematically used.

If the priority mechanism is disabled, the non-AP station can send (step S278—already described) its NDP feedback report response on the selected responding RU tone as from the beginning of the preamble period $T_{preamble}$.

If the priority mechanism is enabled, the non-AP station determines (step S6770) its level of priority to respond to the NFRP trigger frame 1600. Indeed, the level of priority may evolve over time and/or from one NFRP trigger frame to the other.

The priority level can be defined depending on the global status of the non-AP STA.

For instance, the non-AP STA is stated as high-priority station for any data traffics to be sent because a very low latency is required for any data traffics.

In a variant, the priority level is synchronized with the EDCA traffic access category associated with the buffered data to be sent. For instance, the access category AC_VO and AC_VI are stated as high-level access categories. Therefore, the non-AP station have some buffered data in the buffer of one of these ACs, it is considered as a high-priority station.

In a slight variant, the access category to be considered to evaluate the priority level may be the non-empty traffic access category having the lowest (EDCA) backoff counter. For instance, if the EDCA backoff counter associated with AC_BE is the lowest one, the non-AP station may be considered as low-priority, although it has AC_VO buffered data.

In other embodiments, the priority level of the non-AP station is based on an AID of the station.

For instance, the AID of the non-AP station may belong to a range of high-priority AIDs, hence defining the non-AP station as a high-priority station, while the non-AP stations not belonging to this range are considered as low-priority.

In a variant, the x LSB (x being an integer) of its 12-bit AID may match a priority pattern, hence defining the non-AP station as a high-priority station, while the non-AP stations not matching the pattern are considered as low-priority.

Also, the AID of the non-AP station may be the first one (or any other position) in the set of AIDs ["Starting AID"+ x.N; "Starting AID"+x.N−1] assigned to the selected RU tone set, hence defining the non-AP station as a high-priority station, while the other non-AP stations of the set are considered as low-priority.

If it is determined a high level of priority of the non-AP station (test S6771), the non-AP station can send (step S278—already described) the NDP feedback report response on the selected responding RU tone as from the beginning of the preamble period $T_{preamble}$. This is illustrated in FIG. 16, for instance by Station 1.

If the non-AP station is a low-priority station, the MAC block 502 of the non-AP STA generates and transmits (S6772) a TXVECTOR to cause the PHY 503 of the non-AP STA to transmit over the tones set of the selected RU tone set after a predetermined sensing period $T_{sensing}$, should the RU tone set be sensed as idle.

During $T_{sensing}$, the PHY block 503 has to sense the medium, in particular those tones of the selected RU tone set.

As shown in the Figures, this predetermined sensing time period $T_{sensing}$ is divided into two parts: the preamble period $T_{preamble}$ to detect PHY preamble 212 sent by others polled non-AP STAs and an energy sensing period $T_{priority}$ to detect potential collision on the selected RU tone set. $T_{priority}$ immediately follows $T_{preamble}$. $T_{priority}$ may for instance last a backoff time, i.e. 9 ms in 802.11ax D4.1.

Conventional sensing techniques may be used.

At step S6773, the non-AP STA determines whether a PHY preamble corresponding to the header 212 of the HE TB Feedback PPDU is detected or not, i.e. whether other polled non-AP stations are simultaneously responding to the NFRP trigger frame 1600. For this, the non-AP STA senses the medium during $T_{preamble}$. The PHY preamble is transmitted over the 20 MHz channel.

If no PHY preamble is sensed, meaning that no other polled non-AP STA with a high-priority level is currently transmitting a HE TB PPDU over the 20 MHz channel, the non-AP STA can send a HE TB Feedback PPDU as described above with reference to FIG. 3b, i.e. including the PHY preamble. Indeed, no other non-AP station is currently using the RU tone set selected at step S674. This is illustrated in FIG. 17. This avoids the 20 MHz channel to be preempted by other legacy non-AP STAs. Preferably, the non-AP station starts sending the HE TB Feedback PPDU as from the end of $T_{preamble}$ (i.e. beginning of $T_{priority}$). In a variant, the non-AP station starts sending the HE TB Feedback PPDU as from the end of the predetermined sensing period $T_{sensing}$.

If a PHY preamble is sensed at step S6773, meaning that at least one polled high-priority non-AP STA is currently transmitting its NDP feedback report response 211, the non-AP STA continues sensing the tones of its selected RU tone set in order to determine whether it is idle or not.

The sensing is performed during the energy sensing period $T_{priority}$.

At step S6774, the non-AP STA determines whether the medium is idle on the selected RU tone set.

In the negative, meaning that a polled high-priority non-AP STA has selected the same RU tone set and is currently using it, the non-AP STA cannot use the RU tone set otherwise collision would occur. Therefore, the process ends.

On the other hand, if the medium remains free on the selected RU tone set, meaning that no polled high-priority non-AP STA has selected the same RU tone set, the non-AP STA (which is low-priority) can send (S678) its feedback response. It does it by transmitting only energy (Null Data Packets), i.e. padding without PHY preamble, on the selected responding RU tone set for the remaining time dedicated to the NDP Feedback Report procedure. The transmission preferably starts as from the end of $T_{priority}$. This is illustrated by the behavior of Station 2 in FIG. 16.

As apparent from these explanations, the proposed mechanism reduces risks of collision on the RU tone sets by avoiding any collision between a high-priority station and a low-priority station.

However, some RU tone sets are not selected by any polled non-AP station (e.g. RU tone set 610e) while others may experiment collisions (610c).

The AP receives and decodes (S262) the RU tone sets where energy is present, to provide to its MAC layer a list of used RU_TONE_SET_INDEX and the corresponding Feedback responses (FEEDBACK_STATUS values). At this stage, the AP knows the transmission needs of the polled non-AP stations.

As various non-AP stations can use the same RU tone set, it is not possible for the AP to know exactly which non-AP station has responded on which RU tone set.

At step S664, the AP can send a subsequent trigger frame 620 to offer new opportunities (RUs) to the responding non-AP STAs, for example a 'Basic' type trigger frame or any convenient type. Preferably, the scheduled RUs are of narrow width (26 tones) to offer a maximum of nine RUs per 20 MHz channel. The AP may select a subset of the responding non-AP STAs.

By failing to know which non-AP STA has emit energy on a given RU tone set 210, it is impossible for the AP to schedule the responding non-AP STAs through their AIDs in the trigger frame 620.

The AP may thus assign a scheduled resource unit to a responding non-AP station using the index RU_TONE_SET_INDEX of the corresponding responding RU tone set to define the AID (so-called AID12 field) associated with the scheduled RU.

The AP may directly use the index RU_TONE_SET_INDEX as value for the AID12 field.

However, in order to avoid these scheduled index-based AIDs to fall on conventionally-used AIDs (for BSS or for individual non-AP STAs, typically values from 1 to 2007 and some values below 2048 such as 2045 and 2046, and value 4095 is reserved to indicate start of a Padding field), the AID associated with the scheduled resource unit in the subsequent trigger frame may be built from the index RU_TONE_SET_INDEX of the responding RU tone set and from an offset value Offset_AID.

For instance, the AID12 field of a User Info field defining the scheduled RU may be set to the following RA_NDP_AID value:

RA_NDP_AID=Offset_AID+RU_TONE_SET_INDEX+STARTING_STS_NUM×$N_{feedback}$×$2^{BW}$ where STARTING_STS_NUM is parameter handling the spatial multiplexing. It is a station parameter that corresponds to a starting spatial stream number minus 1. It is set to 0 if the MultiplexingFlag 356 of the NFRP trigger frame 1600 is set to 0 (no spatial multiplexing), otherwise it is set as follows:

STARTING_STS_NUM=entire value(RU_TONE_SET_INDEX/$N_{feedback}$/$2^{BW}$)

The Offset_AID parameter is a predetermined offset value known by the non-AP STAs and the AP. In some embodiments, the Offset_AID parameter is transmitted by the AP to the stations in a management frame, e.g. periodically in beacon frames.

Preferably, the Offset_AID parameter is selected such that any subsequent RA_NDP_AID falls outside the legacy range of Association Identifiers (AIDs) provided by AP to associated non-AP STAs. For instance, the offset value is 2048 or above. It is then added to the index RU_TONE_SET_INDEX of the responding RU tone set to form the AID (AID12 field) associated with the scheduled resource unit.

Using an offset value of 2048 to form the 12-bit AID field makes it possible to work on the MSB (set to 1) to easily distinguish between conventional AIDs and those used for the present invention. Furthermore, it allows scheduled RUs for non-AP STAs responding to the NFRP trigger frame 1600 to be mixed with scheduled RUs for other non-AP stations directly per their own AID value, with no risk of misunderstanding.

In case of mixing, the subsequent trigger frame 620 first declares all the resource units (it may be a single one) assigned to individual non-AP stations using their own assigned AID, and then declares all resource units (may be a single one) assigned to responding non-AP stations using indexes RU_TONE_SET_INDEX of the responding RU tone sets (preferably using RA_NDP_AID).

Of course, the subsequent trigger frame 620 may only comprise resource units for non-AP stations responding to the NFRP trigger frame 1600 (i.e. RUs with only AID12 set based on RA_NDP_AID).

In all case, the subsequent trigger frame may only comprise scheduled resource units (assigned to respective individual non-AP stations) without random RUs.

At step S664, the AP 110 thus sends the subsequent basic trigger frame 620 so built.

Any non-AP STA receiving the subsequent trigger frame 620 thus determines (step S680) whether it is scheduled, i.e. whether a resource unit is assigned to the non-AP station based on the index RU_TONE_SET_INDEX of the responding RU tone set determined and used by the non-AP station at steps S674 and S278 or S678.

The non-AP STA having responded to the NFRP trigger frame 1600 uses the formula above to determine its own RA_NDP_AID and compares it to the AID12 fields specified in the User Info fields of the subsequent trigger frame 620. The non-AP STA thus determines whether an AID associated with a scheduled resource unit in the subsequent trigger frame corresponds to the index RU_TONE_SET_INDEX used given the predefined offset value Offset_AID.

In a preferred embodiment where Offset_AID is set to value 2048, all RUs with MSB set to 1 are analyzed in order than the remaining value (not considering the MSB bit) equals to the RU tone set index RU_TONE_SET_INDEX the non-AP station has previously used.

Of course, in case of mixing RUs with conventional AIDs and index-based AIDs, the non-AP station may be scheduled twice, in which case it should give priority to a scheduled RU with its own AID in order to offer the RU with its index-based AID (if any) to any other colliding non-AP STA having responded on the same RU tone set. In other words, if the non-AP station also determines in the subsequent trigger frame a resource unit that has an associated AID corresponding to an AID assigned by the AP to the non-AP station, the non-AP station discards or disregards the resource unit with the AID corresponding to the index of the selected responding RU tone set to use the resource unit with the assigned AID to send the trigger-based PPDU response. This approach reduces risks of collision in the RUs and may be easily achieved through the order of RU declaration performed by the AP in the subsequent trigger frame 620. Indeed, the non-AP STA may disregard any further User Info fields as soon as it finds one with its own AID. Therefore, placing the RUs with AIDs assigned upon registration before the RUs with index-based AIDs allows the above priority scheme to be naturally performed.

The non-AP station may thus first determine whether one Resource Unit is allocated to it by positively finding its station AID in the AID12 field of one RU. If not found, a further determination is performed in case that the non-AP station has previously sent a NDP feedback response 211 in response to the NFRP trigger frame 1600. The further determination relies on the formula for determining RA_NDP_AID value, considering the RU tone index RU_TONE_SET_INDEX used for the NDP Feedback report response and the predetermined offset value (Offset_AID).

In case of positive determination at step S680, the non-AP STA can use the RU scheduled to it and transmit data 231 (HE TB PPDU) to the AP. This is step S282. The HE TB PPDU 231 contains the MAC address of the sending non-AP station, making it possible for the AP to identify each sending non-AP station.

As illustrated in FIGS. 16 and 17:

Station 2 has selected a RU tone set index having value 0 (NDP feedback emitted on the first tone set), then its allocated scheduled RU 230-1 with RA_NDP_AID=2048;

Station 20 has selected a RU tone set index having value 3 (NDP feedback emitted on 4th tone set), then its allocated scheduled RU 230-2 with RA_NDP_AID=2051;

at least two non-AP stations have selected the same RU tone set index having value 2 (NDP feedback emitted on the third tone set corresponding to 610c), then they are allocated the same RU 230-3 because they use the same RA_NDP_AID=2050. As a result, the at least two non-AP stations collide in the RU 230-3.

The AP 110 thus receives the HE TB PPDU 231 over the multiple scheduled RUs. It can then acknowledge (or not) the data on each RU by sending a multi-STA block acknowledgment (BA) response 240, making it possible for each sending non-AP STA to know when its data transmission is successful (reception of the ACK) or not (no ACK after expiry of a time-out). This is step S266.

For instance, it may not acknowledge data over RU 230-3 (FIG. 16 or 17) as it detects a collision.

As the acknowledgment (no collision) generally uses the AIDs of the sending non-AP stations, the AP 110 may obtain an AID of the responding non-AP stations using the MAC addresses specified in the HE TB PPDU 231 and thus retrieved therefrom. The non-AP stations are thus only discriminated at this final stage.

The examples of FIGS. 16 and 17 show a single TXOP 660 during which the NDP Feedback Report procedure and subsequent UL MU operation are both conducted. This ensures that the feedback responses 211 are still relevant when they are exploited by the AP to provide the subsequent UL MU operation based on these responses. In addition, it advantageously avoids a random tone set index to be kept by a non-AP station outside the TXOP; otherwise, this would require keeping in memory this random index for further usage by Data trigger frame TF 620 or until a next NFRP trigger frame 1600.

However, TXOP 660 may be split into two separate TXOPs, and/or alternatively several subsequent trigger frames 620 (possibly cascaded) may be issued in order to address more non-AP stations responding to the NFRP trigger frame 1600 (as only 9 maximum stations per 20 Mhz can be triggered for data RU transmission per Basic trigger frame).

Although the present invention has been described herein above with reference to specific embodiments, the present invention is not limited to the specific embodiments, and modifications will be apparent to a skilled person in the art which lie within the scope of the present invention.

Many further modifications and variations will suggest themselves to those versed in the art upon referring to the foregoing illustrative embodiments, which are given by way of example only and which are not intended to limit the scope of the invention, that being determined solely by the appended claims. In particular, the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A communication method in a wireless network, comprising the following steps at a station:
   receiving, from an access point, AP, a null data packet, NDP, feedback report poll, NFRP, trigger frame, the NFRP trigger frame reserving a plurality of resource unit, RU, tone sets for NDP feedback report responses by stations,
   determining whether an association identifier, AID, field in the received NFRP trigger frame includes a predefined AID value defining a random access for the stations to the plurality of RU tone sets,
   in case of positive determination, randomly selecting a responding RU tone set from the plurality of RU tone sets,
   sending a NDP feedback report response on the selected responding RU tone set,
   receiving, from the AP, a subsequent trigger frame reserving a plurality of resource units, wherein a resource unit is assigned to the station based on an index of the responding RU tone set, and
   responsive to the subsequent trigger frame, sending a trigger-based PPDU response on the assigned resource unit,
   wherein an AID associated with the resource unit in a subsequent trigger frame is built from the index of the responding RU tone set and from an offset value and
   wherein the offset value is 2048 or above and is added to the index of the responding RU tone set to form the AID associated with the resource unit.

2. The communication method of claim 1, wherein the determining comprises determining whether the predefined AID value is reserved for stations not yet associated with the AP.

3. The communication method of claim 1, wherein the determining comprises determining whether the predefined AID value is one of
   a Basic Service Set Identifier, BSSID, index of a BSS to which the station belongs, and
   an AID targeting all the stations yet associated with the AP.

4. The communication method of claim 1, further comprising, at the station, determining whether an AID associated with the resource unit in the subsequent trigger frame corresponds to an index of the selected responding RU tone set given a predefined offset value.

5. The communication method of claim 4, wherein if the station also determines in the subsequent trigger frame a resource unit that has an associated AID corresponding to an AID assigned by the AP to the station, the station discards the resource unit with the AID corresponding to the index of the selected responding RU tone set and uses the resource unit with the assigned AID to send a trigger-based PPDU response.

6. The communication method of claim 1, wherein a trigger-based PPDU response is an association management frame.

7. The communication method of claim 1, wherein randomly selecting the responding RU tone set is based on a contention-based access method using a decrementing NFRP backoff, NBO, counter of the station.

8. The communication method of claim 7, wherein if the NBO counter is not greater than a number of RU tone sets in the NFRP trigger frame, the station randomly selects one of the RU tone sets, otherwise the station decrements the NBO counter by the number of RU tone sets in the NFRP trigger frame.

9. The communication method of claim 1, wherein randomly selecting a responding RU tone set is based on a contention-based access method using a decrementing NFRP backoff, NBO, counter of the station,
   the communication method further comprising, at the station, determining whether an acknowledgment of a trigger-based PPDU response is received from the AP, and
   in case of successful trigger-based PPDU response transmission, setting a NFRP contention window, NCW, to a predefined value, and initializing the NBO counter to an integer value randomly selected from a uniform distribution in the range 0 to NCW, and
   in case of unsuccessful trigger-based PPDU response transmission, updating the NCW to 2×NCW+1 when NCW is less than a predefined maximum value, and randomly selecting the NBO counter in the range of 0 and NCW.

10. A communication method in a wireless network, comprising the following steps at an access point, AP:
    sending, to stations, a null data packet, NDP, feedback report poll, NFRP, trigger frame, the NFRP trigger frame reserving a plurality of resource unit, RU, tone sets for NDP feedback report responses by stations, wherein an association identifier, AID, field in the NFRP trigger frame includes a predefined AID value defining a random access for the stations to the plurality of RU tone sets, and
    receiving, from at least one responding station, a NDP feedback report response on a responding RU tone set,
    sending by the AP a subsequent trigger frame reserving a plurality of resource units, wherein a resource unit is assigned to the station based on an index of the responding RU tone set, and
    in response to the subsequent trigger frame, receiving a trigger-based PPDU response on the assigned resource unit,
    wherein an AID associated with the resource unit in a subsequent trigger frame is built from the index of the responding RU tone set and from an offset value and
    wherein the offset value is 2048 or above and is added to the index of the responding RU tone set to form the AID associated with the resource unit.

11. The communication method of claim 10, wherein the subsequent trigger frame only comprises resource units assigned to respective individual station.

12. The communication method of claim 10, wherein the subsequent trigger frame first declares all the resource units assigned to individual stations using an AID assigned by the AP to these individual stations upon registration, and then declares all resource units assigned to responding stations using indexes of responding RU tone sets.

13. The communication method of claim 10, further comprising, at the AP,
    receiving a trigger-based PPDU response to the subsequent trigger frame, on the assigned resource unit, and
    obtaining an AID of the responding station using a MAC address retrieved from the received trigger-based PPDU response.

14. The communication method of claim 1, wherein the predefined AID value is outside a range of AIDs that the AP assigns to individual stations upon registration.

15. The communication method of claim 1, wherein the offset value is transmitted by the AP to the stations in a management frame.

16. The communication method of claim 12, wherein the subsequent trigger frame is transmitted during a transmission opportunity, TXOP, reserved by the NFRP trigger frame.

17. The communication method of claim 1, wherein a RU tone set of the plurality of the RU tone sets is made of two adjacent groups of tones, each group being made of non-adjacent tones, and the NDP feedback report response is transmitted on one of the two groups of tones.

18. The communication method of claim 1, wherein a RU tone set of the plurality of the RU tone sets is made of a group of non-adjacent tones.

19. A non-transitory computer-readable medium storing a program which, when executed by a microprocessor or computer system in a communication device, causes the communication device to perform the communication method of claim 1.

20. A communication device comprising at least one microprocessor configured for carrying out the steps of the communication method of claim 1.

\* \* \* \* \*